US007047559B2

(12) United States Patent
Ohmori

(10) Patent No.: US 7,047,559 B2
(45) Date of Patent: May 16, 2006

(54) INFORMATION PROCESSING APPARATUS AND METHOD, RECORDING MEDIUM, AND SERVICE PROVIDING SYSTEM

(75) Inventor: Mutsuhiro Ohmori, Kanagawa (JP)

(73) Assignee: Sony Corporation, Tokyo (JP)

( * ) Notice: Subject to any disclaimer, the term of this patent is extended or adjusted under 35 U.S.C. 154(b) by 766 days.

(21) Appl. No.: 10/039,894

(22) Filed: Nov. 8, 2001

(65) Prior Publication Data

US 2002/0103765 A1   Aug. 1, 2002

(30) Foreign Application Priority Data

Nov. 8, 2000  (JP)  ............... P2000-340153

(51) Int. Cl.
*G06F 17/30* (2006.01)
(52) U.S. Cl. .............................. 726/3; 726/4
(58) Field of Classification Search ............ 379/93.03; 726/2–4; 380/251; 713/158
See application file for complete search history.

(56) References Cited

U.S. PATENT DOCUMENTS

| 5,586,260 A | 12/1996 | Hu |
| 5,815,665 A | 9/1998 | Teper et al. |
| 5,903,721 A * | 5/1999 | Sixtus ........................... 726/2 |
| 6,104,815 A * | 8/2000 | Alcorn et al. ............... 380/251 |
| 6,792,531 B1 * | 9/2004 | Heiden et al. .............. 713/158 |

FOREIGN PATENT DOCUMENTS

| EP | 0 926 611 A2 | 6/1999 |
| WO | WO 98/40809 | 9/1998 |
| WO | WO 99/41690 | 8/1999 |
| WO | WO 99/66705 | 12/1999 |
| WO | WO 00/44130 | 7/2000 |

* cited by examiner

*Primary Examiner*—Salvatore Cangialosi
(74) *Attorney, Agent, or Firm*—Bell, Boyd & Lloyd LLC

(57) ABSTRACT

A portable terminal stores a first URL which specifies personal information of a user stored in a personal server, and transmits the first URL to a settlement device. The settlement device serves as a network access port for the portable terminal. The personal server is a server which manages personal data of the user that is identified by the first URL, and communicates with the settlement device and a service server via a network. The service server is a server for performing processing identified by a second URL. The service server executes the processing thereof by communicating with the settlement server and personal server via the network. Thus, the user can receive various types of services. Accordingly, a service providing system can be used with a portable terminal that does not hold any personal information therein.

17 Claims, 44 Drawing Sheets

INFORMATION PROCESSING APPARATUS AND METHOD, RECORDING MEDIUM, AND SERVICE PROVIDING SYSTEM

BACKGROUND OF THE INVENTION

The present invention relates to an information processing apparatus, an information processing method, a recording medium, and a service providing system, and particularly relates to an information processing apparatus, information processing method, recording medium, and service providing system which can be safely used even if, for example, a user loses a portable user terminal.

There are service providing systems where a user operates a portable terminal to communicate with a server connected to a specific network, so as to be provided with particular services from the server.

Normally, personal information, such as user IDs, necessary for using the service providing system, and passwords for user verification are stored in the portable terminal. However, this can be a problem, since if the user loses the portable terminal, for example, the personal information stored therein may be used by unauthorized persons with criminal intent.

Also, when exchanging personal information, there are situations where encryption is performed at the portable terminal in order to prevent the information from being disclosed. However, the functions of normal portable terminals do not allow for sophisticated encryption, thereby enabling personal information to be more easily deciphered and disclosed.

Further, while cellular telephones can be used as portable terminals, usage of cellular telephones is restricted depending on the location (e.g., considering possibly interruption of delicate medical equipment, such as pacemakers). Thus, usage of the system is limited.

SUMMARY OF THE INVENTION

An object of the present invention is, therefore, to enable usage of a service providing system without burdening the users with many restrictions.

An information processing apparatus according to an embodiment of the present invention includes a storage device for storing the first network identifier, a first input device for obtaining the second network identifier, a second input device for obtaining verification data necessary for verifying the user, and a transmitter for transmitting control information containing the first network identifier and the second network identifier to the first server which manages the personal information identified by the first network identifier stored in the storage device, so as to be provided with the service, by processing identified by the second network identifier obtained by the first input device being executed by the second server.

The first network identifier or the second network identifier may be a uniform resource locator (URL).

Preferably, the information processing apparatus is connected to a network having an access port terminal serving as an access port for the network. Thus, the transmitter may transmit the control information to the first server via the access port terminal.

The transmitter may transmit the control information to the access port terminal using directional infrared rays, high-frequency airwaves, or the like.

The second input device may obtain a password generated by a verification data IC chip built into an article which the user is wearing, and the password may be a one-time password. The password may be encrypted with a common key shared between the information processing apparatus and the first server, or the password may be encrypted with a public key of the first server.

If there is an appropriate response from the verification data IC chip built into an article which the user is wearing as to a predetermined request from the first server, the second input device may obtain the password generated by the verification data IC chip.

The article which the user is wearing with the verification data IC chip built in may be a wristwatch, ring, or the like. Preferably, the verification data IC chip is waterproofed. The verification data IC chip may operate based on electromotive force generated by electromagnetic induction, electric power based on photo-electric conversion, electric power from a miniature battery, thermal electromotive force based on body heat of the user, or the like.

The second input device may obtain as the verification data: fingerprints, voiceprints, iris patterns, contrast patterns of capillaries at predetermined portions of the body, or the like. The first input device may obtain the second network identifier as voice taken in by a microphone, an image obtained by an image sensor, infrared rays received by an infrared ray sensor, high-frequency waves received by a high-frequency antenna, or the like.

An information processing method according to an embodiment of the present invention includes a storing step for storing a first network identifier, a first obtaining step for obtaining a second network identifier, a second obtaining step for obtaining verification data necessary for verifying a user, and a transmitting step for transmitting control information containing the first network identifier and the second network identifier to a first server. Preferably, the first server manages personal information identified by the first network identifier stored in the storing step, so as to be provided with the service, by processing identified by the second network identifier obtained by the processing in the first obtaining step being executed by a second server.

A storing medium according to an embodiment of the present invention includes code for a storing step for storing a first network identifier, code for a first obtaining step for obtaining a second network identifier, code for a second obtaining step for obtaining verification data necessary for verifying a user, and code for a transmitting step for transmitting control information containing the first network identifier and the second network identifier to a first server. Preferably, the first server manages personal information identified by the first network identifier stored in the storing step, so as to be provided with the service, by processing identified by the second network identifier obtained by the processing in the first obtaining step being executed by a second server.

In an information processing apparatus and method, and program in a recording medium, according to an embodiment of the present invention, a first network identifier is stored, a second network identifier is obtained, verification data necessary for verifying a user is obtained, and processing identified by the obtained second network identifier is executed by a second server, whereby control information containing the first network identifier and the second network identifier is transmitted to a first server managing personal information identified by the stored first network identifier, so that services can be received.

A service providing system according to an embodiment of the present invention includes a portable terminal holding a first network identifier, a first server for managing personal information of a user identified by the first network identifier, and a second server for executing processing identified by second network identifier, wherein the portable terminal, the first server, and the second server are connected via a network. Preferably, the portable terminal includes a first storage device for storing the first network identifier, a first input device for obtaining the second network identifier, a second input device for obtaining verification data necessary for verification of the user, a first transmitter for supplying control information containing the first network identifier and the second network identifier to the first server. Preferably, the first server manages personal information identified by the first network identifier stored in the first storage device, so as to be provided with predetermined services, by processing identified by the second network identifier obtained by the first input device being executed by the second server, and a second transmitter for supplying the verification data obtained by the second input device to the first server. Preferably, the first server includes a first control unit for managing the personal information identified by the first network identifier, a first requesting portion for requesting to be provided with the services based on the control information and the personal information, to the second server for executing processing identified by the second network identifier contained in the control information supplied by the first transmitter of the portable terminal, a first verifying portion for making verification of the user based on the verification data supplied by the second transmitter of the portable terminal, based on a request from the second server, and a third transmitter for supplying verification results from the first verifying portion to the second server. Preferably, the second server includes a second control unit for managing processing identified by the second network identifier, a second requesting portion for requesting the first server for verification of the user, if there is a request by the first requesting portion of the first server, and a first executing portion for executing processing identified by the second network identifier based on the control information and the personal information, if the verification results supplied by third transmitter of the first server indicate that the user is a valid user of the service providing system.

The first network identifier or the second network identifier may be a URL.

In an embodiment, an access port terminal is connected to the network, serving as an access port for the portable terminal. Thus, the first transmitter or the second transmitter of the portable terminal may supply the control information or the verification data to the access port terminal. The access port terminal may further include a fourth transmitter for supplying the control information or the verification data supplied from the first transmitter or the second transmitter of the portable terminal to the first server.

In an embodiment, a third server for performing settlement of usage fees of the service providing system is connected to the network, and the access port terminal measures predetermined communication amount processed by itself. The access terminal may further include a fifth transmitter for supplying the results of the measurement to the third server, and the third server may further include a settlement portion for performing settlement of usage fees of the service providing system based on the results of the measurement supplied from the fifth transmitter of the access port terminal.

The communication amount may be the amount of data which the access port terminal has transferred to the portable terminal or the first server.

In an embodiment, referring to the portable terminal, the first storage device may further store a public key for the first network identifier, and the second transmitter may further supply the public key for the first network identifier to the access port terminal, the fourth transmitter of the access port terminal may encrypt the verification data with the public key for the first network identifier, supplied by the second transmitter of the portable terminal, and supply the verification data that has been encrypted to the first server along with the control information. Referring to the first server, the first control unit may further manage a secret key for the first network identifier as personal information, and the first verifying portion may decrypt the verification data supplied by the fourth transmitter of the access port terminal with the secret key for the first network identifier contained in the personal information, and verify the user based on the decrypted verification data.

If that the user is verified to be a valid user of the service providing system by the first verifying portion, the first control unit of the first server may change the secret key of the first network identifier. The first server further may include a third requesting portion for requesting the portable terminal to change the public key for the first network identifier corresponding to the change in the secret key for the first network identifier by the first control unit, and the first storage device of the portable terminal may change the public key for the first network identifier, based on a request by the third requesting portion of the first server.

The second input device of the portable terminal may obtain a password as the verification data, generated by a verification data IC chip built into a certain article which the user is wearing, with a first algorithm. The password may be a one-time password. The password may be encrypted with a common key shared by the portable terminal and the first server, or may be encrypted with a public key of the first server.

If there is an appropriate response from an verification data IC chip built into an article which the user is wearing as to a predetermined request from the first server, the second input device of the portable terminal may obtain the password generated by the verification data IC chip.

The first verifying portion of the first server may generate the one-time password with a second algorithm similar to the first algorithm of the verification data IC chip, and compare the one-time password with the password serving as the verification data supplied from the second transmitter of the portable terminal, thereby verifying the user.

The first verifying portion of the first server may update the second algorithm when the user is verified as a valid user of the service providing system. The first server may further include a third requesting portion for requesting the portable terminal to update the first algorithm of the verification data IC chip corresponding to the update in the second algorithm by the first verifying portion, and the portable terminal may further include a fourth requesting portion for requesting the verification data IC chip to update the first algorithm based on a request by the third requesting portion of the first server.

Predetermined service information is supplied to the portable terminal when processing identified by the second network identifier is executed by the first executing portion of the second server, and the first control unit of the first server may further manage the public key of the portable terminal. The first server may further include a fourth transmitter for encrypting the service information with the public key of the portable terminal and supplying the encrypted service information to the portable terminal. The first storage device of the portable terminal may further store a secret key of itself, and the portable terminal may further include a decrypting portion for decrypting the encryption of the service information supplied from the fourth transmitter of the first server, with the secret key of itself.

When verification is made by the first verifying portion that the user is a valid user of the service providing system, the first control unit of the first server may change the public key of the portable terminal. The first server may further include a third requesting portion for requesting the portable terminal to change the secret key of the portable terminal correlating to the change of the public key of the portable terminal by the first control unit, and the first storage device of the portable terminal may change the secret key of the portable terminal based on a request from the third requesting portion of the first server.

In an embodiment, a predetermined service terminal is connected to the network, and processing identified by the second network identifier is settlement processing. In the portable terminal, the first input device may obtain monetary amount information along with the second network identifier from the service terminal, and the first transmitter may supply the first network identifier, the second network identifier, and the control information containing the monetary amount information, to the first server, so that fees indicated by the monetary amount information can be settled by the settlement processing being executed by the second server. The first requesting portion of the first server requests the second server, which executes the settlement processing identified by the second network identifier contained in the control information supplied by the first transmitter of the portable terminal, to perform settlement based on the monetary amount information and the personal information, and the first executing portion of the second server executes the settlement processing based on the monetary amount information and the personal information if the verification results supplied by the third transmitter of the first server indicate that the user is a valid user of the service providing system.

The first input device may further obtain a payment ID from the service terminal, the first transmitter may supply control information further containing the payment ID to the first server, and the first requesting portion of the first server may request the second server to perform settlement processing based on the monetary amount information, the personal information, and the payment ID, and the first executing portion of the second server may execute the settlement processing based on the monetary amount information, the personal information, and the payment ID, if the verification results supplied by the third transmitter of the first server indicate that the user is a valid user of the service providing system.

In an embodiment, an access port terminal is connected to the network, serving as an access port for portable terminal. The first or second transmitter of the portable terminal may supply the control information or the verification data to the access port terminal, and the access port terminal may include a fourth transmitter for supplying the control information or the verification data supplied from the first or second transmitter of the portable terminal to the first server.

The first control unit of the first server may further manage characteristics information of the user, the first server may further include a fifth transmitter for supplying the characteristics information to the service terminal in response to requests from the second server, and the service terminal may further include a second verifying portion for verification of the user, using the characteristics information supplied from the fifth transmitter of the first server, and a fifth transmitter for supplying verification results by the second verifying portion to the second server. The first executing portion of the second server may execute processing identified by the second network identifier, based on the control information and personal information, if the verification results supplied from the fifth transmitter of the service terminal indicate that the user is a valid user of the service providing system.

The user characteristics information may be image data of the face portion of the user, and verification by the second verifying portion of the service terminal may be performed by displaying an image corresponding to image data of the face portion of the user on a display unit of the service terminal, with the administrator of the service terminal comparing the actual face of the user with the image.

The second server may further include a second storage device for adding a predetermined expiration date to the verification results supplied by the third transmitter of the first server, and a comparison portion for judging, based on the expiration date, whether or not the verification results stored in the second storage device are valid, based on a request from the first requesting portion of the first server, wherein the first executing portion of the second server may execute processing identified by the second network identifier if judgment is made by the comparison portion that the verification results are valid.

In an embodiment, a service terminal for controlling opening and closing of a gate which can be passed through by purchasing a predetermined ticket is connected to the network. The third transmitter of the first server may supply the first network identifier as the verification results to the second server if the user is recognized as a valid user of the service providing system by the verifying portion, and referring to the second server, the second storage device may add the expiration date determined at the time of issuing the ticket to the first network identifier supplied by the third transmitter of the first server the comparison portion may judge, based on the expiration date, whether or not the first network identifier stored in the second storage device is valid, based on a request from the first requesting portion of the first server, and the first executing portion may execute processing of opening the gate if judgment is made by the comparison portion that the first network identifier is valid.

In an embodiment, referring to the first server, the first control unit may add a predetermined expiration date to the verification results, and the first verifying portion may judge, based on the expiration date, whether or not the verification results are valid, based on requests from the second requesting portion of the second server, and the third transmitter may supply the verification results to the second server. Referring to the second server, the second requesting portion may request user verification to the first server at a predetermined timing, and the first executing portion may execute processing identified by the second network identifier based on the control information and the personal information, if the verification results supplied by the third transmitter of the first server indicate that the verification results are valid.

In an embodiment, the service providing system further includes one or a plurality of service processing executing devices for executing processing identified by respectively differing sets of the second network identifier, the first requesting portion of the first server may request to the second server and the service processing executing devices to be provided with the services based on the control information and the personal information, and the service processing executing devices may include a second executing portion for executing processing respectively identified by the second network identifier.

The second executing portion of the service processing executing device may execute processing as a monitor, mouse, or keyboard making up a personal computer, and the second server may execute processing as a CPU making up a personal computer. The portable terminal may further include a fourth transmitter for supplying the first network identifier to one or a plurality of the service processing executing devices, and the second executing portion of the one or a plurality of the service processing executing devices may execute processing identified by the second network identifier only if the first network identifier is supplied from the fourth transmitter of the portable terminal.

If the second executing portion of one the service processing executing devices executes processing as the keyboard, and the second server executes document creating processing, the first control unit of the first server may manage the personal information containing character input patterns as to the user on the keyboard, and the first requesting portion may request execution of the document creating processing based on the control information and the character input pattern, to the second server for executing processing identified by the second network identifier contained in the control information supplied by the first transmitter of the portable terminal. The first executing portion of the second server may execute the document creating processing based on the control information and the character input pattern.

In an embodiment, the portable terminal is provided with predetermined service information as the result of processing identified by the second network identifier being executed by the first executing portion of the second server, and the portable terminal further includes a second storage device for temporarily storing the service information, and a deleting portion for monitoring the amount of data of the service information stored in the second storage device, and when the service information equal to or exceeding a predetermined data amount is stored, deleting with priority the service information not bookmarked, or the service information not linked to a bookmarked homepage.

The deleting means may establish an order of priority for the bookmarks, and delete the bookmarked service information, as necessary, according to the order of priority.

The service providing system may further include a fourth transmitter, whereby, if the service information is the personal information, the first server attaches a tag to the personal information indicating that the personal information cannot be stored in the second storage device of the portable terminal, and supplies the same to the portable terminal.

In an embodiment, the first server is provided with predetermined service information as the result of processing identified by the second network identifier being executed by the first executing portion of the second server, the first server further including a second storage device for temporarily storing the service information, and a deleting portion for monitoring the amount of data of the service information stored in the second storage device, and when the service information equal to or exceeding a predetermined data amount is stored, deleting with priority the service information not bookmarked, or the service information not linked to a bookmarked homepage.

The deleting portion may establish an order of priority for the bookmarks, and delete the bookmarked service information, as necessary, according to the order of priority.

When processing identified by the second network identifier is processing for Web browsing, the first control unit of the first server may further manage predetermined information valid for reviewing again a homepage which has been viewed previously.

In a service providing system according to an embodiment of the present invention, a first network identifier is stored by a portable terminal, a second network identifier is obtained, verification data necessary for verifying users is obtained and processing identified by the obtained second network identifier is executed by a second server, whereby, in order to be provided with predetermined services, control information containing the first network identifier and the second network identifier is supplied to a first server managing personal information identified by the stored first network identifier. The obtained verification data is supplied to a first server, personal information identified by the first network identifier is managed at the first server, a request for providing services based on control information and personal information is made to the second server for executing processing identified by the second network identifier contained in the supplied control information, the user is verified based on the supplied verification data, based on a request from the second server, and the verification results are supplied to the second server. Processing identified by the second network identifier is managed at the second server, and at the time that a request is made, user verification is requested to the first server, and if the supplied verification results indicate that the user is a valid user of the service providing system, processing identified by the second network identifier is executed based on the control information and personal information.

A service providing system according to an embodiment of the present invention includes a portable terminal holding a first network identifier, a first server for managing personal information of a user identified by the first network identifier, a second server for executing processing identified by a second network identifier, and a service terminal holding the second network identifier, wherein the portable terminal, the first server, the second server, and the service terminal are connected via a network. The portable terminal includes a storage device for storing the first network identifier, a first input device for obtaining, from the service terminal, the second network identifier and access information for detecting access patterns, a second input device for obtaining verification data necessary for verification of the user, and a first transmitter for supplying control information containing the first network identifier, the second network identifier, and the access information, to the first server. Preferably, the first server manages the personal information identified by the first network identifier stored in the a storage device, so as to be provided with predetermined services, by processing identified by the second network identifier obtained by the first input device being executed by the second server. The service terminal includes a first storage device for holding the second network identifier, a second input device for obtaining the access information from accesses to itself by the first input device of the portable terminal, a second transmitter for supplying the second network identifier and the access information to the portable terminal, so as to be obtained by the first input device of the portable terminal, and a third transmitter for supplying the control information supplied by the first transmitter of the portable terminal, to the first server. The first server includes a first control unit for managing the personal information identified by the first network identifier, and a first requesting portion for requesting to be provided with the services based on the control information, the personal information, and the access information, to the second server for executing processing identified by the second network identifier contained in the control information supplied by the second transmitter of the portable terminal. The second server includes a second control unit for managing processing identified by the second network identifier, an executing portion for executing, based on the control information, the personal information, and the access information, processing identified by the second network identifier, based on requests from the first requesting portion of the first server.

In an embodiment, a first service terminal is installed at a first location, a second the service terminal is installed at a second location, and the first input device of the portable terminal first accesses the first service terminal and then later accesses the second service terminal. The access information may contain the time of access, and the executing portion of the second server may calculate the difference between the time contained in the access information obtained by the first input device of the first service terminal and the time contained in the access information obtained by the first input device of the second service terminal, judge whether or not the calculation results indicate time equal to or exceeding a predetermined time, and if judgement is made that the calculation results indicate time equal to or exceeding a predetermined time, execute processing identified by the second network identifier.

The first location and the second location may be predetermined locations on a concourse of an amusement park or near an entrance or an exit to or from a toll road.

In an embodiment, the first location is a predetermined location near an entrance to a toll road and the second location is a predetermined location near an exit from the toll road. The second service terminal may include a camera for capturing images of passing vehicles, and a third input device for obtaining the license plate number from the vehicle, from the results of images captured by the camera. The third transmitter of the second service terminal may further supply the license plate number obtained by the third input device to the first server. The first requesting portion of the first server may request the second server which executes processing identified by the second network identifier contained in the control information supplied by the third transmitter of the second service terminal, to provide the server based on the control information, the personal information, the access information, and the license plate number obtained by the second input device of the second service terminal. The second server further may include a second storage device for holding the license plate number of the vehicle of the user beforehand, and the executing portion of the second server may judge whether or not the license plate number obtained by the second input device of the second service terminal matches the license plate number held in the second storage device. If judgment is made that these match, settlement processing of the toll for the toll road may be executed based on the control information and the personal information.

In a service providing system according to an embodiment of the present invention, a first network identifier is stored at a portable terminal, a second network identifier and access information for detecting access patterns is obtained from a service terminal, and processing identified by the obtained second network identifier is executed by a second server. In order to be provided with predetermined services, control information containing the first network identifier, second network identifier, and access information is supplied to the service terminal at the first server managing personal information identified by first network identifier that is stored, the second network identifier is held at the service terminal, the second network identifier and access information is supplied to the portable terminal such that access information is obtained by accessing itself, the supplied control information is supplied to the first server. Personal information identified by the first network identifier is managed at the first server, a request is made to the second server for executing processing identified by the second network identifier contained in the supplied control information for being provided with service based on the control information, personal information, and access information. Processing identified by the second network identifier is managed at the second server, and processing identified by the second network identifier is executed based on the control information, personal information, and access information, based on the request.

Additional features and advantages of the present invention are described in, and will be apparent from, the following Detailed Description of the Invention and the figures.

DETAILED DESCRIPTION OF THE INVENTION

Figure 1:
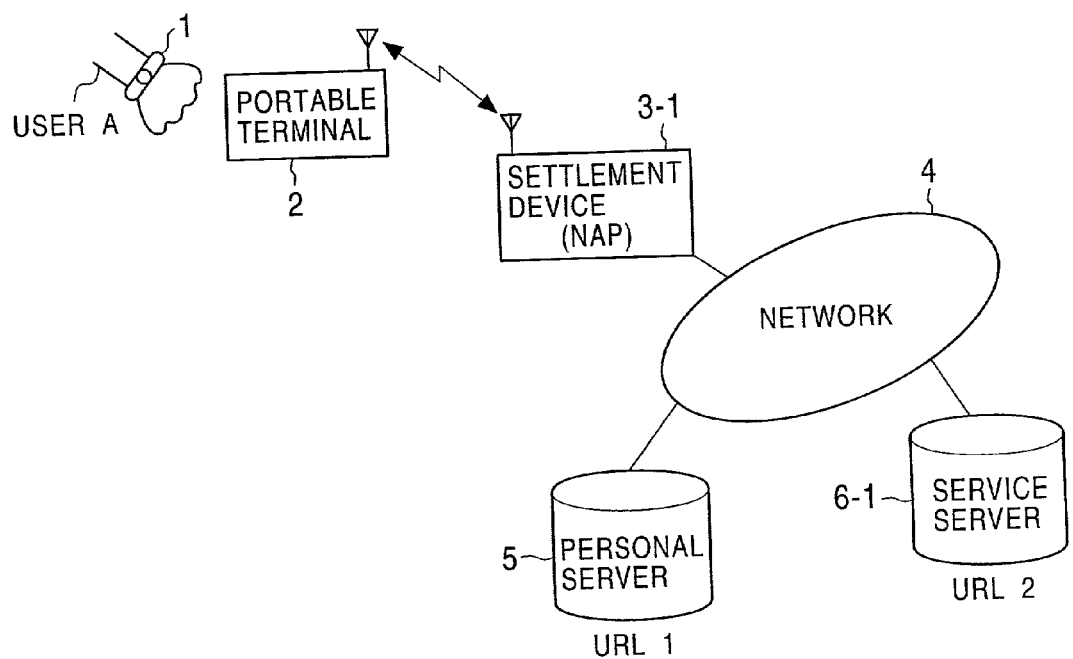
FIG. 1 is a diagram illustrating an embodiment of a service providing system according to the present invention.

FIG. 1 illustrates an embodiment of a service providing system according to the present invention. In general, a user A uses the service providing system to perform settlement of fees.

Preferably, a wristwatch 1 or the like is worn by the user A, and has built in an IC chip having functions for communicating with a portable terminal 2, generating a text string or the like with a predetermined algorithm to serve as a password for processing just one time, according to a request from the portable terminal 2, and transmitting this to the portable terminal 2. This text string will hereinafter be referred to as "one-time password", and the IC chip will hereinafter be referred to as "verification data IC chip" (shown in FIG. 2).

The verification data IC chip may be built into articles other than wristwatches 1, such as rings or the like. Thus, building the verification data IC chip into articles worn on the body allows usage of the system to be facilitated.

Also, the wristwatch 1 may be waterproofed, so as to be worn at all times (e.g., even when the user is bathing).

The portable terminal 2 is a compact device which is readily carried, and connects to a network 4 via a settlement device 3-1 according to operations made by the user A, for communicating with a personal server 5, for example. The portable terminal 2 stores a URL which specifies personal information of the user A stored in the personal server (this URL hereinafter referred to as "URL 1"), transmits the URL 1 to the settlement device 3-1, and the settlement device 3-1 performs communication based on the URL 1, thereby enabling communication with the personal server 5.

Note that the URL is not restricted to identifying homepages on the Internet, but is capable of identifying all sorts of resources in the network 4, including homepages, text data, processing programs, and the like.

The settlement device 3-1 is a device which calculates the total price of merchandise purchased by users (e.g., a cash register). The settlement device 3-1 can make wireless communication with the portable terminal 2 and also communicates with the personal server 5 and service server 6-1 via the network 4. Thus, the settlement device 3-1 serves as a network access port for the portable terminal 2. Note that in the drawings referred to in the present specification, devices serving as network access ports are marked as being NAPs (Network Access Ports) for the portable terminal 2.

The personal server 5 is a server for managing the personal data of the user A identified by the URL 1, and communicates with the settlement device 3-1 and service server 6-1 via the network 4.

The service server 6-1 is a server for performing processing identified by a predetermined URL (hereinafter referred to as "URL 2"). The service server 6-1 executes its processing functions by communicating with the settlement device 3-1 and personal server 5 via the network 4. Thus, the user A can receive various types of services.

Figure 2:
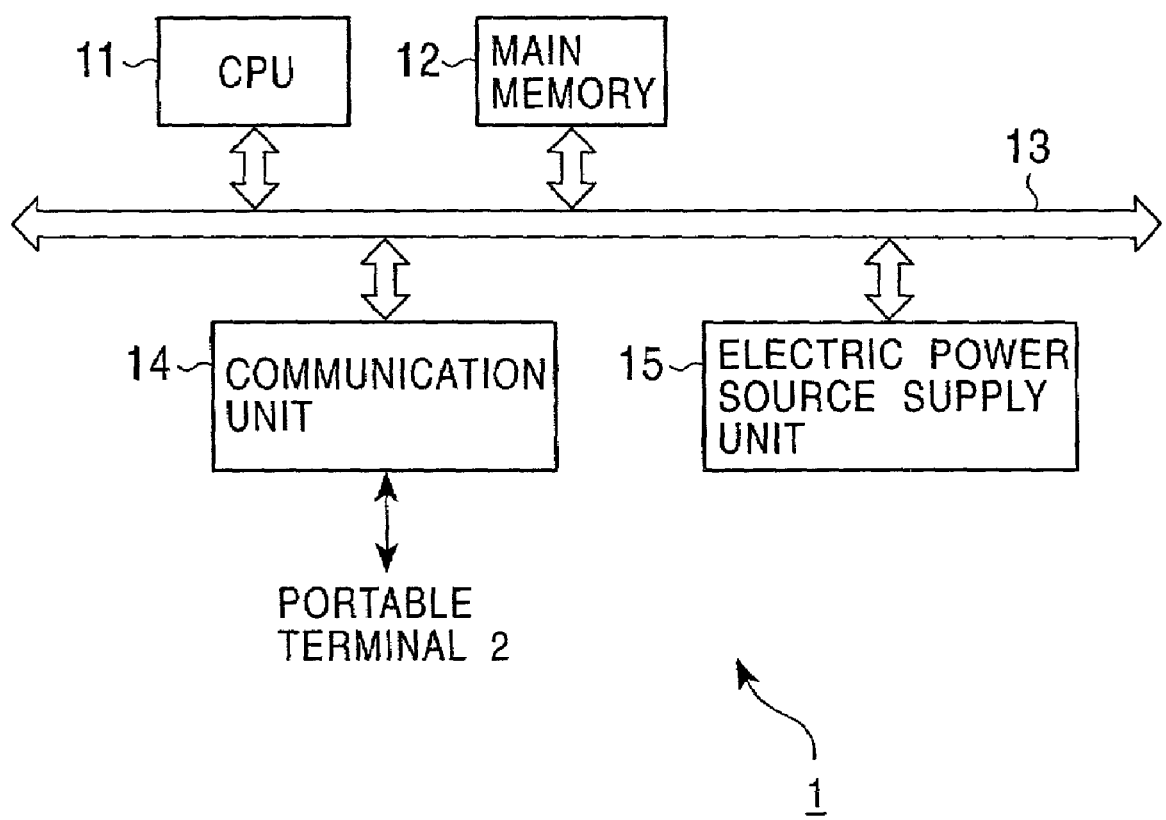
FIG. 2 is a block diagram illustrating an embodiment of a verification data IC chip assembled into the wristwatch 1 shown in FIG. 1.

FIG. 2 illustrates an embodiment of a verification data IC chip assembled into the wristwatch 1. A CPU 11 executes a program (e.g., a one-time password generating program) stored in main memory 12 which is connected via a system bus 13, so as to generate a one-time password, or the like.

A communication unit 14 makes wireless communication with the portable terminal 2, receives verification data generating requests from the portable terminal 2, for example, and supplies the results to the CPU 11 and transmits the one-time password or the like generated by the CPU 11 to the portable terminal 2.

The communication unit 14 is capable of communicating with the portable terminal 2 using the human body as a medium. Thus, if the portable terminal 2 is directly held by the hand of the user A, for example, the wristwatch 1 (verification data IC chip) and the portable terminal 2 become communicative, using the body of the user A as a medium.

An electric power supplying unit 15 supplies electric power to the components. The electric power supplying unit 15 may be a miniature battery, a solar cell, or the like. The electric power supplying unit 15 may also use electromotive force generated by electromagnetic induction, thermal electromotive force based on body heat of the user, or the like, as electric power.

Figure 3:
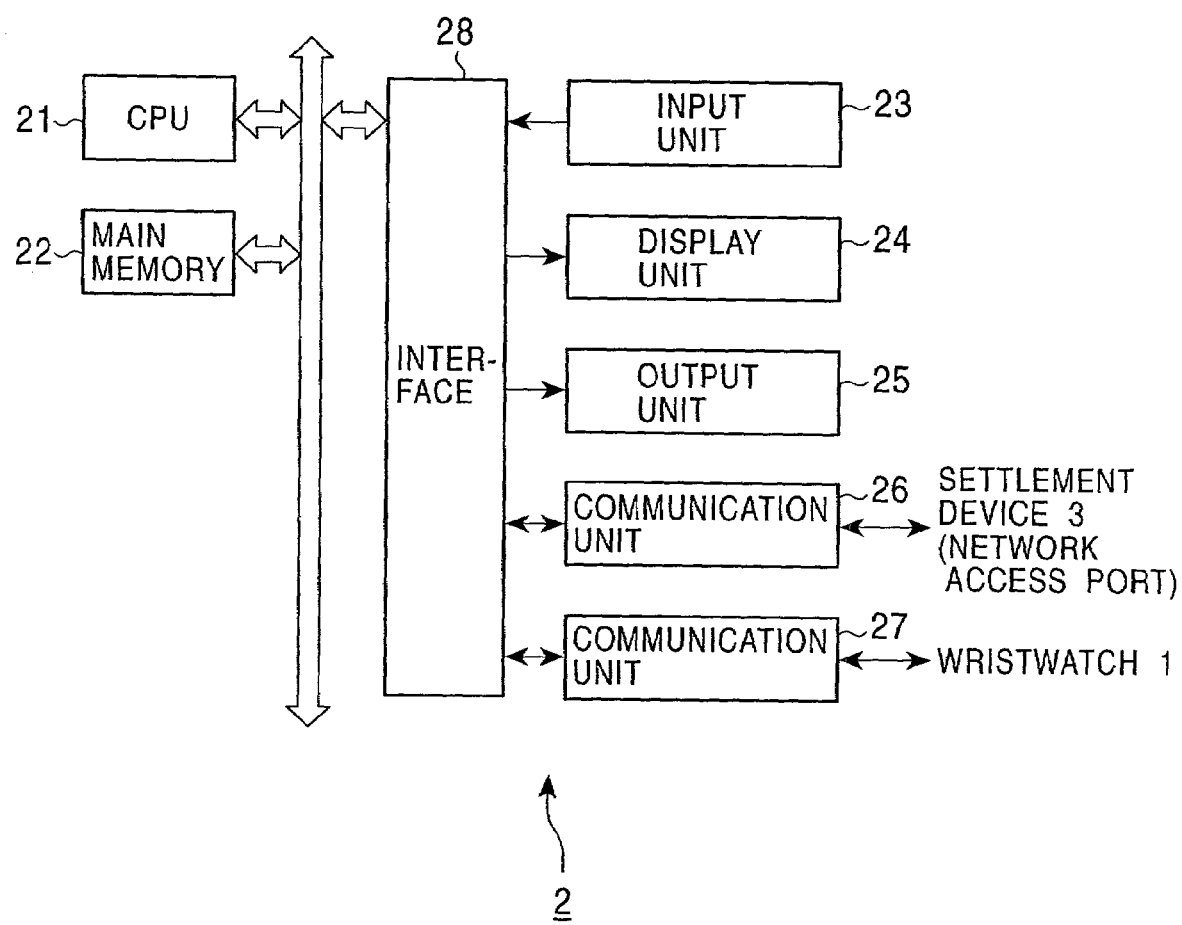
FIG. 3 is a block diagram illustrating an embodiment of the portable terminal 2 shown in FIG. 1.

FIG. 3 illustrates an embodiment of a portable terminal 2. In general, the CPU 21 executes the various types of processing pursuant to programs stored in the main memory 22.

The main memory 22 stores various programs, and also stores the URL 1 (that which distinguishes the personal information of the user A). Note that the main memory 12 is configured of SRAM, wherein the stored contents are saved even if the power of the portable terminal 2 is turned off (i.e., a so-called battery back-up). The main memory 22 can be configured of a combination of high-speed SRAM and storing flash memory, or the like.

An input unit 23 is operated by the user for inputting certain instructions to the CPU 21 as appropriate. A display unit 24 is made up of an LCD, or the like, for example, for displaying certain characters, shapes, images, or the like. An output unit 25 is configured of a speaker, or the like, for outputting audio signals.

A communication unit 26 communicates with the settlement device 3-1 (network access port) using infrared ray communication, milliwave band communication such as Bluetooth technology, airwaves such as 13.5 MHz or 20 MHz, or the like. Thus, short-range communication is performed between the portable terminal 2 and the settlement device 3-1, and this communication does not cause precision devices such as pacemakers, or the like, to malfunction. Accordingly, communication between the portable terminal 2 and the settlement device 3-1 can be performed without restrictions on locations (i.e., the system can be used regardless of the location).

A communication unit 27 communicates wirelessly with the verification data IC chip assembled into the wristwatch 1 (communication unit 14). The communication unit 27 can communicate with the verification data IC chip using the human body as a medium.

An interface 28 is situated between the CPU 21 and the following components: the input unit 23; display unit 24; output unit 25; and communication units 26 and 27; and thus, performs interface processing.

Figure 4:
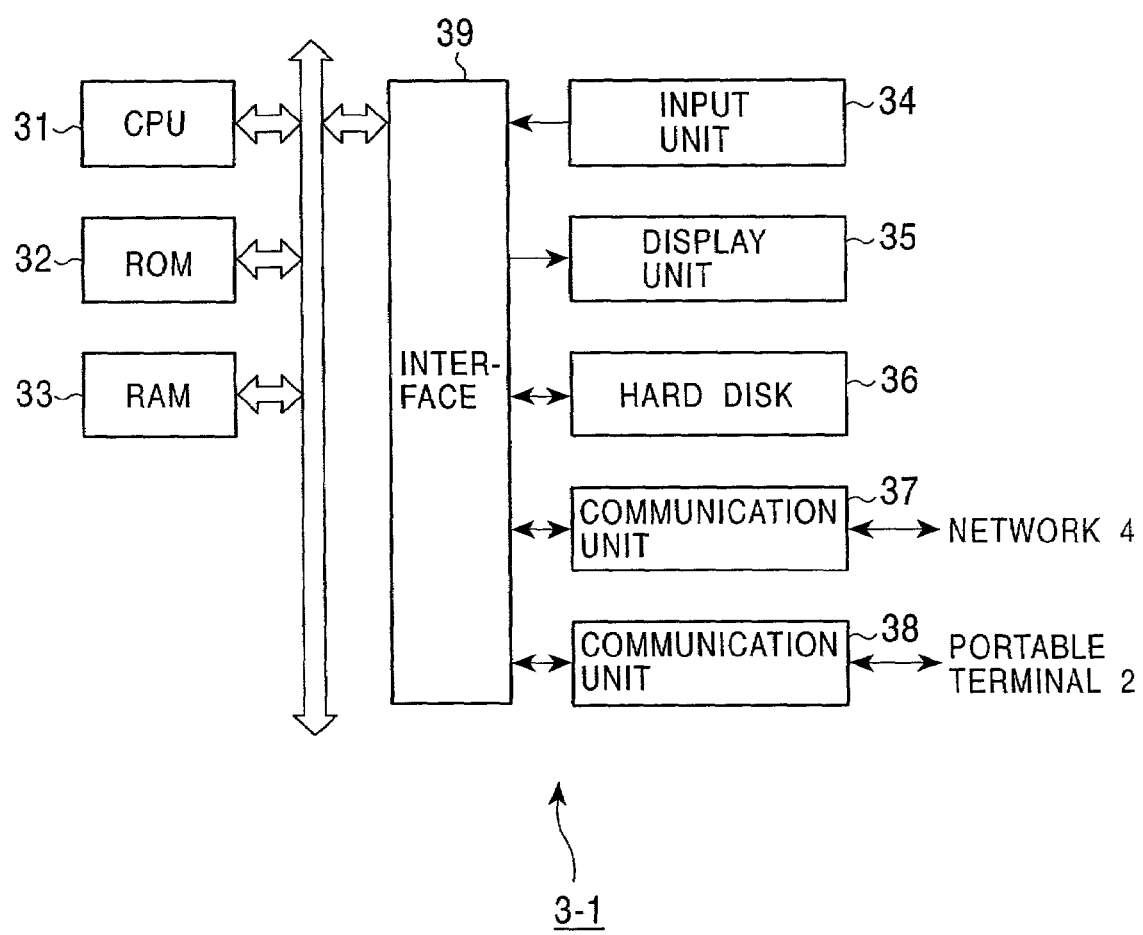
FIG. 4 is a block diagram illustrating an embodiment of the settlement device 3-1 shown in FIG. 1.

FIG. 4 illustrates an embodiment of a settlement device 3-1. A CPU 31 executes various programs according to programs stored in ROM 32. RAM 33 stores data necessary for executing various processing functions by the CPU 31, as appropriate.

An input unit 34 is operated, as necessary, at the time of inputting predetermined commands to the CPU 31. A display unit 35 is made up of an LCD, or the like, for example, for displaying certain characters, shapes, images, or the like. A hard disk 36 stores predetermined data (e.g., the URL 2) and reproduces the data, as necessary.

A communication unit 37 is connected to the network 4, and communicates with the personal server 5 and service server 6-1 thereby.

A communication unit 38 communicates with the portable terminal 2 using infrared ray communication, milliwave band communication such as Bluetooth technology, airwaves such as 13.5 MHz or 20 MHz, or the like.

An interface 39 is situated between the CPU 31 and the following components: the input unit 34; display unit 35; output unit 36; and communication units 37 and 38; and thus, performs interface processing.

Figure 5:
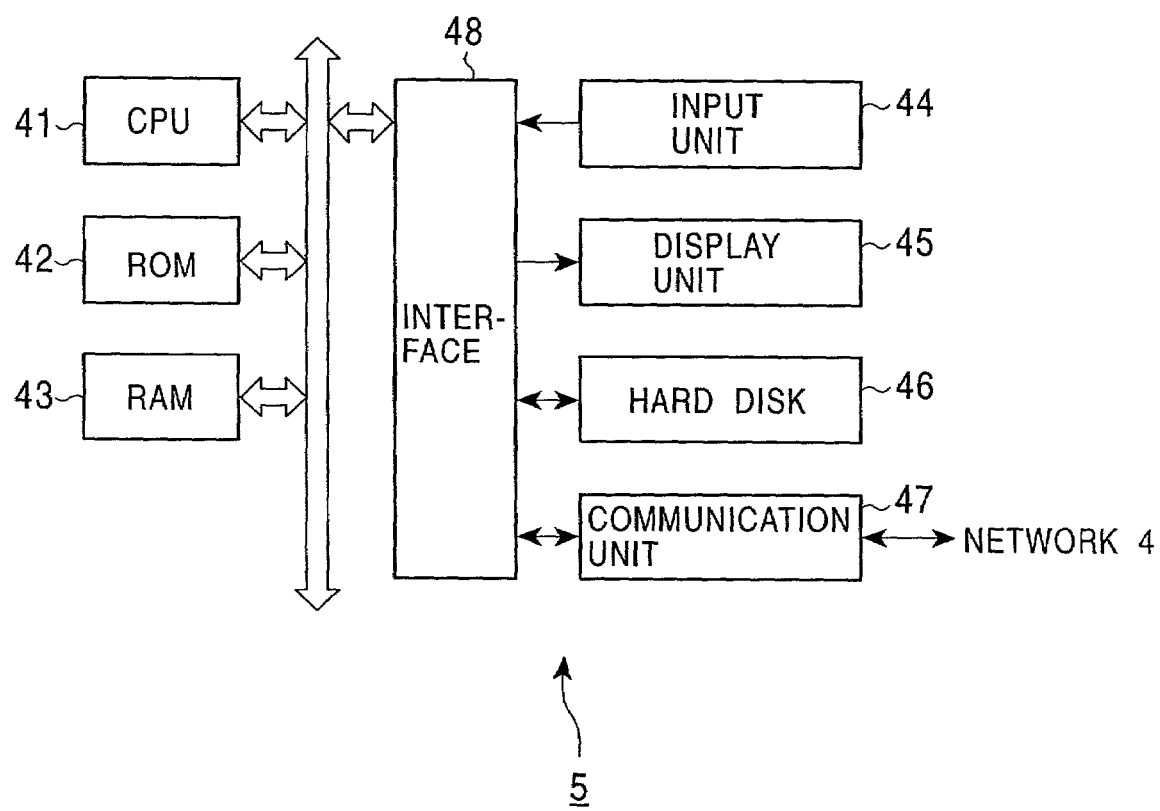
FIG. 5 is a block diagram illustrating an embodiment of the personal server 5 shown in FIG. 1.

FIG. 5 illustrates an embodiment of a personal server 5. A CPU 41 executes various types of processing according to programs stored in ROM 42. RAM 43 stores data necessary for executing various processing functions type by the CPU 41, as appropriate.

The ROM 42 stores a program for generating a one-time password or the like with an algorithm similar to the program stored in the wristwatch 1 (the main memory 12 of the verification data IC chip) for generating one-time passwords, or the like. Thus, if the CPU 41 receives a one-time password, or the like, from the wristwatch 1 via the communication unit 47, network 4, settlement device 3-1, and portable terminal 2, the CPU 41 executes the program, and also generates a one-time password. The CPU 41 compares the received one-time password, or the like, with the generated one-time password, or the like, to perform user verification.

An input unit 44 is operated, as necessary, at the time of inputting predetermined commands to the CPU 41. A display unit 45 is made up of an LCD, or the like, for example, for displaying certain characters, shapes, images, or the like.

A hard disk 46 stores predetermined data (e.g., personal information such as the name, address bank account number, data of the face portion (hereinafter referred to as "facial photograph data"), of a valid user (such as user A) registered with the service providing system), and reproduces this data, as necessary.

A communication unit 47 is connected to the network 4, and communicates with the settlement device 3-1 and service server 6-1 via the network 4.

An interface 48 is situated between the CPU 41 and the following components: the input unit 44; display unit 45; hard disk 46; and communication unit 47; and thus, performs interface processing.

The configuration of the service server 6-1 is similar to that of the personal server 5, so illustration and description thereof will be omitted, but note that a program for executing processing identified by the URL 2 is stored in the ROM or hard disk thereof.

Next, the procedures for settlement processing will be described with reference to the flowchart shown in FIG. 6.

In step S1, the settlement device 3-1 transmits the URL 2, information indicating monetary amount (hereinafter referred to as "monetary amount of purchase"), and payment ID, to the portable terminal 2. The portable terminal 2 receives this.

At this time, the user A carries the merchandise to be purchased to a table provided near the settlement device 3-1. A store employee operates the input unit 34 of the settlement device 3-1 to calculate the monetary amount of purchase (total monetary amount) of the merchandise which the user A has carried to the table, and then performs a predetermined operation on the settlement device 3-1. The settlement device 3-1 thus transmits data such as that described above to the portable terminal 2, in response to this operation. The user A (portable terminal 2) is close enough to the settlement device 3-1 so that short-range communication can be carried out between the portable terminal 2 and the settlement device 3-1.

Next, in step S2, the portable terminal 2 transmits the URL 2 received in step S1, monetary amount of purchase, and payment ID, to the personal server 5 via the settlement device 3-1 and network 4, and also requests the personal server 5 for communication with the service server 6-1 which executes the processing identified by the URL 2. Communication between the portable terminal 2 and the personal server 5 can be performed by the portable terminal 2 transmitting the URL 1 to the settlement device 3-1 and the settlement device 3-1 performing communication based on this. Thus, the personal server 5 receives the data transmitted from the portable terminal 2 and recognizes the request thereof.

For example, at this time, the CPU 21 of the portable terminal 2 controls the display unit 24 and displays information received in step S1. Upon confirming the information displayed on the display unit 24, the user A performs predetermined operations at the input unit 23. Thus, the portable terminal 2 transmits information received in step S1 to the personal server 5, in response to the operations thereof.

In step S3, the personal server 5 requests connection to the service server 6-1, based on the request recognized in step S2. The service server 6-1 responds to the request. Thus, communication is established between the personal server 5 and the service server 6-1.

Next, in step S4, the personal server 5 transmits the payment ID and monetary amount of purchase received in step S2 to the service server 6-1, and the service server 6-1 receives this.

In step S5, the service server 6-1 requests the personal server 5 for user verification. The personal server 5 recognizes the request.

Figure 7:
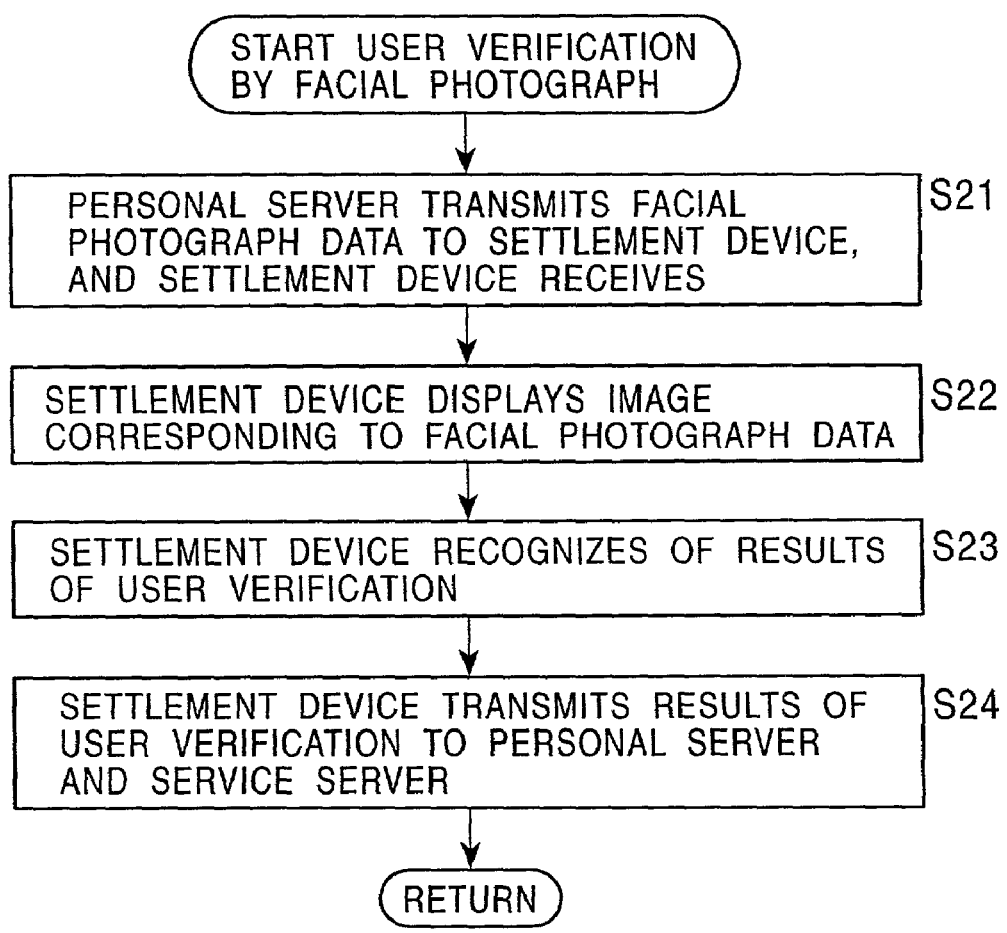
FIG. 7 is a flowchart describing the processing of step S6 in FIG. 6.

Next, in step S6, user verification processing using facial photograph data is performed. The details of the processing are illustrated in the flowchart shown in FIG. 7.

In step S21, the personal server 5 transmits the facial photograph data stored as the personal information of the user A to the settlement device 3-1. The settlement device 3-1 receives this. Next, in step S22, the settlement device 3-1 displays an image corresponding to the facial photograph data on the display unit 35.

In step S23, the settlement device 3-1 recognizes the user verification results by facial photograph. Specifically, a store employee confirms whether or not the individual is actually the user A, based on the image of the face displayed on the display unit 35 of the settlement device 3-1, or in other words, confirms whether or not the individual is a valid user registered with the system. The store employee then performs operations according to the confirmation results at the input unit 34 of the settlement device 3-1. Thus, the settlement device 3-1 recognizes the user verification results by facial photograph.

Next, in step S24, the settlement device 3-1 transmits the user verification results recognized in step S23 to the personal server 5 and the service server 6-1. The personal server 5 and service server 6-1 receive this. Note that the following description will proceed with the understanding that the user A has been verified as being a valid user.

Subsequently, processing ends, and the flow proceeds to the step S7 in FIG. 6, where user verification by verification data is carried out. This processing is illustrated in the flowchart shown in FIG. 8.

In step S31, the personal server 5 requests the portable terminal 2 for verification data, via the network 4 and the settlement device 3-1. The portable terminal 2 recognizes this request. Note that communication between the personal server 5 and portable terminal 2 is always performed via the network 4 and the settlement device 3-1, so in the following description, the phrase "via the network 4 and the settlement device 3-1" may be omitted when describing communication between the personal server 5 and portable terminal 2.

Next, in step S32, the portable terminal 2 obtains a one-time password as verification data from the wristwatch 1, based on the request recognized in step S31. Specifically, the CPU 21 of the portable terminal 2 first controls the display unit 24 to display a message indicating that a request is being made for verification data. Accordingly, the user A brings the wristwatch 1 near the portable terminal 2 (or directly holds the portable terminal 2 in his/her hand). Consequently, communication can be carried out between the wristwatch 1 (verification data IC chip) and the portable terminal 2, so the portable terminal 2 requests the verification data IC chip to generate the verification data, the verification data IC chip generates a one-time password in response to the request, and transmits this to the portable terminal 2. The portable terminal 2 receives the one-time password from the wristwatch 1. Thus, the portable terminal 2 obtains the one-time password as verification data.

In step S33, the portable terminal 2 transmits the verification data obtained in step S32 to the personal server 5. The personal server 5 receives this.

Next, in step S34, the personal server 5 generates a one-time password by itself, compares this with the verification data received in step S33, and thus performs user verification. Specifically, as described above, the CPU 41 of the personal server 5 generates a one-time password with the same algorithm as that of the one-time password generating program executed by the verification data IC chip that is stored in the ROM 42, and performs comparison with the received one-time password. If both are the same, the user is verified as being a valid user.

In step S35, the personal server 5 transmits the results of user verification to the service server 6-1. The service server 6-1 receives this.

Now, if user verification is established at this point (i.e., if the user A has been verified as being a valid user), the personal server 5 updates the one-time password generating algorithm, and also transmits information relating to the update to the wristwatch 1 (verification data IC chip) via the portable terminal 2. The verification data IC chip receives this. Accordingly, the verification data IC chip updates its own one-time password generating algorithm corresponding to the update which the personal server 5 has made.

Thus, updating the one-time password generating algorithm of the verification data generating IC chip and the personal server 5 (i.e., the verifying side and the side being verified) when that user verification is established allows unauthorized use of the present system to be prevented. For example, the one-time password generating algorithm is updated, so even if the verification data generating IC chip itself is duplicated, one-time passwords generated thereby will not yield user verification.

Subsequently, the processing ends and the flow proceeds to step S8 in FIG. 6. Note that the following description will proceed with the understanding that the user A has been verified as being a valid user by user verification with verification data.

Upon the user A being verified as a valid user, payment processing is performed in step S8. Specifically, the service server 6-1 notifies the personal server 5 of the destination for transferring the payment to.

The personal server 5 performs predetermined transfer processing to transfer the payment to a server A (not shown) which is the notified destination for transferring the payment to, and when the transfer has been completed, notifies the service server 6-1 to that effect. At this time, an arrangement may be made wherein the personal server 5 transmits electronic money or the like with a payment ID appended thereto to the server A, and the server A uses the payment ID to settle the transaction. The following description will proceed with the understanding that payment for the monetary amount of purchase has been completed.

Once payment for the monetary amount of purchase has been completed, in step S9 the service server 6-1 transmits the payment ID received in step S4 to the settlement device 3-1 (i.e., returns the payment ID). The settlement device 3-1 receives this.

In step S10, the settlement device 3-1 recognizes completion of the payment processing. Specifically, the CPU 31 of the settlement device 3-1 controls the display unit 35, and displays the payment ID received in step S9. Thus, the store employee recognizes that payment for the monetary amount of purchase has been completed, and performs predetermined operations at the input unit 34 of the settlement device 3-1. Thus, the settlement device 3-1 recognizes completion of the payment processing.

Subsequently, the processing ends. Thus, settlement of the monetary amount of purchase is carried out.

Thus, the personal information of the user A is stored in the personal server 5, not in the portable terminal 2, so that if the user loses the portable terminal 2, there is no chance of personal information being found by a third party and being used in an unauthorized manner.

Also, communication between the portable terminal 2 and the network access port (settlement device 3) is conducted via short-range communication, which does not cause precision devices such as pacemakers, or the like, to malfunction. Thus, the user can perform communication between the portable terminal 2 and settlement device 3 at any time.

The above arrangement is described with a settlement device 3 being provided as a network access port, but an arrangement may also be made wherein the portable terminal 2 directly communicates with the personal server 5 or the like.

Also, the above description involved carrying out both user verification by facial photograph in step S6 and user verification by verification data in step S7, but an arrangement may be made wherein, for example, only one type of user verification is performed.

Also, the above description mentions an example of using a one-time password generated by the wristwatch 1 as the verification data, but other arrangements may be made, such as using a password encrypted with a common key shared by the portable terminal 2 and the personal server 5, or a password encrypted with a public key of the personal server 5, as verification data. Further, fingerprints, voiceprints, iris patterns, contrast patterns of capillaries at predetermined portions of the body, or the like may be used as verification data, as well. Also, an arrangement may be made wherein, if there is an appropriate response from the verification IC chip to a request from the personal server 5, the portable terminal 2 obtains verification data from the verification IC chip.

Figure 9:
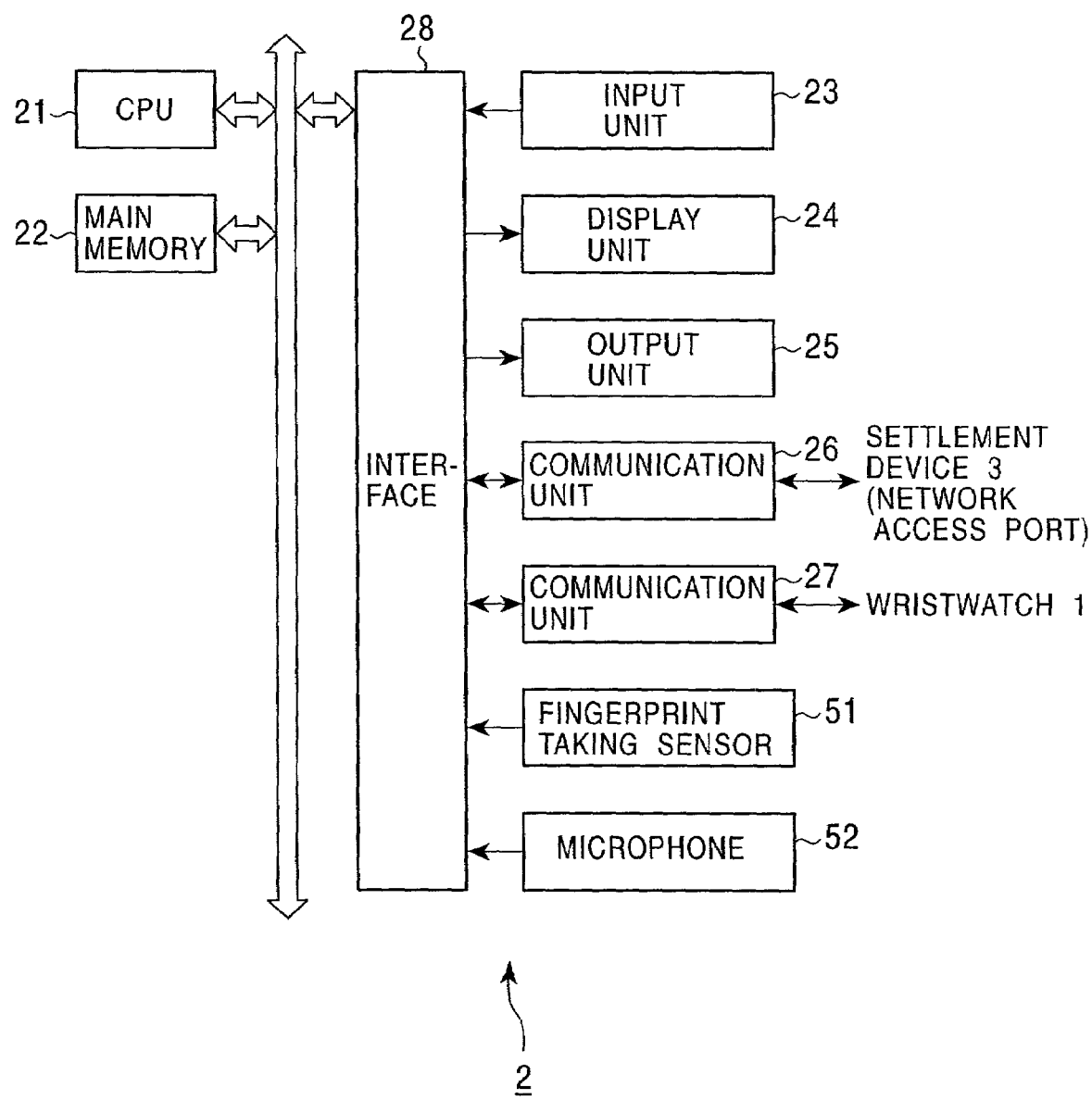
FIG. 9 is a block diagram illustrating another embodiment of the portable terminal 2.

FIG. 9 illustrates an embodiment of a portable terminal 2 capable of taking fingerprints and voiceprints as verification data. This portable terminal 2 is an arrangement wherein the portable terminal 2 shown in FIG. 3 has been further provided with a fingerprint-taking sensor 51 for taking fingerprints, and a microphone 52 for taking in audio.

The fingerprint-taking sensor 51 is attached so that the user A can press the round of the finger thereupon, such that whenever the round of the finger is pressed thereupon, the fingerprint data thereof is taken and output to the CPU 21. Also, the microphone 52 takes in the voice of the user A and outputs this to the CPU 21.

The CPU 21 analyzes the fingerprint data from the fingerprint-taking sensor 51 or the audio data from the microphone 52, and obtains the characteristics data thereof as verification data.

Figure 8:
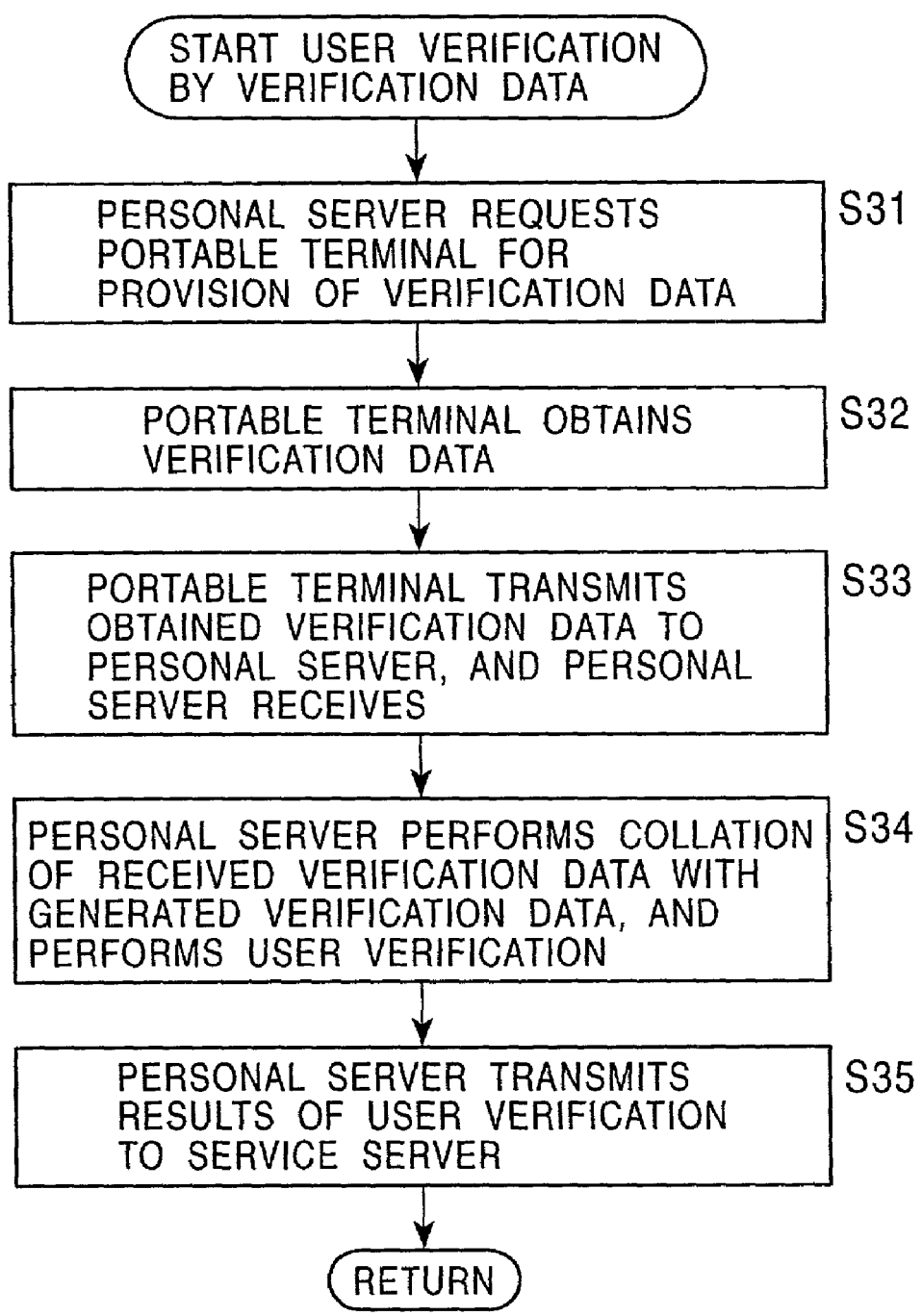
FIG. 8 is a flowchart describing the processing of step S7 in FIG. 6.

The characteristics data of the fingerprint or voiceprint serving as the verification data is crucial data for distinguishing individuals, and accordingly should be encrypted when transmitting the verification data to the personal server 5 during processing in step S33 shown in FIG. 8, for example, when using fingerprints or voiceprints as verification data.

Preferably, the portable terminal 2 holds the public key for the URL 1, and transmits the obtained verification data (the characteristics data of the fingerprint or voiceprint or the like) to the settlement device 3-1 with the public key of the URL 1. The settlement device 3-1 receives these. Now, the communication between the portable terminal 2 and settlement device 3-1 is short-range communication, so the verification data is not encrypted for the communication between the portable terminal 2 settlement device 3-1, since there is little chance of tampering with the data being transmitted in this case. However, arrangements may be made wherein the portable terminal 2 itself performs encryption. If the potable terminal 2 does not have verification data processing ability, settlement device 3-1 can gather the user's verification data, for example, the user's fingerprints.

The settlement device 3-1 encrypts the verification data with the public key of the received URL 1, and transmits the verification data to the personal server 5. The personal server 5 receives this.

Thus case, the personal server 5 has the secret key for the URL 1, and uses this to decrypt the encryption of the verification data from the settlement device 3-1.

The personal server 5 also stores beforehand (at the time of registration of the user A) the characteristics data of the user A, such as fingerprints or voiceprint, as verification data, and at the processing of step S34 in FIG. 8, the verification data obtained by decrypting the encryption is compared with the verification data stored therein, thereby verifying the user A.

Thus, if encryption of verification data is necessary, the encryption is performed at the settlement device 3-1 serving as the network access port, so more powerful encryption can be performed as compared to encrypting with the portable terminal 2. Normally, portable terminals 2 cannot carry programs for powerful encryption, due to design considerations such as reduction in size.

Also, an arrangement may be made, wherein, in step S35 in FIG. 8, the public key of the URL 1 which the portable terminal 2 has, and the secret key of the URL 1 which the personal server 5 has, can be changed in a correlated manner at the time of updating the one-time password generating algorithm. Thus, changing the keys themselves realizes an even more powerful encryption.

Also, if predetermined information is to be encrypted and transmitted from the personal server 5 to the portable terminal 2, the personal server 5 holds the public key of the portable terminal 2 as personal information of the user A, encrypts the information with the public key, and transmits the information to the portable terminal 2. The portable terminal 2 decrypts the encryption of the information from the personal server 5 using its own secret key. Thus, arrangements may be made wherein the keys are changed according to the user verification results.

Figure 6:
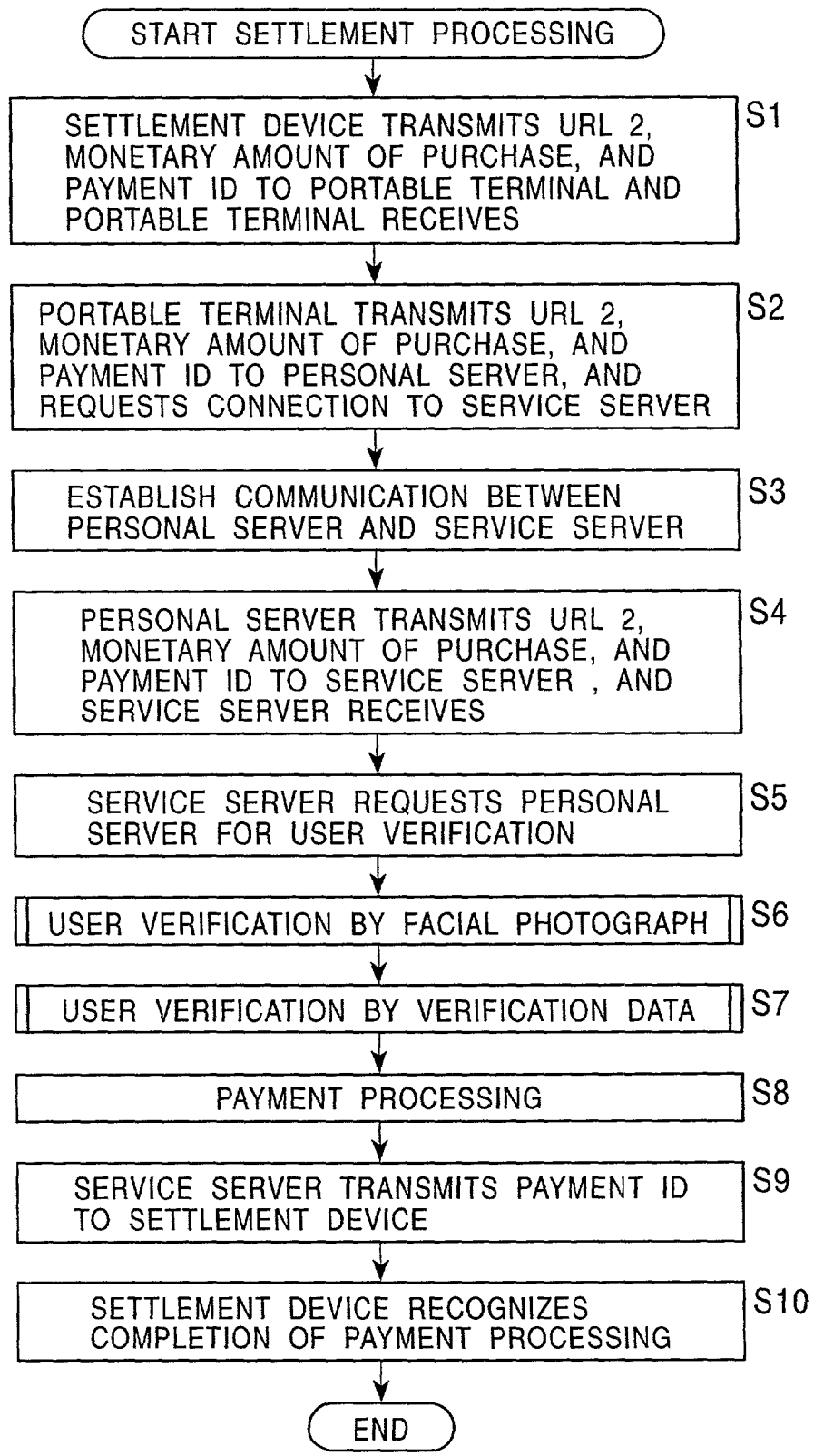
FIG. 6 is a flowchart describing settlement processing.

Also, while the payment processing in step S8 in the embodiment shown in FIG. 6 assumes payment using money in a bank account (i.e., cash), coupons (or vouchers) may be used for payment as well. The term "coupon" refers to data that has been encrypted with a public key of a shop where the coupon can be used, indicating the amount of money which can be used there (i.e., coupon data). The coupon which the user A has, is stored in the personal server 5 (on the hard disk 46) as personal information of the user A.

The procedures for settlement processing using the coupon will be described with reference to the flowchart shown in FIG. 10.

Figure 10:
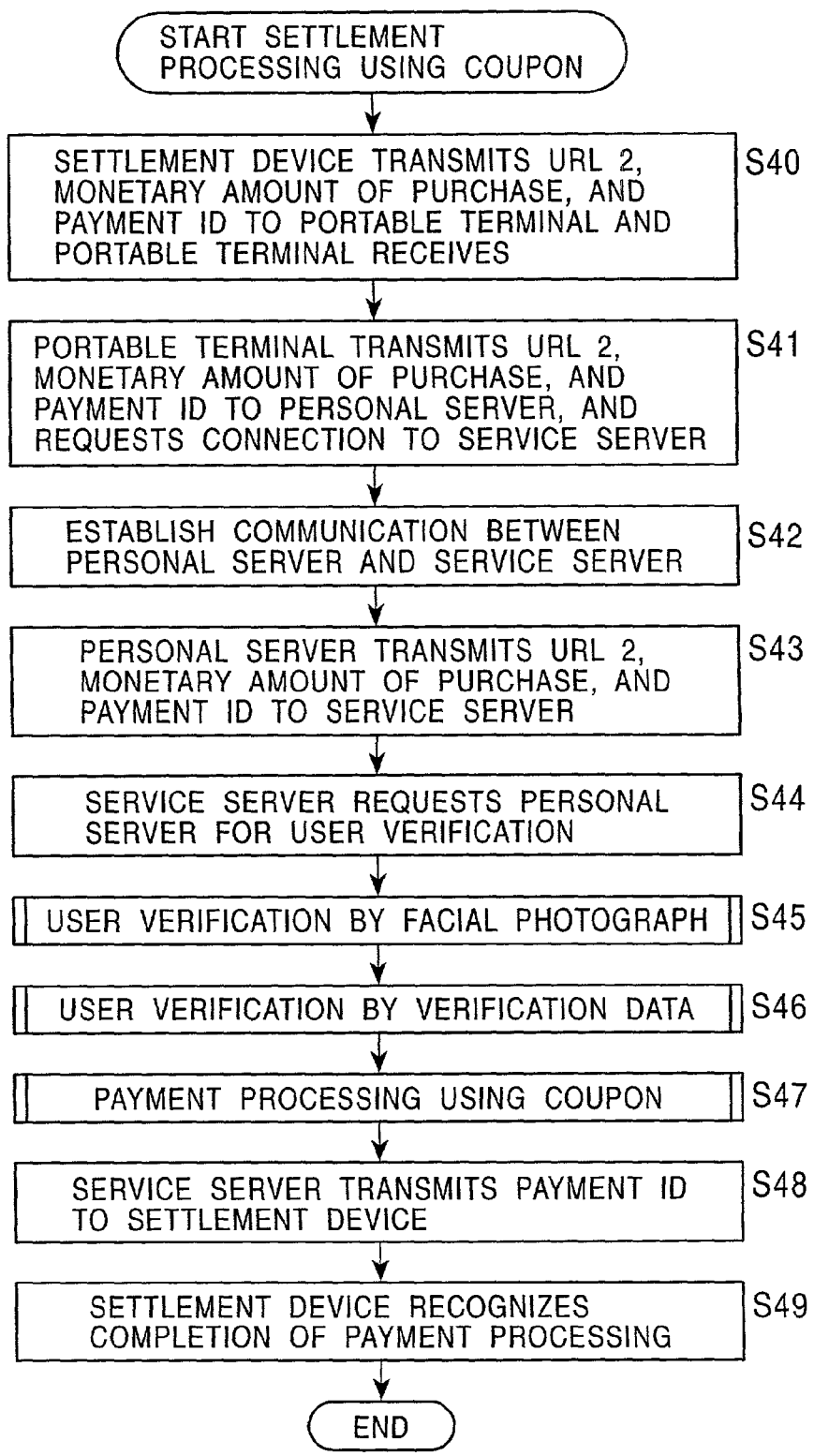
FIG. 10 is a flowchart describing settlement processing using coupons.

The processing in steps S40 through S46, S48, and S49 in FIG. 10 are the same as the processing in steps S1 through S7, S9, and S10 in FIG. 6, so description thereof will be omitted.

Figure 11:
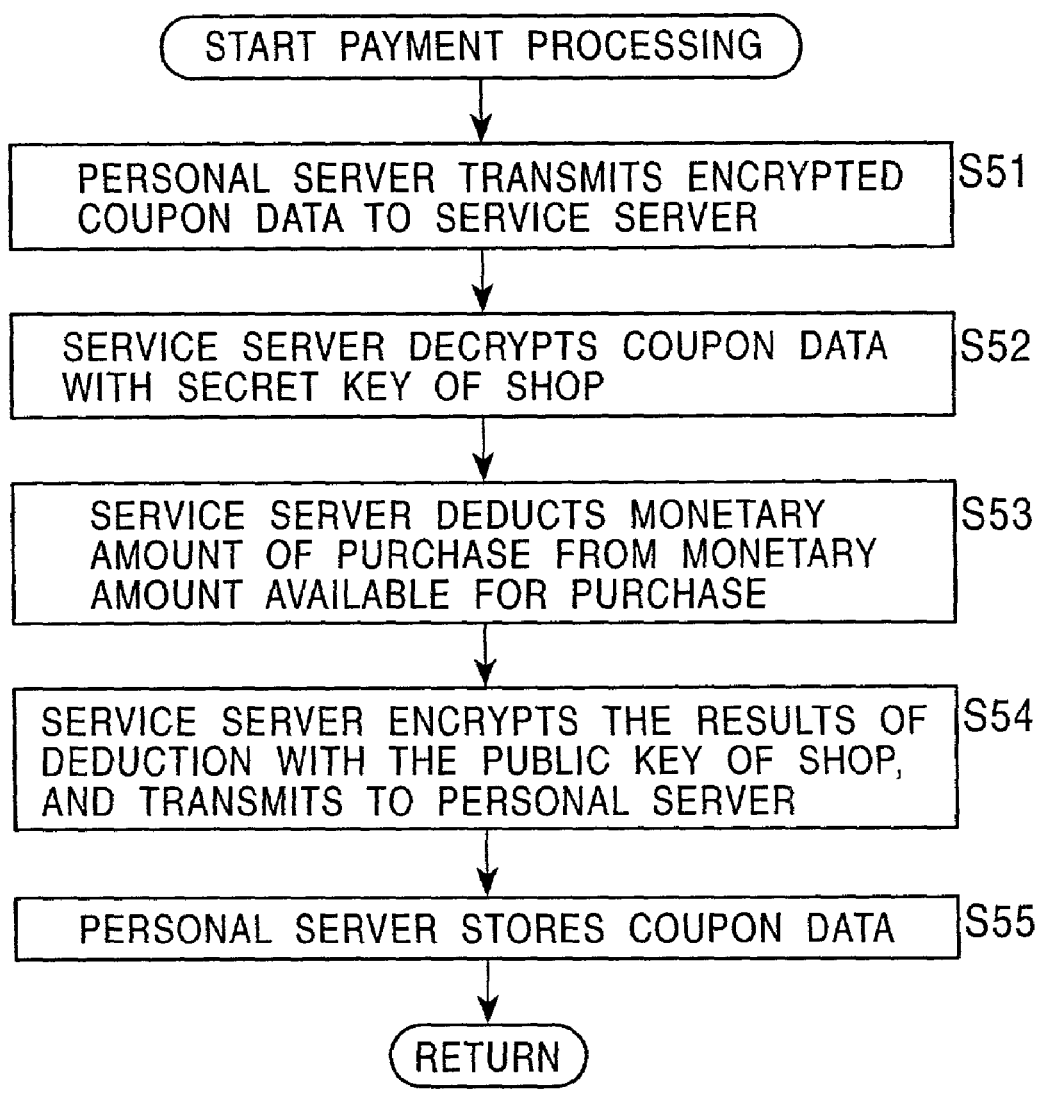
FIG. 11 is a flowchart describing the processing of step S47 in FIG. 10.

In step S47, payment processing by coupon is carried out. The details of the processing are illustrated in the flowchart shown in FIG. 11.

In step S51, the personal server 5 transmits the coupon data encrypted with the public key of the service server 6-1 to the service server 6-1. The service server 6-1 receives this.

Next, in step S52, the service server 6-1 decrypts the encryption of the coupon data received in step S51, using its own secret key. In this case, the service server 6-1 has its own secret key and public key beforehand.

In step S53, the service server 6-1 subtracts the monetary amount of the purchase, received in step S43, from the monetary amount available for purchasing which is indicated in the coupon data.

Next, in step S54, the service server 6-1 encrypts the results of subtraction using the public key of the personal server 5, generates (updates) the coupon data, and transmits the data to the personal server 5. The personal server 5 receives this.

In step S55, the personal server 5 stores the coupon data received in step S54, as personal information of the user A.

Subsequently, the processing ends, and the flow proceeds to step S48 in FIG. 9. Thus, payment is carried out using the coupon.

Now, while the embodiment shown in FIG. 6 has been described with reference to an embodiment where the user A takes merchandise to be purchased to a settlement device 3-1 (cash register) and pays the price for the monetary amount purchased that is calculated by the settlement device 3-1, the next embodiment will be described with reference to settlement processing where the merchandise is too bulky, for example, to be carried to the settlement device 3.

Figure 12:
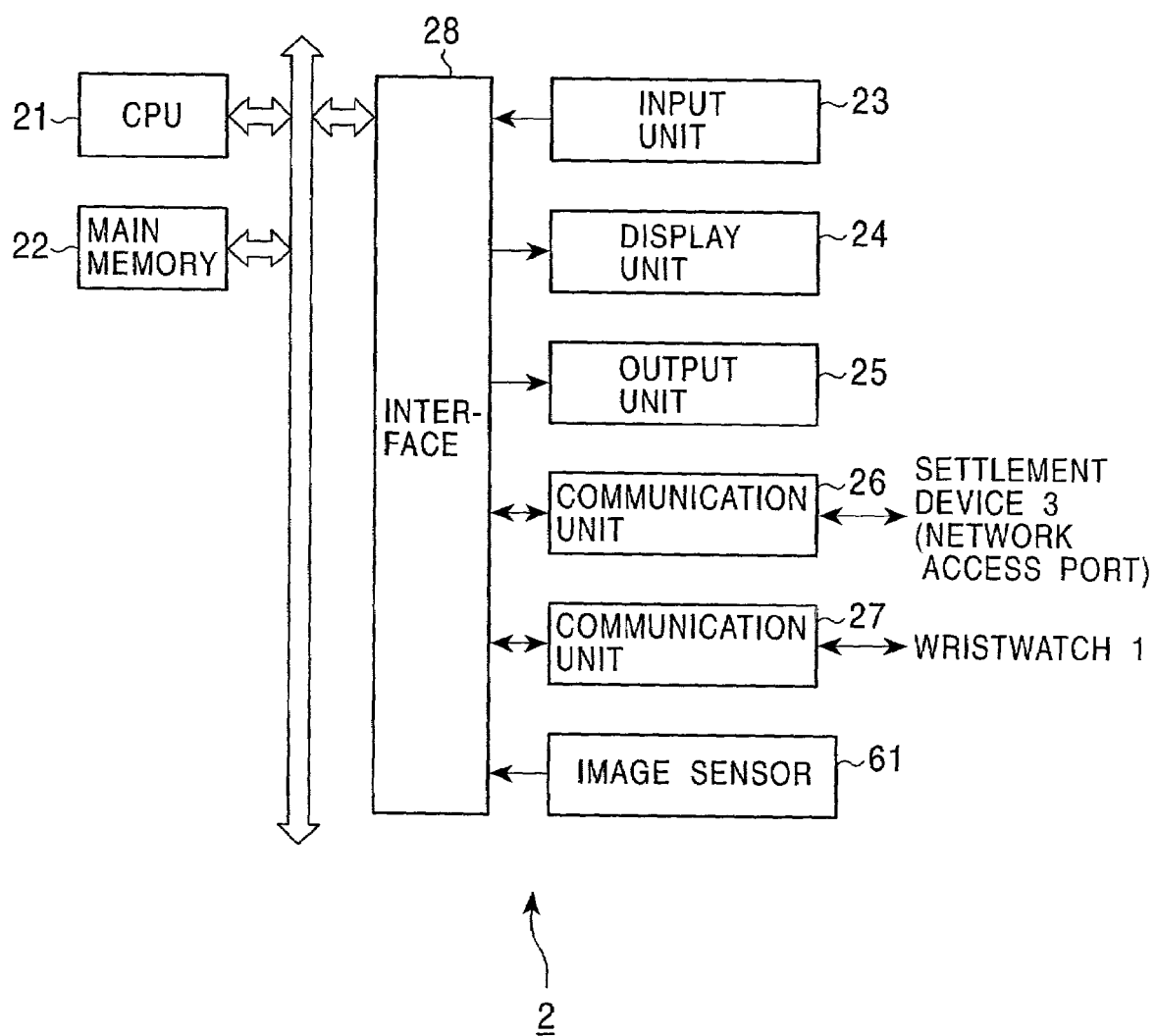
FIG. 12 is a block diagram illustrating another embodiment of the portable terminal 2.

FIG. 12 illustrates an embodiment of a portable terminal 2 used in this case. Note that the components in the figure which correspond to components in FIG. 3 are denoted with the same reference numeral, and description thereof will be omitted.

In general, this portable terminal 2 is an embodiment of the portable terminal 2 shown in FIG. 3 further provided with an image sensor 61.

The image sensor 61 is a sensor which obtains a URL 2 attached to merchandise or the like (e.g., a URL 2 attached to a tag on the merchandise), as image data. The CPU 21 recognizes the URL 2 from the image data obtained by the image sensor 61.

Next, the procedures for the settlement processing will be described with reference to the flowchart shown in FIG. 13. Note, a network access port (not shown) is installed near the merchandise with the URL 2 attached.

In step S61, the portable terminal 2 (CPU 21) obtains the URL 2 attached to the merchandise from the image data obtained by the image sensor 61.

Next, in step S62, the portable terminal 2 transmits the URL 2 obtained in step S61 and signals, indicating purchasing of the merchandise, the personal server 5 via an network access port (not shown) and the network 4, and requests communication with the service server 6-1 which manages the URL 2.

Note, the actions of the portable terminal 2 in steps S61 or S62 are preferably performed according to certain operations of the user A on the portable terminal 2. Also, the user A (the portable terminal 2) is close enough to the network access port, thereby allowing short-range communication between the portable terminal 2 and the network access port.

In step S63, communication between the personal server 5 and the service server 6-1 is established. In step S64 the personal server 5 transmits signals indicating purchasing of merchandise specified by the URL 2 to the service server 6-1. The service server 6-1 receives this.

In step S65, the service server 6-1 requests the personal server 5 for user verification. The personal server 5 recognizes the request.

In step S66, user verification by verification data is performed. The processing here is performed in a similar manner to the processing described in step S7 in FIG. 6, so description thereof will be omitted.

Once the user A is verified as being a valid user in step S66, the service server 6-1 transmits merchandise information indicated by the URL 2 (e.g., pricing information, product introduction information, and the like) to the personal server 5 as indicated in step S67. The personal server 5 receives these and transmits to the portable terminal 2. The portable terminal 2 receives these.

In step S68, the portable terminal 2 recognizes whether or not the merchandise will be purchased. Specifically, the CPU 21 of the portable terminal 2 displays the merchandise information received in step S67 on the display unit 24. The user A judges whether or not the purchase the merchandise, based on the merchandise information displayed on the display unit 24, and performs an operation corresponding to the judgement results, at the input unit 23. Thus, the CPU 21 recognizes whether or not the merchandise is to be purchased.

Once the operations for purchasing the merchandise are performed at the input unit 23 of the portable terminal 2 by the user A, payment processing is carried out in step S69. The processing here is similar to that described in step S8 in FIG. 6, so description thereof will be omitted.

Now, for example, if the price of merchandise changes within a short time, such as with an auction, the processing in steps S67 and S68 are repeatedly executed, so the user can make reference to the ever-changing merchandise prices and determine purchasing of the merchandise. Also, at this time, the user A may operate the input unit 23 of the portable terminal 2 and input a bid, for example, to participate in the auction.

Also, the embodiment shown in FIG. 13 has been described with reference to settlement processing where the URL 2 is obtained from image data obtained by the image sensor 61, but if a barcode indicating the URL 2 (including two-dimensional codes) is attached to the merchandise, the portable terminal 2 may have a code reader or the like to read the URL 2.

Also, if the URL 2 is intermittently contained in the audio promoting the merchandise at an inaudible bandwidth, the portable terminal 2 may take in the audio with a microphone 52 (FIG. 9) and extract the URL 2. Further, if the URL 2 is output by infrared rays, the portable terminal 2 may have an infrared ray sensor and extract the URL 2 from the infrared rays received by the infrared ray sensor, or, if the URL 2 is output by from a predetermined transmitting device a high frequencies, the portable terminal 2 may have a high-frequency antenna and extract the URL 2 from the high-frequency airwaves received by the high-frequency antenna.

Figure 13:
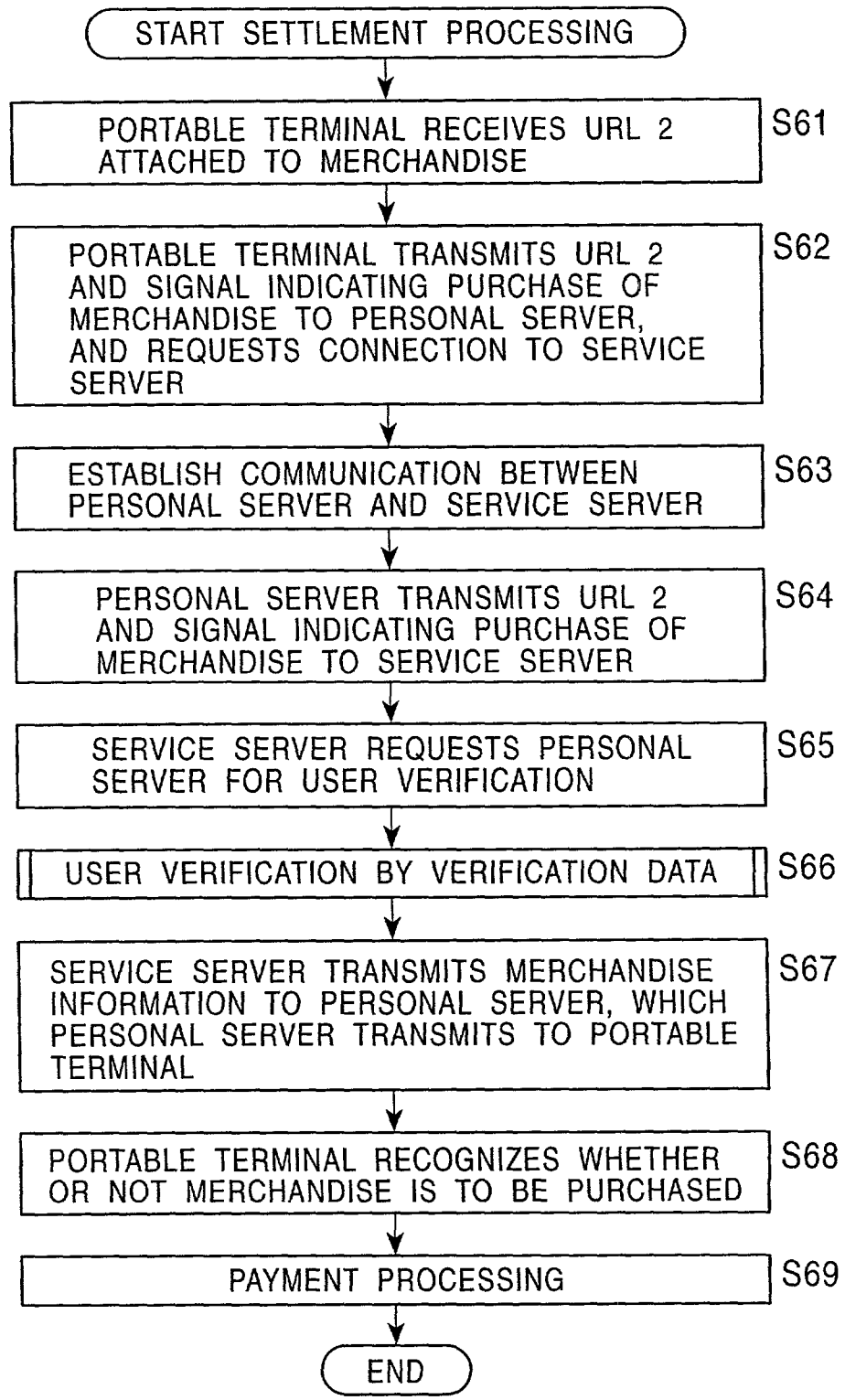
FIG. 13 is another flowchart describing settlement processing.
Figure 14:
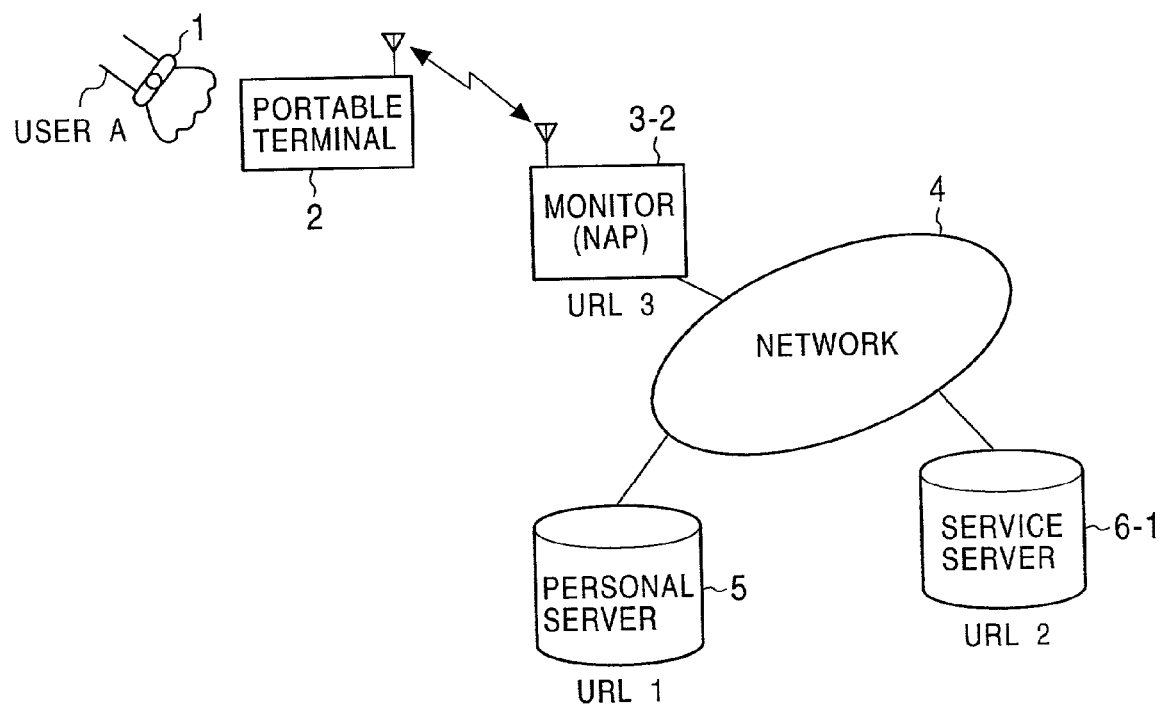
FIG. 14 is a diagram illustrating another embodiment of a service providing system according to the present invention.

Also, the embodiment shown in FIG. 13 has been described with reference to a where settlement processing the merchandise information is displayed on the display unit 24 of the portable terminal 2, but in cases where the information is better displayed on a larger screen or the like, the merchandise information may be displayed on a monitor 3-2 serving as a network access port installed near the merchandise, as shown in FIG. 14. Note that in the present specification, devices having functions to serve as a network access port as to the portable terminal 2 are denoted by "3-", and the configuration thereof is basically the same as the configuration of the settling device 3-1 (shown in FIG. 4).

In this embodiment, basically the same processing as that shown in the flowchart in FIG. 13 is performed, but in the processing equivalent to step S62, the portable terminal 2 transmits the URL of the monitor 3-2 (a URL 3) to the personal server 5 along with the URL 2 and the signals indicating purchasing of the merchandise. Thus, prior to this processing, the user confirms the URL 3 on the monitor 3-2 displayed in a visible manner (e.g., attached to the monitor 3-2), and inputs this to the input unit 23 of the portable terminal 2.

Accordingly, in the processing equivalent to step S67, the service server 6-1 transmits merchandise information and the like to the monitor 3-2. The monitor 3-2 receives, and displays this.

Also, according to such an embodiment, if the service server 6-1 is to distribute contents (music pieces or picture data), for example, the user A can purchase the contents, and have the contents transmitted to his/her own player (e.g., audio device or monitor) for listening or viewing. Also, this may be transmitted to the personal server 5 rather than a player and stored there, for the user A to use at a later time.

Also, if the service server 6-1 is to provide music piece data as contents, the URL 2 of the contents may be included in promotional playings of the music piece performed as one method of promotion (e.g., playing the music in stores or over the radio), so that if the user A listens to the promotional playing and wants to purchase the piece, the user A can operate the portable terminal 2 such that the music piece is read in from a microphone (the microphone 52) and the URL 2 thereof is obtained. Thus, the contents can be supplied to the player or personal server 5.

Also, the embodiment shown in FIG. 13 has been described with reference to a where settlement processing the merchandise information which the service server 6-1 has is displayed on the monitor 3-2, but an arrangement may be made wherein the monitor 3-2 has the information.

Also, the embodiment shown in FIG. 13 has been described with reference to a settlement processing where a URL 2 of one product is obtained and payment is made. However, an arrangement may be made where the user A receives the URL 2 (the URL which is unique to each product) for multiple products in which the user A is interested but has not decided to purchase at this point. Preferably, user A also receives merchandise information while going along, so as to make reference to the merchandise information at a later time and ultimately decide on the merchandise to purchase.

The personal server 5 stores (in cache) merchandise information that has been provided, and if there is a request from the portable terminal 2, the personal server 5 transmits the merchandise information that has been requested to the portable terminal 2. Thus, there is no need to access the service server 6-1 again regarding the information which the personal server 5 stores, so necessary information can be readily viewed, and communication costs can be conserved. Also, an arrangement may be made wherein the portable terminal 2 performs Web browsing or the like of the service server 6-1 via the personal server 5, and the personal server 5 caches operational information at the time of viewing a certain page, so that this can be used for viewing the same page again. Thus, the user can reach the same page in a shorter time.

Also, in addition to the personal server 5, the portable terminal 2 may also cache data. However, in the case of caching personal information, this information may be leaked to a third party if the portable terminal 2 is lost. Thus, when transmitting such personal information to the portable terminal 2, the personal server 5 attaches a tag to the personal information to the effect that caching of the personal information is forbidden. Thus, personal information transmitted from the personal server 5 is not cached in the portable terminal 2, so even if the portable terminal 2 is lost, personal information contained in the lost portable terminal 2 can be prevented from falling into the hands of a third party.

Also, there is a limit to the amount of information that can be stored in the personal server 5, and if this limit is exceeded, information stored therein must be deleted. At this time, the personal server 5 deletes data that is not bookmarked or data that is not linked to a bookmarked page (i.e., with higher priority). Also, if there is further need to delete information, the personal server 5 establishes an order of priority for the bookmarks, and deletes those with lower priority.

Figure 15:
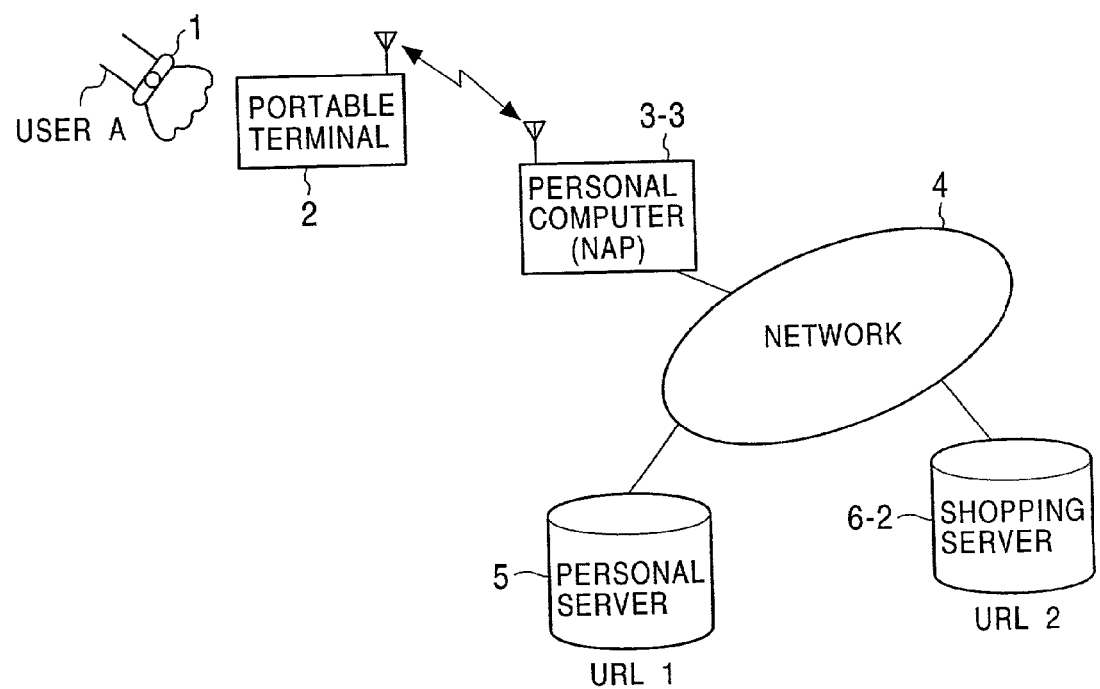
FIG. 15 is a diagram illustrating another embodiment of a service providing system according to the present invention.

FIG. 15 illustrates another embodiment of a service providing system according to the present invention. In general, the user A uses a personal computer 3-3 as a browsing device and as a network access port for the portable terminal 2, to conduct network shopping with a shopping server 6-2. Note that in the present specification, devices having functions to serve as servers providing services are denoted by "6-", and the configuration thereof is basically the same as the configuration of the personal server 5 (shown in FIG. 5).

Figure 16:
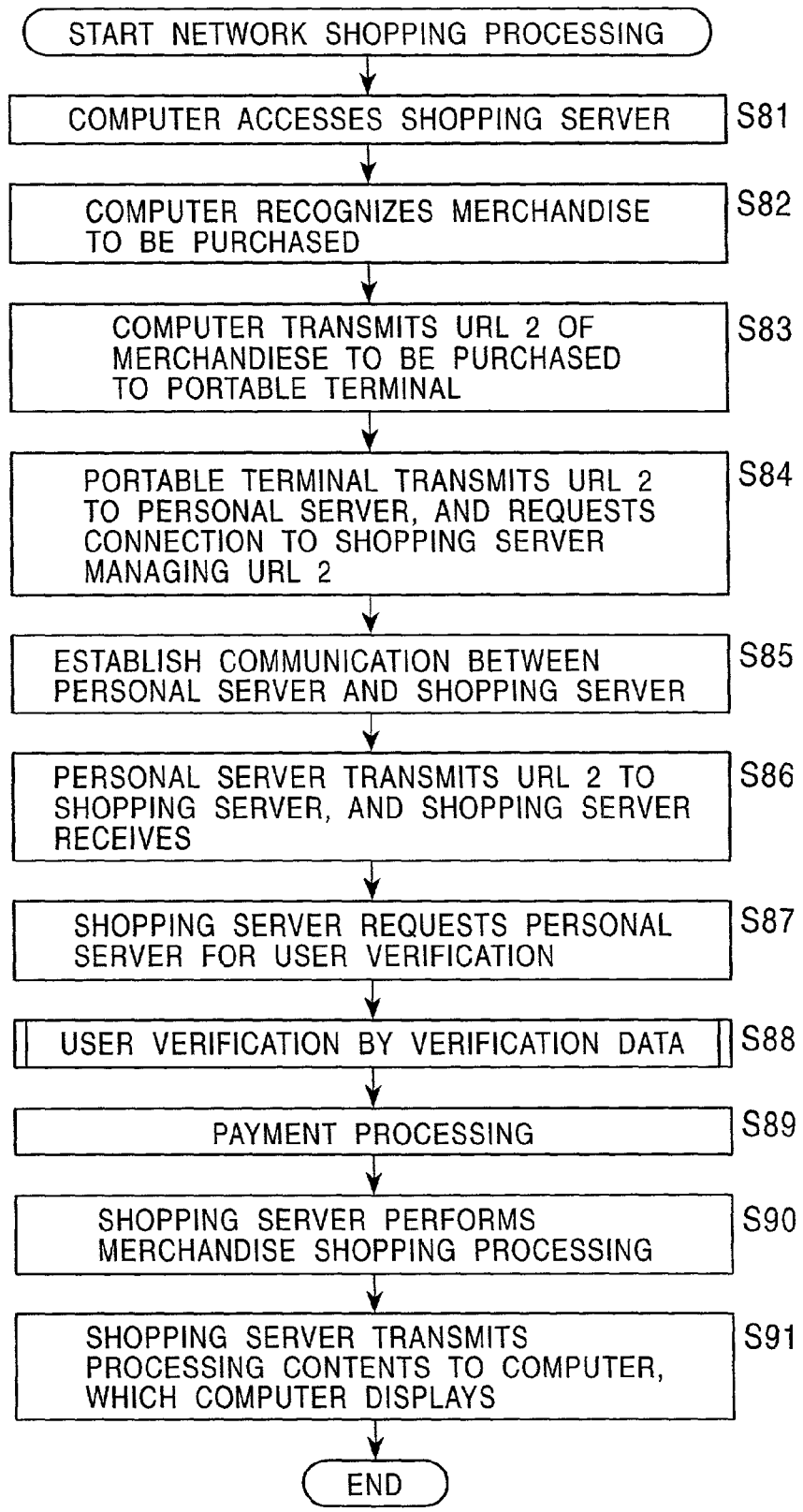
FIG. 16 is a flowchart describing network shopping processing.

The processing procedures for performing network shopping are illustrated in the flowchart shown in FIG. 16.

In step S81, the personal computer 3-3 accesses the shopping server 6-2 via the network 4. In step S82, the personal computer 3-3 recognizes the merchandise to be purchased, and in step S83, transmits the URL thereof (URL 2) to the portable terminal 2. The portable terminal 2 receives this. At this time, the user A (portable terminal 2) is close enough to the personal computer 3-3 that rearrange communication between the portable terminal 2 and the personal computer 3-3 can be made.

Note that the actions of the personal computer 3-3 in steps S81 through S83 are performed according to certain operations of the user A on the personal computer 3-3 on the keyboard or the like, for example.

Next, in step S84, the portable terminal 2 transmits the URL 2 received in step S83 to the personal server 5 via the personal computer 3-3 and the network 4, and request communication with the shopping server 6-2 managing the URL 2. The personal server 5 receives the URL 2 and recognizes the request.

In step S85, communication between the personal server 5 and the shopping server 6-2 is established. In step S86 the personal server 5 transmits the URL 2 to the shopping server 6-2. The shopping server 6-2 receives this.

Next, in step S87, the shopping server 6-2 requests the personal server 5 for user verification. The personal server 5 recognizes the request.

In step S88, user verification by verification data is performed. The processing performed in step S88 is performed in a similar manner to the processing performed in step S7 in FIG. 6, so description thereof will be omitted.

Once the user A is verified as being a valid user in step S88, payment processing is performed in step S89. The processing performed in step S89 is substantially similar to the processing performed in step S8 in FIG. 6, with the monetary amount information or the like of the merchandise indicated by the URL 2 being transmitted from the shopping server 6-2 to the personal server 5, and the personal server 5 performs transfer processing according to that monetary amount.

Once the payment processing is completed in step S89 (i.e., payment is concluded), processing for shipping the merchandise is performed in step S90. Specifically, the shopping server 6-2 obtains from the personal server 5 the address of the user A as a shipping destination, for example, and transmits this to another server (not shown) which manages the shipping (hereinafter referred to as "shipping server"). A deliverer delivers the merchandise purchased by the user A to the shipping destination obtained from the shipping server.

In step S91, the shopping server 6-2 transmits the contents of the shipping processing to the personal computer 3-3, which the personal computer 3-3 receives and displays. Thus, the user A can confirm that the shipping procedures have been completed (e.g., that the shipping address has been determined).

The shipping server is arranged to, for example, periodically provide delivery status (e.g., the date of shipping and the delivery center where the merchandise currently is) to the personal server 5, so the user A can make reference to this information using the portable terminal 2.

Also, if the shipping destination is not stored in the personal server 5 as personal information, the user A can notify the shopping server 6-2 of the desired shipping destination, by operating the portable terminal 2. Further, if the user A wants to specify a destination other than his/her address, abstract specifications such as "the convenience store closest to my house" may be made as well. Thus, the shopping server 6-2 searches for the convenience store closest to the house of the user A based on the address of the user A obtained from the personal server 5, and notifies the shipping server of that shipping destination.

Also, the embodiment shown in FIG. 16 (FIG. 15) has been described with reference to a system where a user conducts network shopping with a personal computer 3-3, but the personal computer 3-3 is not restricted to a computer owned by the user A. For example, system providing businesses might install personal computers 3-3 (network access ports) in restaurants or on the street, for example, so that the user A can use such personal computers 3-3 and receive services such as described above.

Figure 17:
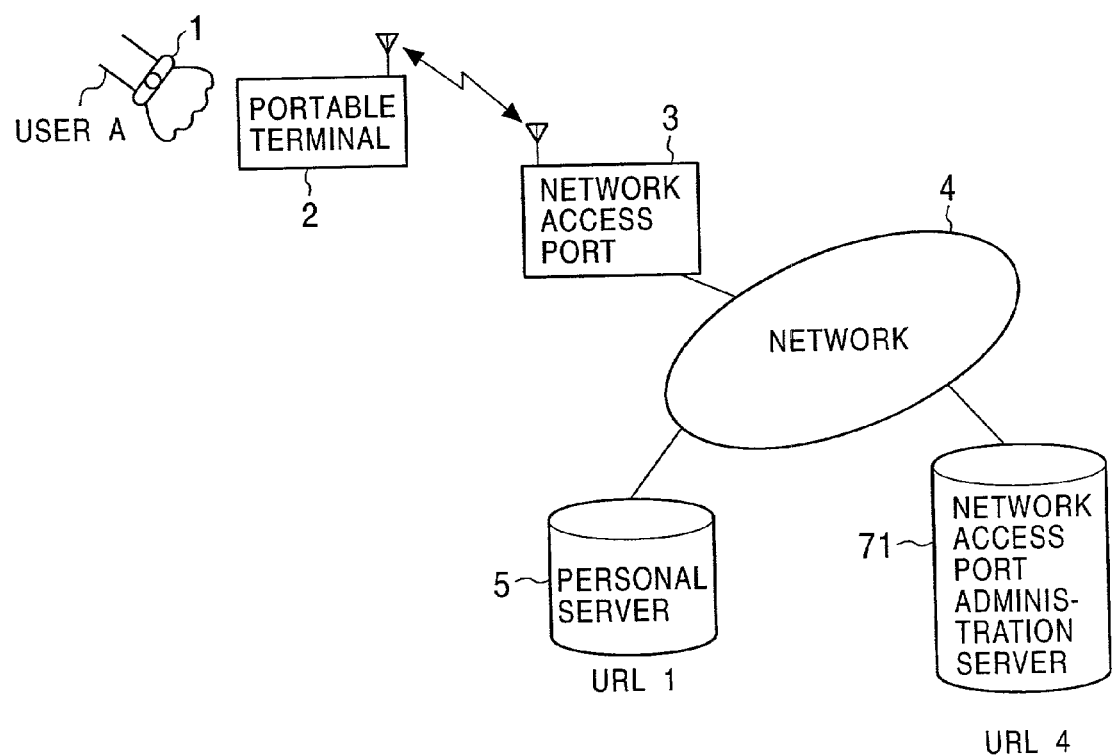
FIG. 17 is a diagram illustrating another embodiment of a service providing system according to the present invention.

However, there is the need to invoice the user A using the network access port for the usage fees or the like of the service providing system. FIG. 17 illustrates a network access port administration server 71 (hereinafter referred to as "administration server") which manages usage fees of the service providing system. The administration server 71 communicates with the network access port 3 and personal server 5 via the network 4, and executes settlement processing for usage fees determined by a URL 4.

Figure 18:
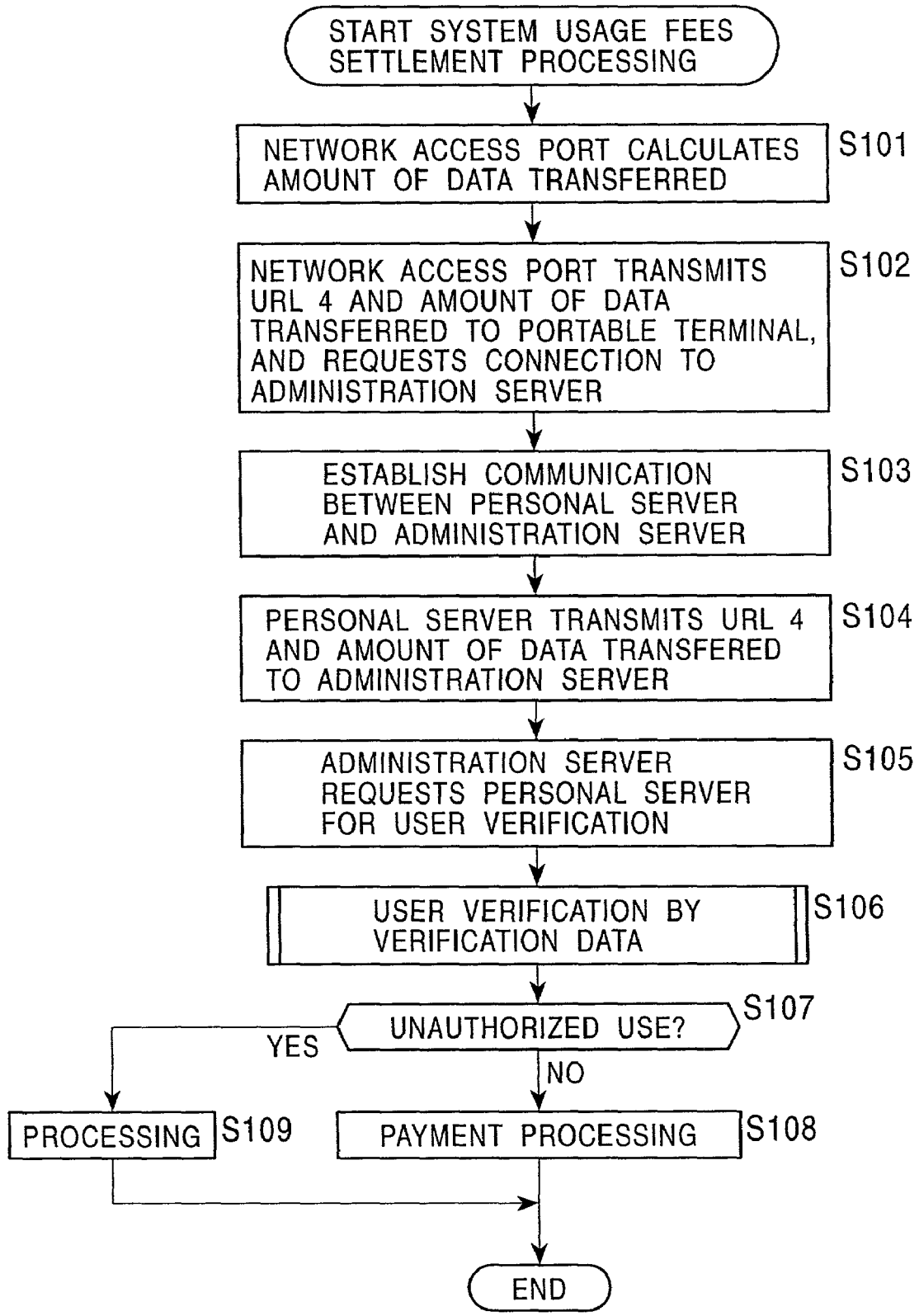
FIG. 18 is a flowchart describing settlement processing for system usage fees.

Next, the procedures for settlement processing of usage fees of the service providing system will be described with reference to the flowchart shown in FIG. 18.

In step S101, the network access port 3 calculates the amount of data transferred in a series of transactions (e.g., the amount of data transferred to the portable terminal 2 or personal server 5).

Next, in step S102, the network access port 3 transmits the amount of data transferred that has been calculated in step S101, the URL 4, and information indicating its own location (location information) to the personal server 5, and requests communication with the administration server 71 which executes processing identified by the URL 4. The personal server 5 receives the data, and recognizes the request. The personal server 5 stores the received location information as personal information of the user A. Also, the network access port 3 holds the URL 4.

In step S103, communication between the personal server 5 and the administration server 71 established. In step S104 the personal server 5 transmits the location information URL 4, and amount of data transferred, received in step S102, to the administration server 71. The administration server 71 receives these.

Next, in step S105, the administration server 71 requests the personal server 5 for user verification. In step S106, the personal server 5 performs user verification by verification data. The processing performed in step S106 is similar to the processing performed in step S7 in FIG. 6, so description thereof will be omitted.

Once the user A is verified in step S106, the flow proceeds to step S107 where the administration server 71 judges whether or not the network access port 3 is being used in an unauthorized manner, based on the location information received in step S104.

For example, if the area of usage is restricted in the contract of the user A, and the location information indicates an area outside of the contract area, this is judged as being unauthorized use (use outside of the contract). Also, if access has been made from two network access ports that are separated by a distance that could not conceivably be traversed in the access interval (the time between accesses), this is judged as being unauthorized use.

If judgement is made in step S107 that the use is not unauthorized, the flow proceeds to step S108, and payment processing is performed. Specifically, the administration server 71 executes settlement processing identified by the URL 4. Thus, payment is made for the system usage fees corresponding to the amount of data transferred that has been calculated in step S101.

If judgement is made in step S107 that unauthorized use is being made, the flow proceeds to step S109, and predetermined processing is executed.

Following step S108 or S109, the processing ends. Description has been made with reference to an embodiment where the administration server 71 judges whether or not unauthorized use is being made based on location information of the network access port 3, but an arrangement may be made where, for example, the above-described service server 6-1 obtains location information of the settlement device 3-1, and judgment is made regarding whether or not unauthorized use is being made of the settlement device 3-1.

Figure 19:
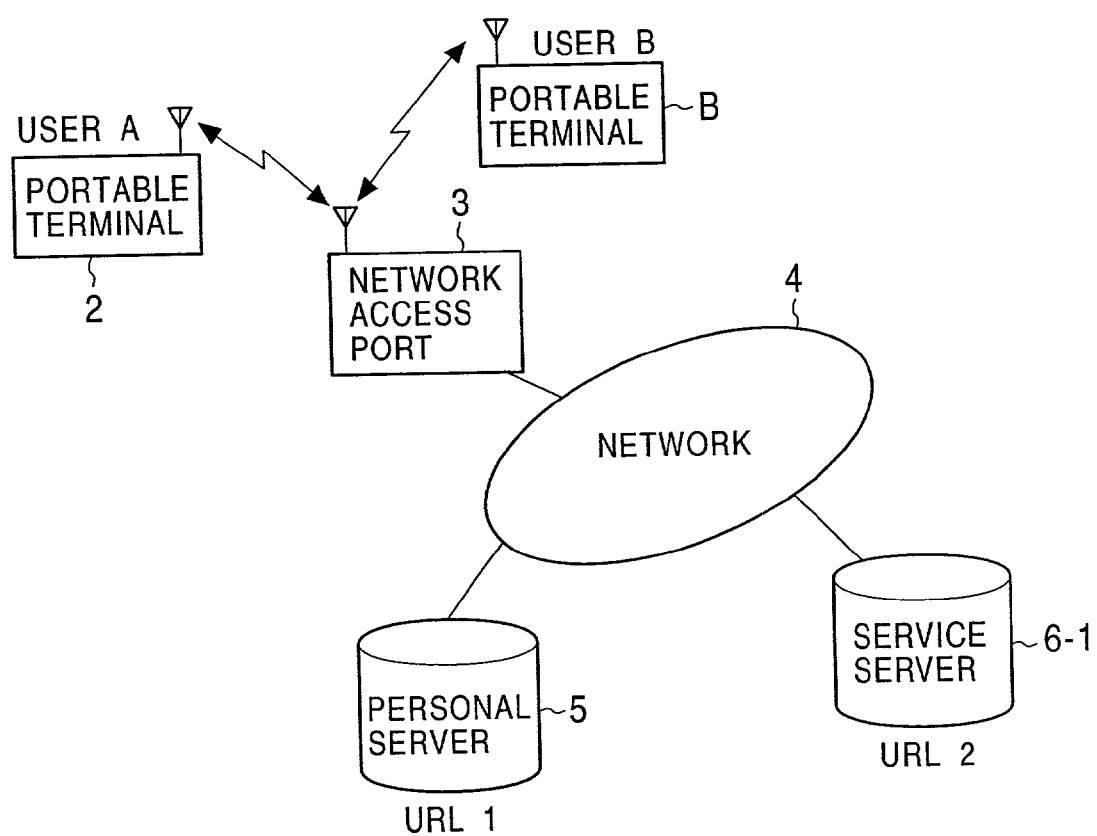
FIG. 19 is a diagram illustrating another embodiment of a service providing system according to the present invention.

Although the embodiments shown in FIGS. 1, 14, 15, and 17 have been described regarding the user of one user A, in reality, other users (user B) may use the system with other portable terminals B, as shown in FIG. 19. Thus, the personal server 5 manages the personal information of many users, based on the URL 1 of each.

Now, the processing procedures for a user B to use contents which a user A has purchased and are managed as personal information of the user A in the personal server 5, will be described.

If notification is made from the portable terminal 2 or the portable terminal B to the effect that user B will use predetermined contents which the user A has purchased, the personal server 5 transmits the location (address) where the contents are stored, to the portable terminal B. The portable terminal B receives and stores this. If the user B desires to use the contents, the user B operates the portable terminal B, and obtains the contents according to the earlier-stored address.

Thus, the personal server 5 does not need to hold contents in a redundant manner (i.e., does not need to hold the same contents, separate, as personal information for both user A and user B). Also, the portable terminal B does not need to hold the contents until the user B actually uses the contents. Thus, the personal server 5 and the portable terminal B can hold the contents in an efficient manner.

The purchased contents and the like can be transferred over the network 4 as described above, and thus are stored in the personal server 5 as information that can be transferred, but information such as the address, telephone number, etc., of the user is not normally transferred, and accordingly is saved in the personal server 5 as information that cannot be transferred.

Figure 20:
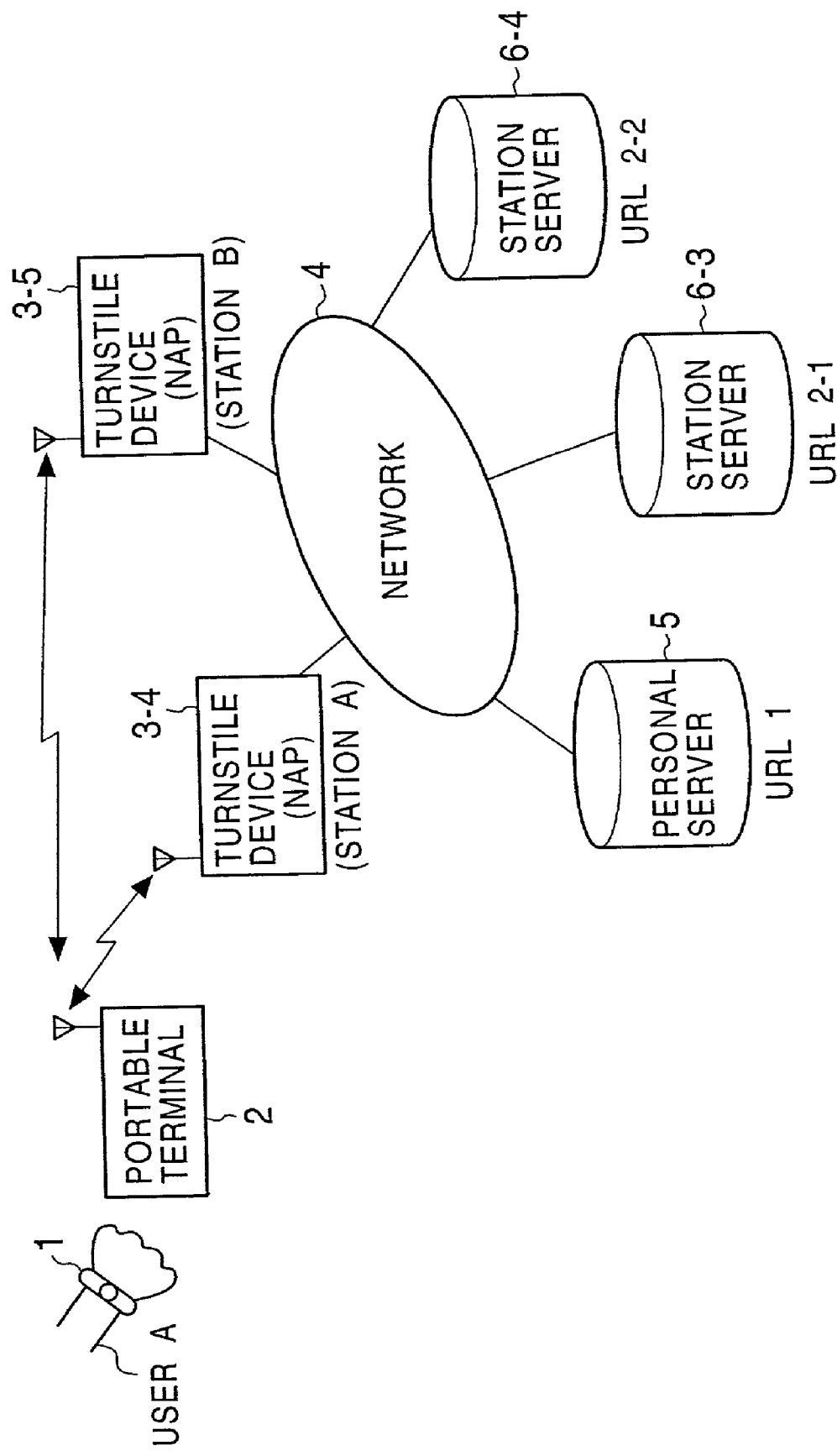
FIG. 20 is a diagram illustrating another embodiment of a service providing system according to the present invention.

FIG. 20 illustrates another embodiment of a service providing system according to the present invention. In general, the service providing system is used to handle tickets at a train station.

A turnstile device 3-4 is a turnstile device installed at the turnstiles at a train station A where the user A gets on, and a turnstile device 3-5 is a turnstile device installed at the turnstiles at a train station B where the user A gets off. Both turnstile devices 3-4 and 3-5 function as network access ports, so as to communicate with a station server 6-3 and a station server 6-4.

The station server 6-3 executes processing functions for managing information relating to ticket-taking at the turnstile device 3-4 of the station A identified by a URL 2-1, and the station server 6-4 executes processing functions for managing information relating to ticket-discharging at the turnstile device 3-5 of the station B identified by a URL 2-2.

Next, the procedures for ticket-taking processing will be described with reference to the flowchart shown in FIG. 21.

In step S111, the turnstile device 3-4 at station A transmits the URL 2-1, the time of ticket-taking, and the ID of the station A, to the portable terminal 2. The portable terminal 2 receives these. At this time, the user A (portable terminal 2) is close enough to the turnstile device 3-4 that short-range communication between the portable terminal 2 and the turnstile device 3-4 can be made.

Next, in step S112, the portable terminal 2 transmits the URL 2-1, the time of ticket-taking, and the ID of the station A, obtained in step S111, to the personal server 5, via the turnstile device 3-4 and the network 4, and request communication with the station server 6-3 executed by processing identified by the URL 2-1. The personal server 5 receives the data transmitted from the portable terminal 2, and recognizes the request. The personal server 5 stores the received data as personal information of the user A.

Describing the processing in step S112 more specifically, the CPU 21 of the portable terminal 2 displays the information received in step S111 on the display unit 24. The user A, upon confirming the information displayed on the display unit 24, makes predetermined operations at the input unit 23. Thus, the portable terminal 2 transmits the information received in step S111 to the personal server 5.

In step S113, communication between the personal server 5 and the station server 6-3 is established. In step S114, the personal server 5 transmits the ticket-taking time and ID of the station A received in step S112 to the station server 6-3 along with the URL 1. The station server 6-3 receives these.

Next, in step S115, the station server 6-3 requests the personal server 5 for user verification. The personal server 5 recognizes the request.

In step S116, user verification is performed by verification data. The processing performed in step S116 is similar to the processing performed in step S7 in FIG. 6, so description thereof will be omitted.

Once the user A is verified as being a valid user in step S116, flow proceeds to step S117 where the station server 6-3 stores the data received in step S114. Subsequently, the processing ends.

Figure 22:
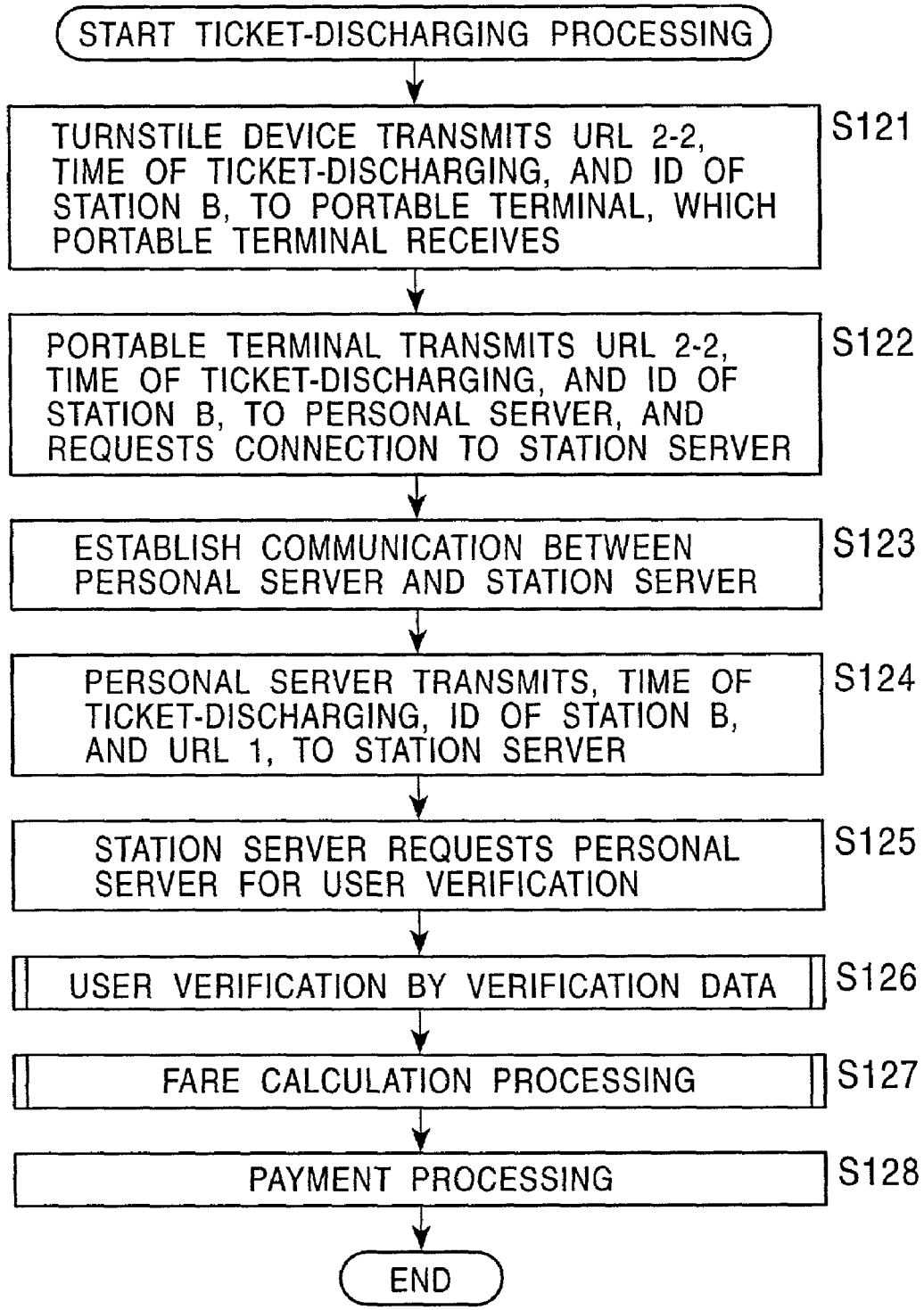
FIG. 22 is a flowchart describing ticket-discharging processing.

Next, the procedures for ticket-discharging processing will be described with reference to the flowchart shown in FIG. 22.

In step S121, the turnstile device 3-5 at station B transmits the URL 2-2, the time of ticket-discharging, and the ID of the station B, to the portable terminal 2. The portable terminal 2 receives these. At this time, the user A (portable terminal 2) is close enough to the turnstile device 3-5 that short-range communication between the portable terminal 2 and the turnstile device 3-5 can be made.

Next, in step S122, the portable terminal 2 transmits the URL 2-2, the time of ticket-discharging, and the ID of the station B, obtained in step S121, to the personal server 5, via the turnstile device 3-5 and the network 4, and requests communication with the station server 6-4 which executes processing identified by the URL 2-2. The personal server 5 receives the data transmitted from the portable terminal 2, and recognizes the request.

Describing the processing in step S122 more specifically, the CPU 21 of the portable terminal 2 displays the data received in step S121 on the display unit 24. The user A, upon confirming the information displayed on the display unit 24, makes predetermined operations at the input unit 23. Thus, the portable terminal 2 transmits the information received in step S121 to the personal server 5.

Communication between the personal server 5 and the station server 6-4 is established in step S123. In step S124, the personal server 5 transmits the ticket-discharging time and ID of the station B received in step S122 to the station server 6-4 along with the URL 1. The station server 6-4 receives these.

Next, in step S125, the station server 6-4 requests the personal server 5 for user verification. The personal server 5 recognizes the request.

In step S126, user verification is performed by verification data. The processing performed in step S126 is similar to the processing performed in step S7 in FIG. 6, so description thereof will be omitted.

Figure 23:
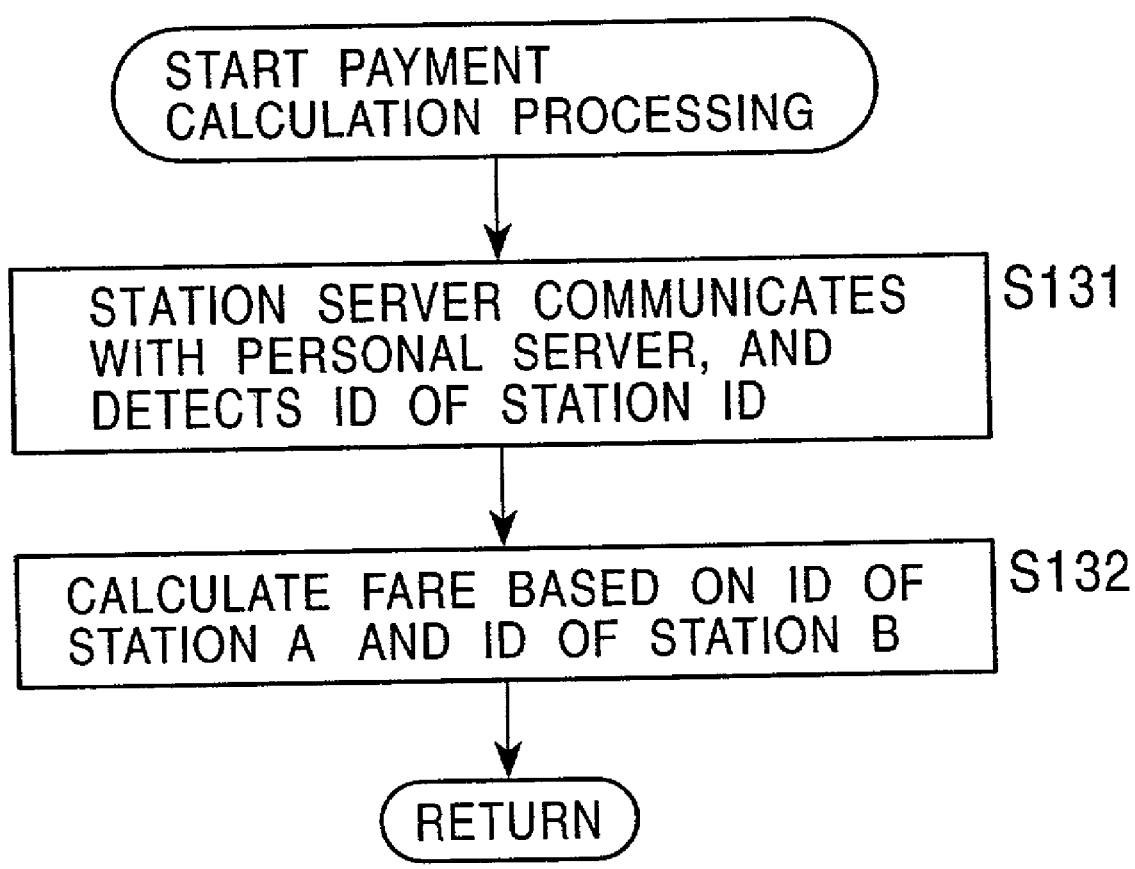
FIG. 23 is a flowchart describing the processing of step S127 in FIG. 22.

Once the user A is verified as being a valid user in step S126, flow proceeds to step S127 where fare calculation processing is performed, as illustrated in the flowchart shown in FIG. 23.

Figure 21:
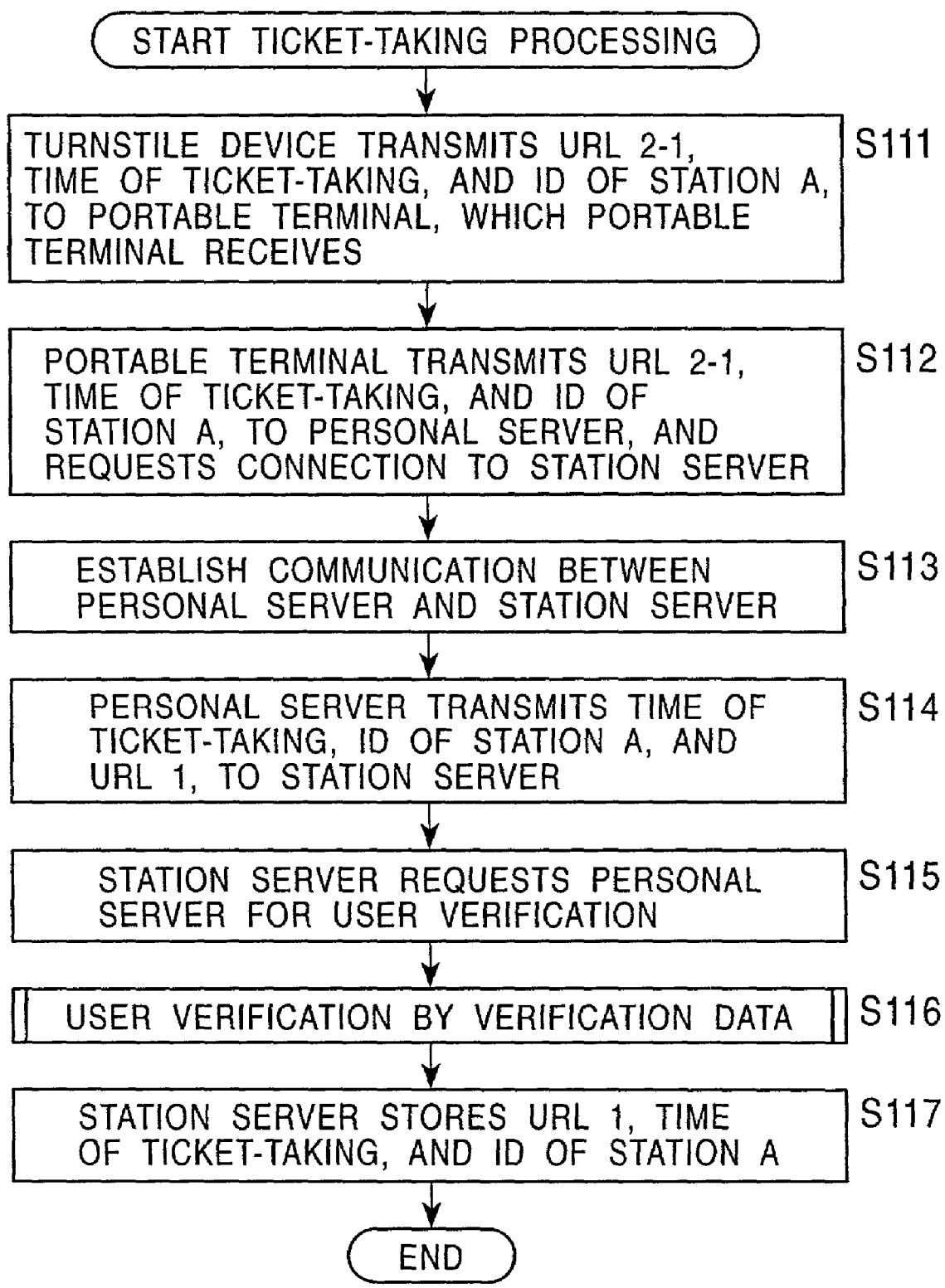
FIG. 21 is a flowchart describing ticket-taking processing.

In step S131, the station server 6-4 communicates with the personal server 5, and obtains the ID of the station A which is stored as the personal information of the user A (step S112 in FIG. 21).

In step S132, the station server 6-4 calculates the fare based on the ID of the station A obtained in step S131, and the ID of the station B obtained in step S124. Then, the process ends, and the flow proceeds to step S128 in FIG. 22.

In step S128, payment processing is performed. The station server 6-4 communicates the transfer destination of the fare calculated in step S127 to the personal server 5. The personal server 5 performs predetermined transfer processing to the destination server (not shown) that has been notified thereto. Subsequently, the processing ends.

Figure 24:
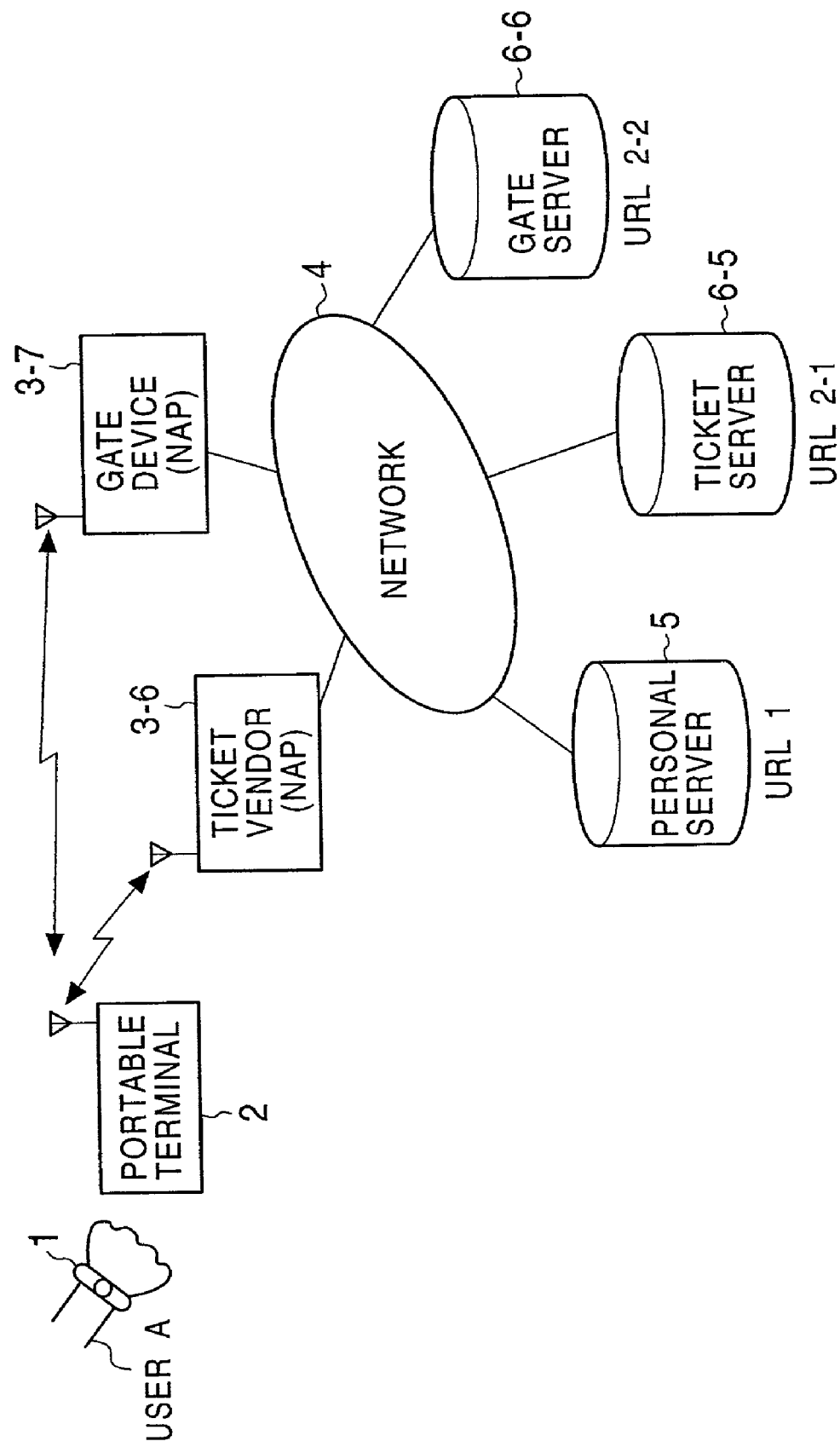
FIG. 24 is a diagram illustrating another embodiment of a service providing system according to the present invention.

FIG. 24 illustrates another embodiment of a service providing system according to the present invention. In general, the service providing system is used to perform ticket sales processing and turnstile processing (gate processing) for day passes at an amusement park.

A ticket vendor 3-6 is a device for selling tickets to the amusement park. A gate device 3-7 is a gate installed near predetermined attractions, and the user A must pass through a gate (not shown) of the gate device 3-7 to reach the attraction.

The ticket vendor 3-6 and the gate device 3-7 both have functions as network access ports, and communicate with a ticket server 6-5 and gate server 6-6 via the network 4.

The ticket server 6-5 executes processing functions for managing information relating to the sold tickets identified by the URL 2-1, and the gate server 6-6 executes processing functions for controlling opening and closing of the gate of the gate device 3-7 identified by the URL 2-2.

Next, the processing for ticket vending will be described with reference to the flowchart shown in FIG. 25.

In step S141, the ticket vendor 3-6 transmits the URL 2-1 and information relating to use of a day pass wherein the date that the ticket is valid is attached (hereinafter referred to as "ticket information") to the portable terminal 2. The portable terminal 2 receives these.

At this time, the user A performs operations for purchasing the day pass at the operating panel (not shown) of the ticket vendor 3-6. Also, the user A (portable terminal 2) is close enough to the ticket vendor 3-6 that short-range communication between the portable terminal 2 and the ticket vendor 3-6 can be made.

In step S142, the portable terminal 2 transmits the URL 2-1 received in step S141 and the ticket information to the personal server 5, and requests communication with the ticket server 6-5 which executes processing identified by the URL 2-1. The personal server 5 receives the data transmitted from the portable terminal 2, and recognizes the request.

Describing the processing in step S142 more specifically, the CPU 21 of the portable terminal 2 displays the information received in step S142 on the display unit 24. The user A, upon confirming the information displayed on the display unit 24, makes predetermined operations at the input unit 23. Thus, the portable terminal 2 transmits the information received in step S141 to the personal server 5, based on the operations thereof.

Communication between the personal server 5 and the ticket server 6-5 is established in step S143. In step S144 the personal server 5 transmits the ticket information received in step S142 to the ticket server 6-5 along with the URL 1. The ticket server 6-5 receives this.

Next, in step S145, the ticket server 6-5 requests the personal server 5 for user verification. The personal server 5 recognizes the request.

Next, in step S146, user verification is performed by verification data. The processing performed is step S146 is similar to the processing performed in step S7 in FIG. 6, so description thereof will be omitted.

Figure 26:
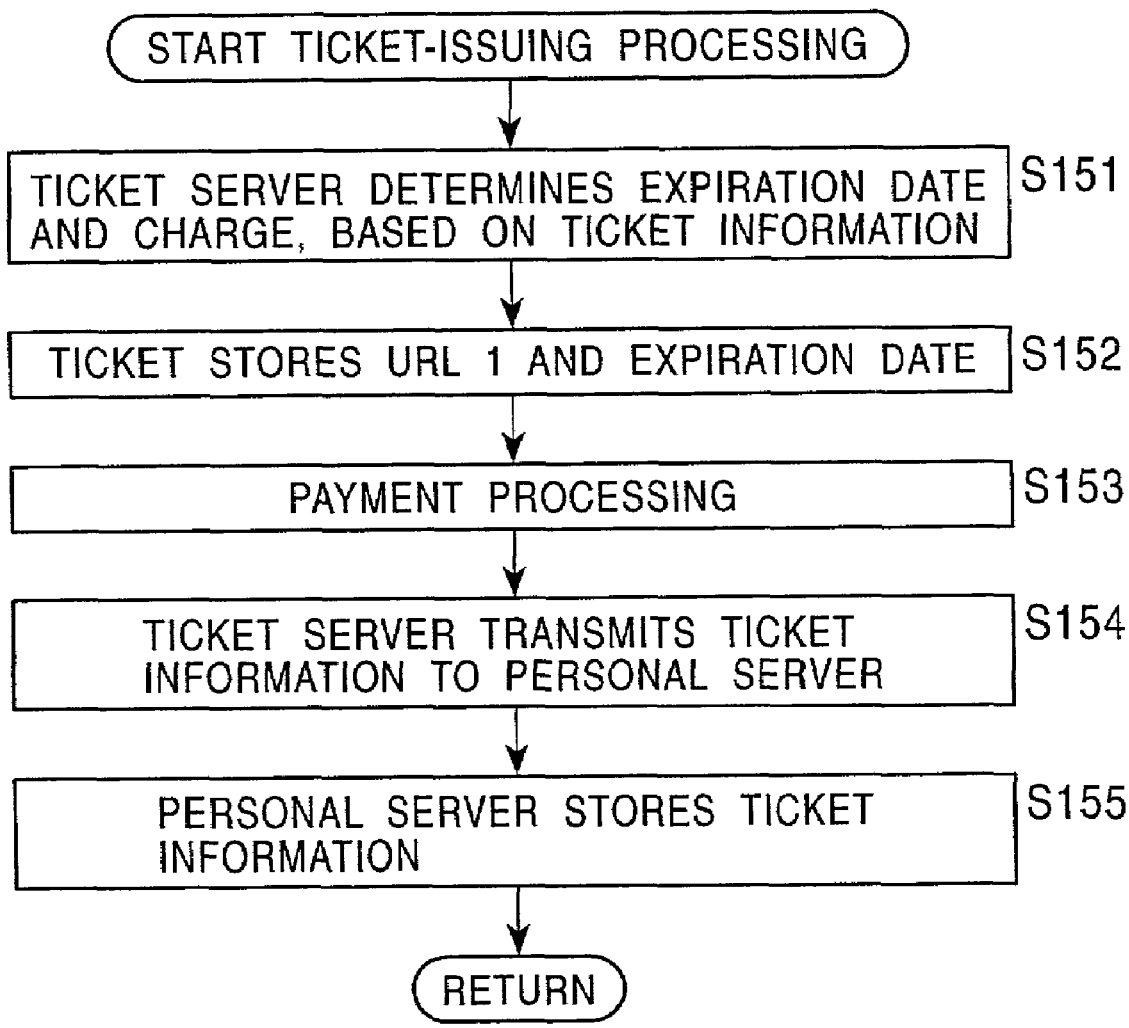
FIG. 26 is a flowchart describing the processing of step S147 in FIG. 25.

Once the user A is verified as being a valid user in step S146, flow proceeds to step S147 where ticket-issuing processing is performed, as illustrated in the flowchart shown in FIG. 26.

In step S151, the ticket server 6-5 determines the expiration date based on the ticket information received in step S144, and calculates the charges. In this embodiment, the ticket expires at the closing time of the amusement park today.

Next, in step S152, the ticket server 6-5 stores the expiration date determined in step S151 in a manner corresponding to the URL 1 received in step S144.

In step S153, payment processing is performed. The ticket server 6-5 communicates the transfer destination of the charges calculated in step S151 to the personal server 5. The personal server 5 performs predetermined transfer processing to the destination server (not shown) that has been notified thereto.

Once the payment processing in step S153 ends, in step S154 the ticket server 6-5 transmits ticket information made up of the expiration date or the like determined in step S151 to the personal server 5. The personal server 5 receives this.

In step S155, the personal server 5 stores the ticket information received in step S154 as personal information of the user A.

Subsequently, the processing ends, the flow returns to the flow shown in FIG. 25, and the ticket-issuing processing ends.

Figure 27:
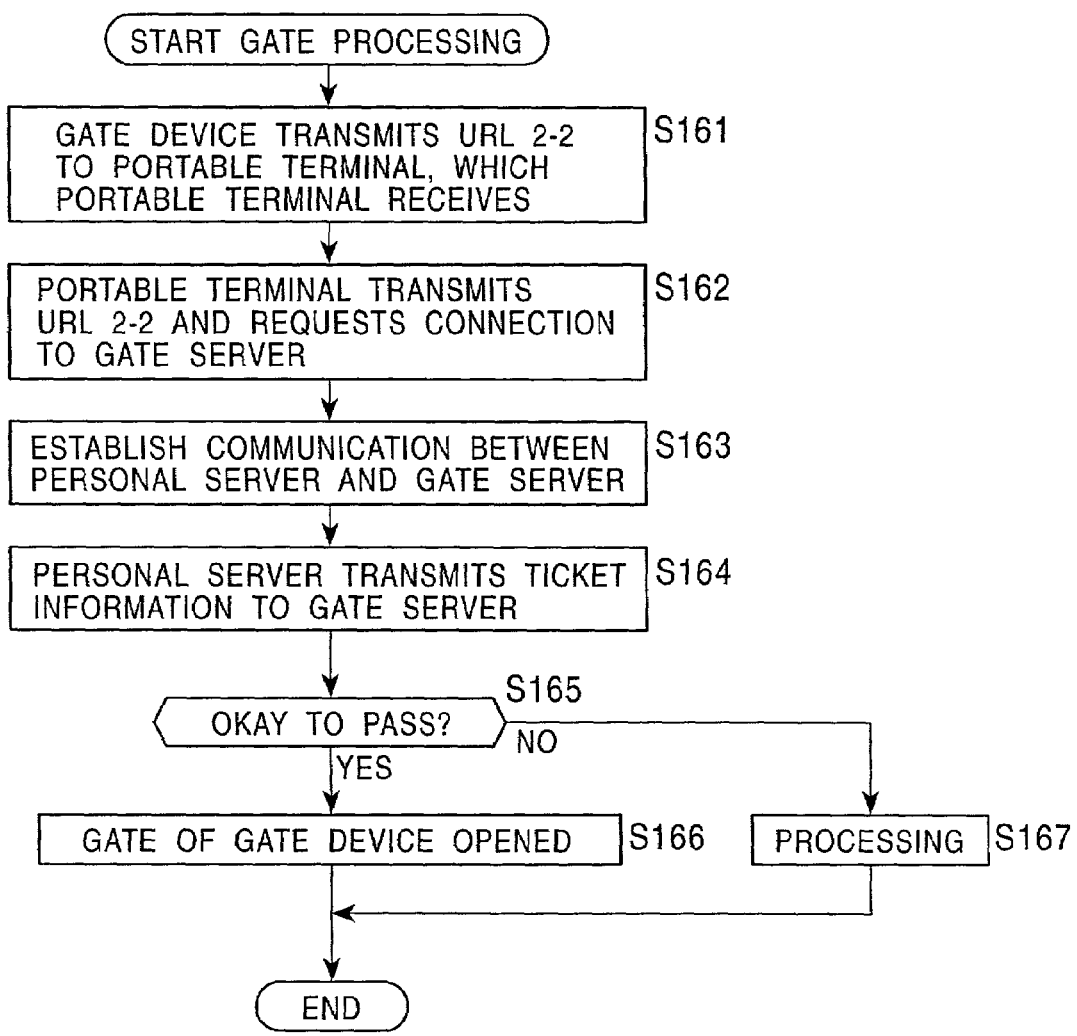
FIG. 27 is a flowchart describing gate processing.

Next, the processing for gate processing will be described with reference to the flowchart shown in FIG. 27.

In step S161, the gate device 3-7 transmits the URL 2-2 to the portable terminal 2. The portable terminal 2 receives this. At this time, the user A is close enough to the gate device 3-7 that short-range communication between the portable terminal 2 and the gate device 3-7 can be made.

In step S162, the portable terminal 2 transmits the URL 2-2 received in step S161 to the personal server 5, and requests communication with the gate server 6-6 which executes processing identified by the URL 2-2. The personal server 5 receives the URL 2-2 transmitted from the portable terminal 2, and recognizes the request.

Communication between the personal server 5 and the gate server 6-6 is established in step S163. In step S164 the personal server 5 transmits the ticket information stored in step S155 in FIG. 26 to the gate server 6-6. The gate server 6-6 receives this.

In step S165, the gate server 6-6 accesses the ticket server 6-5, obtains the expiration date stored along with the URL 1, and judges whether or not this matches the expiration date indicated in the ticket information received in step S164, and whether or not the ticket has expired. Thus, the gate server 6-6 judges whether or not the user A can pass the gate device 3-7.

If judgment is made in step S165 that the user A can pass the gate device 3-7, the flow proceeds to step S166, and the gate of the gate device 3-7 is opened. Specifically, the gate server 6-6 transmits a command to open the gate to the gate device 3-7, and the gate device 37 follows the command and opens the gate.

If judgment is made in step S165 that the user A cannot pass the gate device 3-7, the flow proceeds to step S167, the gate of the gate device 3-7 is not opened, and a predetermined message is output.

Following step S166 or step S167, the gate processing ends.

Next, other processing for step S147 (ticket-issuing processing) will be described with reference to the flowchart shown in FIG. 28.

Figure 25:
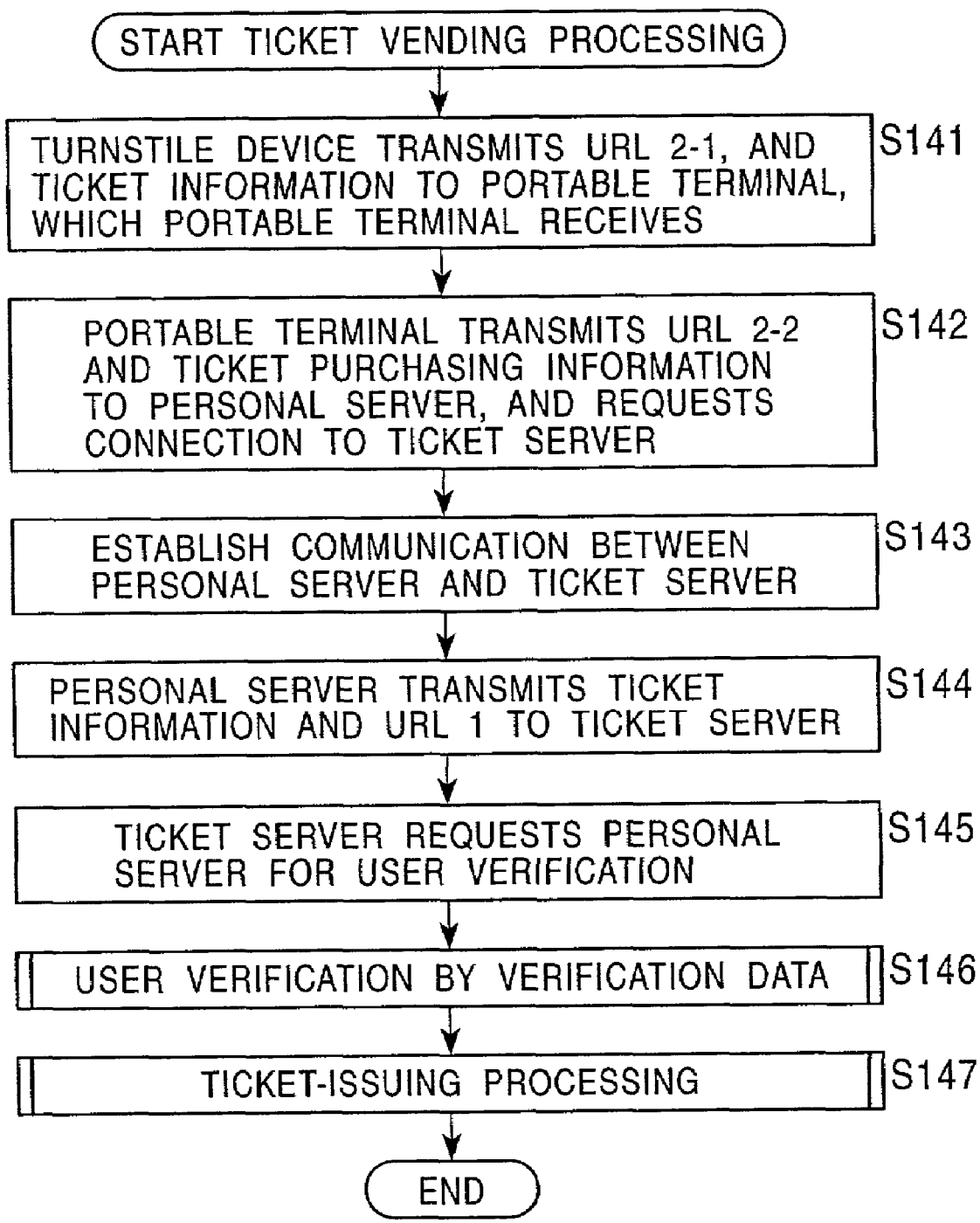
FIG. 25 is a flowchart describing ticket vending processing.

In step S171, the ticket server 6-5 determines the expiration date based on the ticket information received in step S144 in FIG. 25, and also calculates the charges.

Next, in step S172, the ticket server 6-5 stores the expiration date determined in step S171 correlated with the URL 1, and transmits this to the gate server 6-6. The gate server 6-6 receives and stores this.

In step S173, payment processing is carried out.

Next, in step S1 74, the personal server 5 transmits facial photograph data of the user A to the ticket server 6-5. The ticket server 6-5 receives this.

In step S175, the ticket server 6-5 stores the facial photograph data received in step S174 correlated with the URL 1, and transmits the facial photograph data to the gate server 6-6. The gate server 6-6 receives this, and stores it in a manner correlated with the URL 1.

Subsequently, the processing ends.

Figure 29:
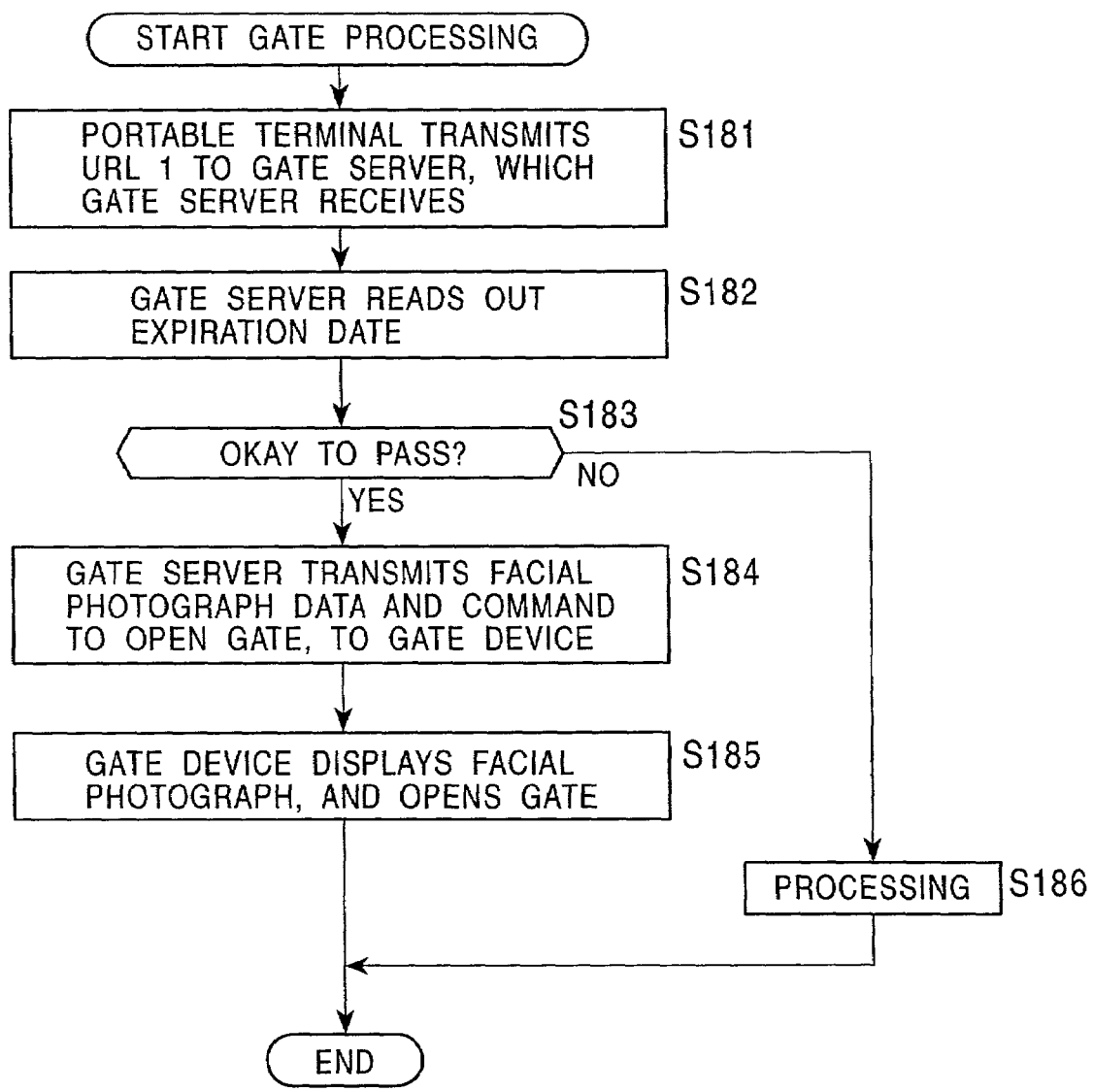
FIG. 29 is a flowchart describing other gate processing.

Next, gate processing corresponding to this ticket-issuing processing will be described with reference to the flowchart shown in FIG. 29.

In step S181, the portable terminal 2 transmits the URL 1 to the gate server 6-6 via the gate device 3-7. The gate server 6-6 receives this. At this time, the user A (portable terminal 2) is close enough to the gate device 3-7 that short-range communication between the portable terminal 2 and the gate device 3-7 can be made.

Figure 28:
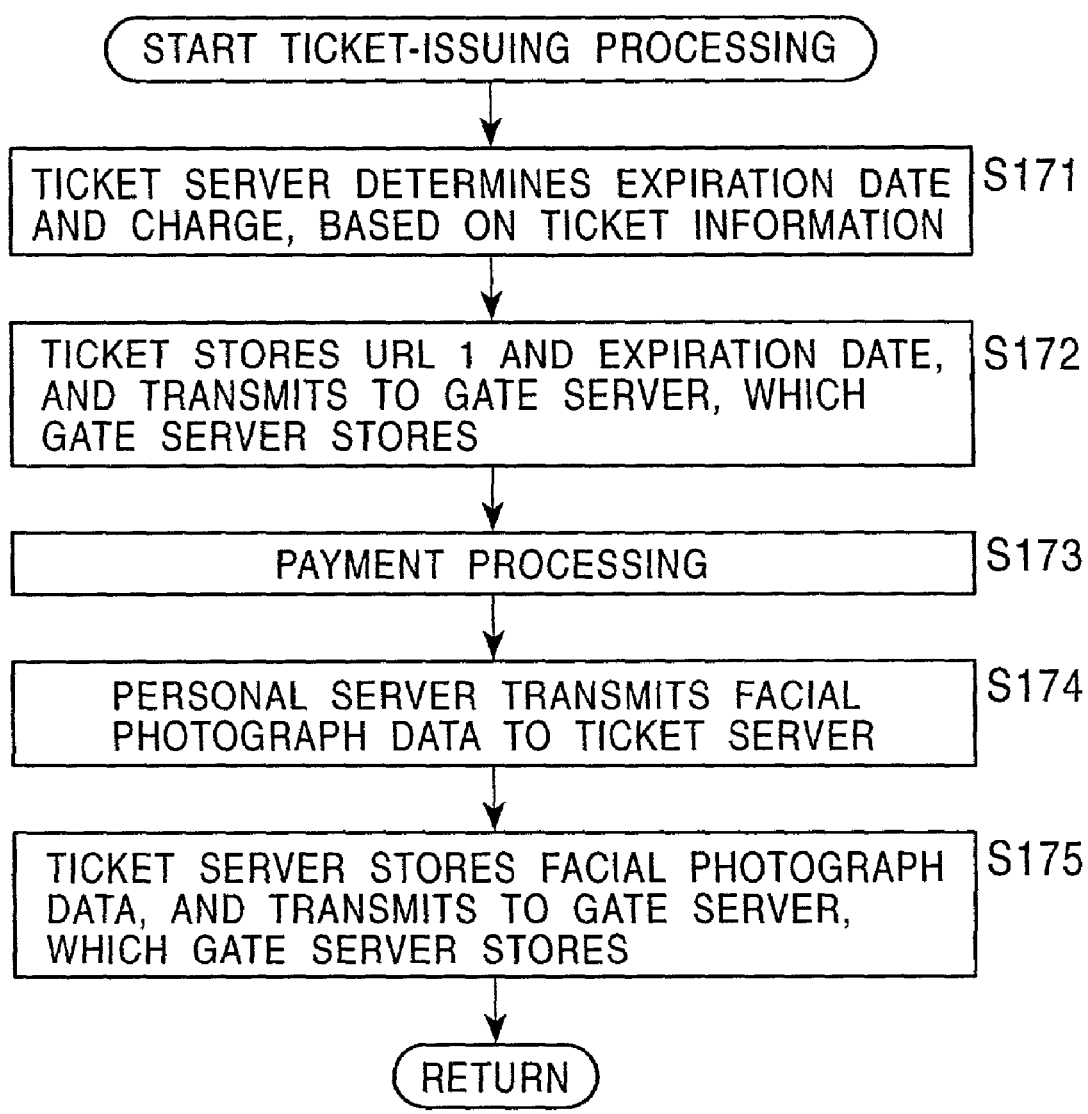
FIG. 28 is a flowchart describing other processing of step S147 in FIG. 25.

In step S182, the gate server 6-6 reads out the expiration date stored in step S172 of FIG. 28, and in step S183 judges whether or not the ticket has expired. Thus, the gate server 6-6 judges whether or not the user A can pass the gate device 3-7.

If judgment is made in step S183 that the user A can pass, in step S184 the gate server 6-6 transmits a command to open the gate to the gate device 3-7 along with the facial photograph data stored in step S175.

In step S185, the gate device 3-7 displays an image corresponding to the facial photograph data received in step S184, and opens the gate.

If judgment is made in step S183 that the user A cannot pass, the flow proceeds to step S186, and predetermined processing is executed.

Following step S185 or step S186, the processing ends.

Though the example shown in FIG. 25 has been described with reference to an arrangement wherein a ticket is sold if the user A has been verified as a valid user by user verification with verification data, the user verification processing may be omitted.

Figure 30:
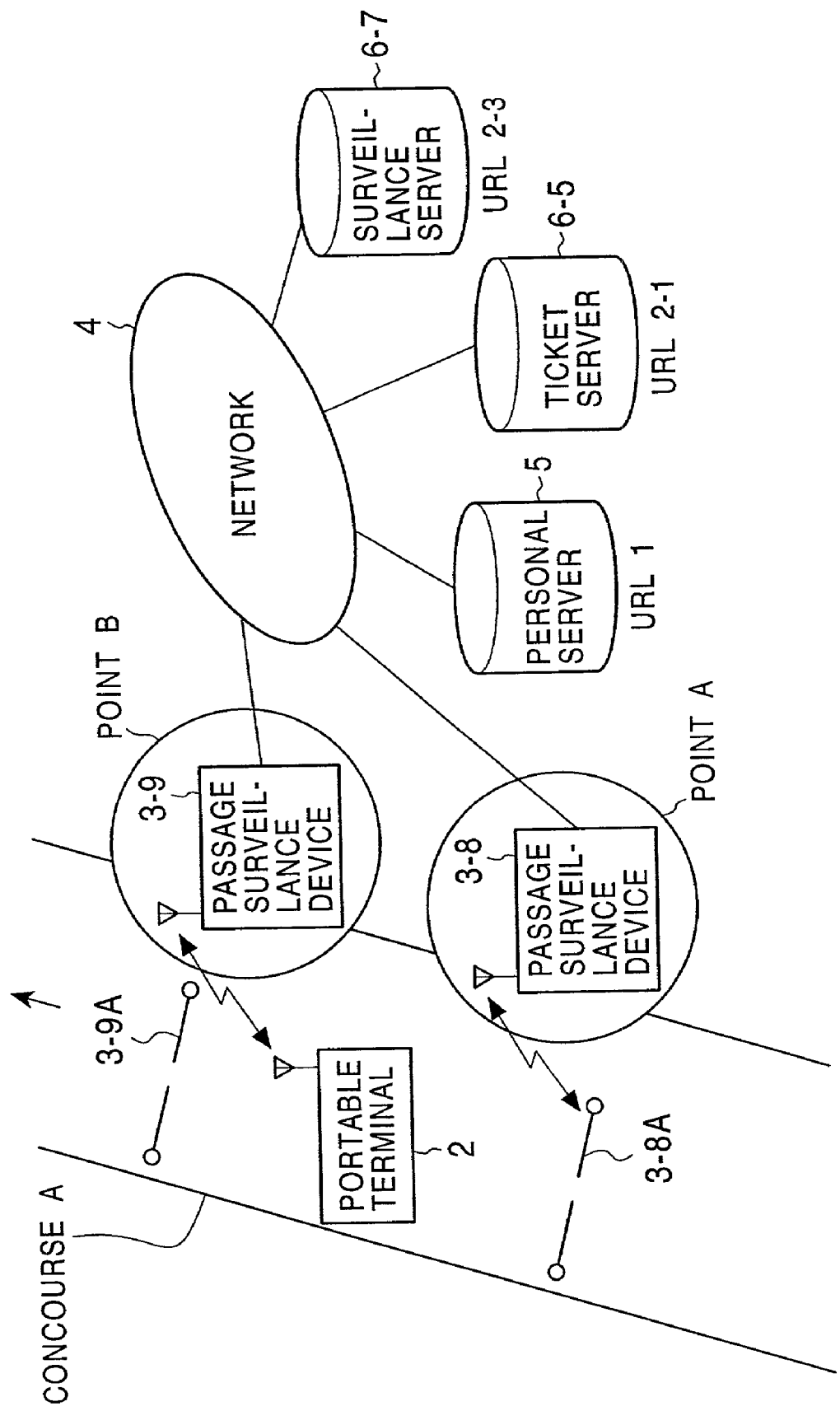
FIG. 30 is a diagram illustrating another embodiment of a service providing system according to the present invention.

However, if a third party other than the user A obtains the URL 1 stored in the ticket server 6-5 (step S152 in FIG. 26), the third party can pass through the gate device 3-7 in an unauthorized manner by transmitting the URL 1 to the gate device 3-7 (step S161 in FIG. 27), (i.e., enter the attraction unauthorized.) FIG. 30 illustrates an embodiment of a system which can prevent unauthorized use even if user verification by verification data is omitted.

A passage surveillance device 3-8 has a gate 3-8A which can be left open, and is installed at a predetermined point A in a concourse A through which the user moves in the direction of the arrow in the figure. The user must pass through the gate 3-8A of the passage surveillance device 3-8 in order to pass down the concourse.

The passage surveillance device 3-8 also functions as a network access port as to the portable terminal 2, and communicates with the ticket server 6-5 and surveillance server 6-7 via the network 4, as well as communicating with the portable terminal 2.

A passage surveillance device 3-9 has a gate 3-9A which can be left open as with the passage surveillance device 3-8, and is installed at a predetermined point B in the concourse A removed from point A by a certain distance in the direction of progression indicated by the arrow in the figure. Point A and point B are separated by a distance which requires a certain amount of time to pass (walking).

The passage surveillance device 3-9 also functions as a network access port as to the portable terminal 2, and communicates with the ticket server 6-5 and surveillance server 6-7 via the network 4, as well as the portable terminal 2.

The surveillance server 6-7 executes processing functions for surveillance to determine whether or not a user attempting to pass through the gate 3-9A of the passage surveillance device 3-9 identified by the URL 2-3 is attempting unauthorized use of a ticket.

Next, the operation of the passage surveillance device 3-8 will be described with reference to the flowchart shown in FIG. 31.

In step S191, the passage surveillance device 3-8 transmits the URL 2-3, the time of detection, and its own ID, to the portable terminal 2. The portable terminal 2 receives this. At this time, the user A (portable terminal 2) is drawing closer to the passage surveillance device 3-8, to the extent that short-range communication between the portable terminal 2 and the passage surveillance device 3-8 can be made.

Next, in step S192, the portable terminal 2 transmits the URL 2-3, the time of detection, and the ID, received in step S191, to the personal server 5 via the passage surveillance device 3-8, and requests communication with the surveillance server 6-7 which executes processing identified by the URL 2-3. The personal server 5 receives the data transmitted from the portable terminal 2, and recognizes the request.

Communication between the personal server 5 and the surveillance server 6-7 is established in step S193. In step S194 the personal server 5 transmits the time of detection and the ID received in step S192 to the surveillance server 6-7 along with the URL 1. The surveillance server 6-7 receives this.

Next, in step S195, the surveillance server 6-7 correlates and stores the time of detection, the ID, and the URL 1, received in step S194.

In step S196, the surveillance server 6-7 accesses the ticket server 6-5, and judges whether or not the URL 1 stored in step S194 is managed by the ticket server 6-5 (i.e., judges whether or not the URL 1 has been stored in the processing in step S152 in FIG. 26). Thus, the surveillance server 6-7 judges whether or not the user A has purchased a valid ticket and can pass the gate 3-8A.

If judgment is made in step S196 that the user A can pass, the flow proceeds to step S197.

In step S197, the surveillance server 6-7 performs processing of opening the gate 3-8A of the passage surveillance device 3-8. Thus, the gate 3-8A opens, and the user A can pass through.

If judgment is made in step S196 that the user A cannot pass, the flow proceeds to step S198, and the surveillance server 6-7 executes a predetermined warning processing.

Following step S197 or step S198, the passage surveillance processing ends.

Figure 32:
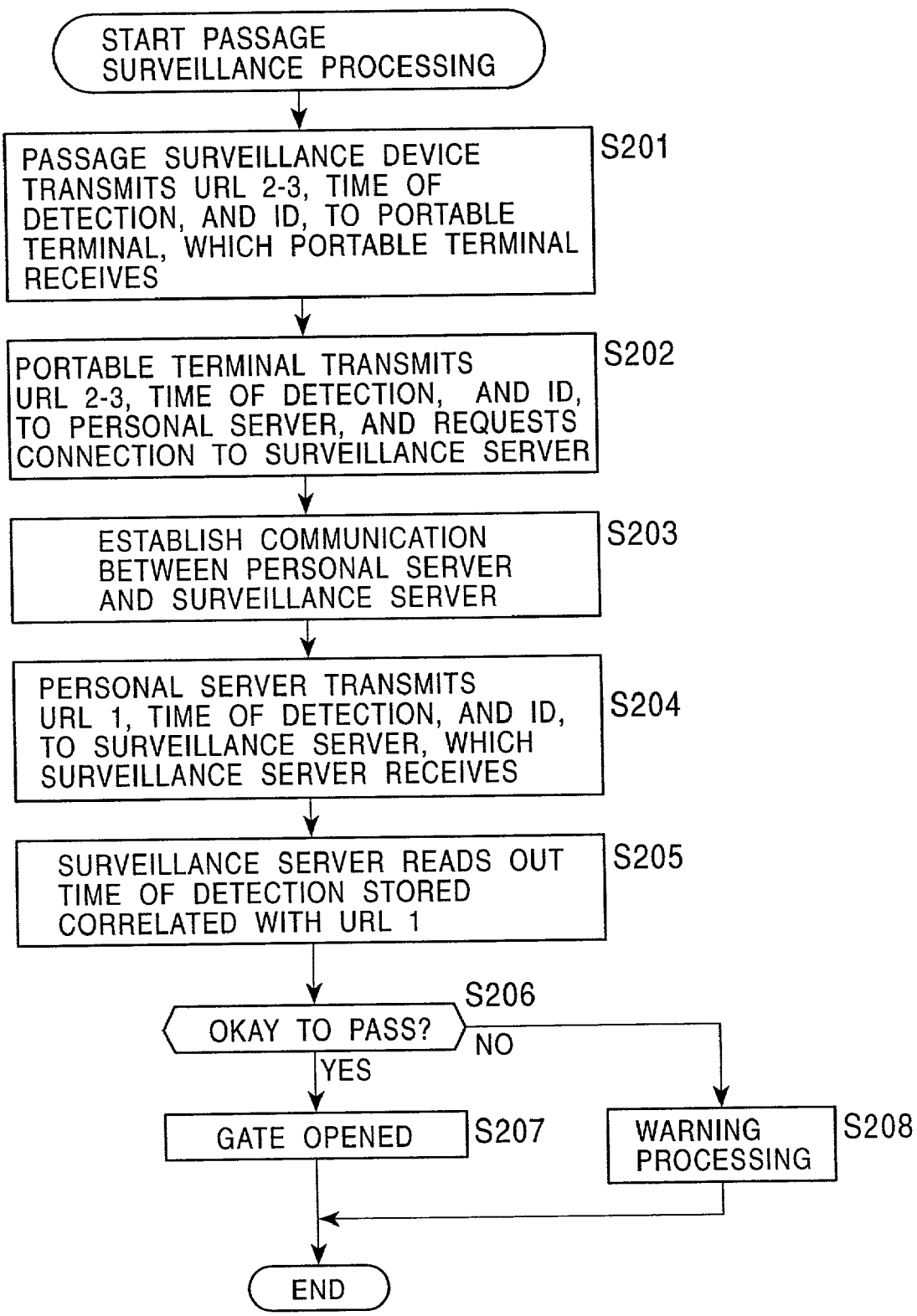
FIG. 32 is a flowchart describing other passage surveillance processing.

Next, the operation of the passage surveillance device 3-9 will be described with reference to the flowchart shown in FIG. 32.

In step S201, the passage surveillance device 3-9 transmits the URL 2-3, the time of detection, and its own ID, to the portable terminal 2. The portable terminal 2 receives these. At this time, the user A (portable terminal 2) is drawing closer to the passage surveillance device 3-9, to the extent that short-range communication between the portable terminal 2 and the passage surveillance device 3-9 can be made.

Next, in step S202, the portable terminal 2 transmits the URL 2-3, the time of detection, and the ID, received in step S201, to the personal server 5 via the passage surveillance device 3-9, and requests communication with the surveillance server 6-7 which executes processing identified by the URL 2-3. The personal server 5 receives the data transmitted from the portable terminal 2, and recognizes the request.

Communication between the personal server 5 and the surveillance server 6-7 is established in step S203. In step S204 the personal server 5 transmits the time of detection and the ID received in step S202 to the surveillance server 6-7 along with the URL 1. The surveillance server 6-7 receives these.

Figure 31:
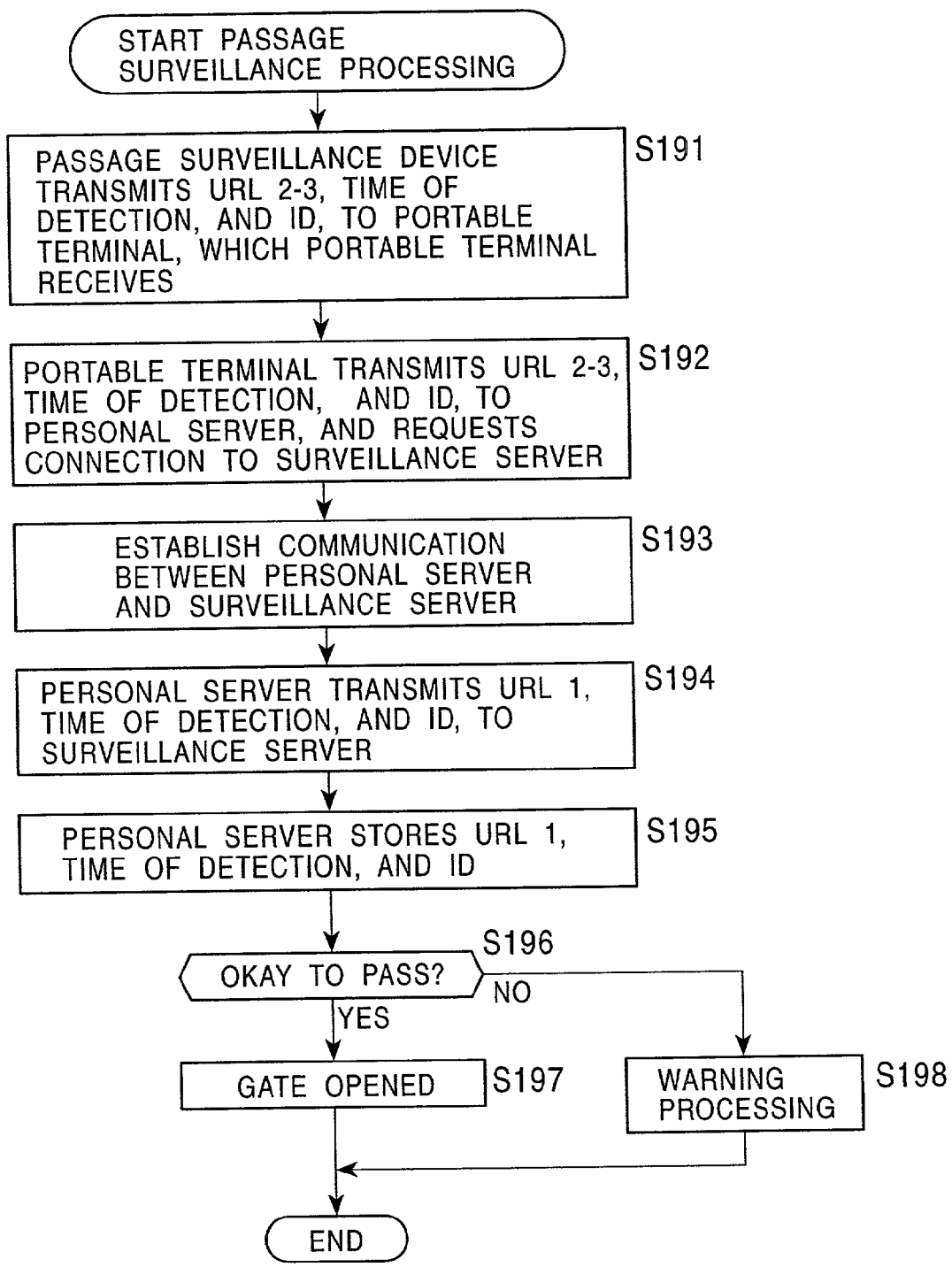
FIG. 31 is a flowchart describing passage surveillance processing.

Next, in step S205, the surveillance server 6-7 reads out the time of detection with the passage surveillance device 3-8 stored correlated with the URL 1 in step S195 in FIG. 31, calculates in step S206 the difference in detection time with the time of detection received in step S204, and judges whether or not that time is shorter than a predetermined time T (time necessary for moving from point A to point B).

The passage surveillance device 3-8 and passage surveillance device 3-9 are separated by a distance which requires time T to traverse, so there cannot be a case wherein the use A passes through the passage surveillance device 3-8 (gate 3-8A) and then is detected by the passage surveillance device 3-9 within the time T. That is to say, if the URL 1 is transmitted to the passage surveillance device 3-9 within time T, the URL 1 can be judged to have been held by an unauthorized third party. Accordingly, it can be judged whether or not the URL 1 is being used in an unauthorized manner and whether or not the user A can pass the gate 3-9A.

If judgment is made in step S206 that the user A can pass, the flow proceeds to step S207, and the surveillance server 6-7 performs processing of opening the gate 3-9A of the passage surveillance device 3-9. Thus, the gate 3-9A opens, and the user A can pass through.

If judgment is made in step S206 that the user A cannot pass, the flow proceeds to step S208, and the surveillance server 6-7 executes a predetermined warning processing.

Following the processing in step S207 or step S208, the passage surveillance processing ends.

Figure 33:
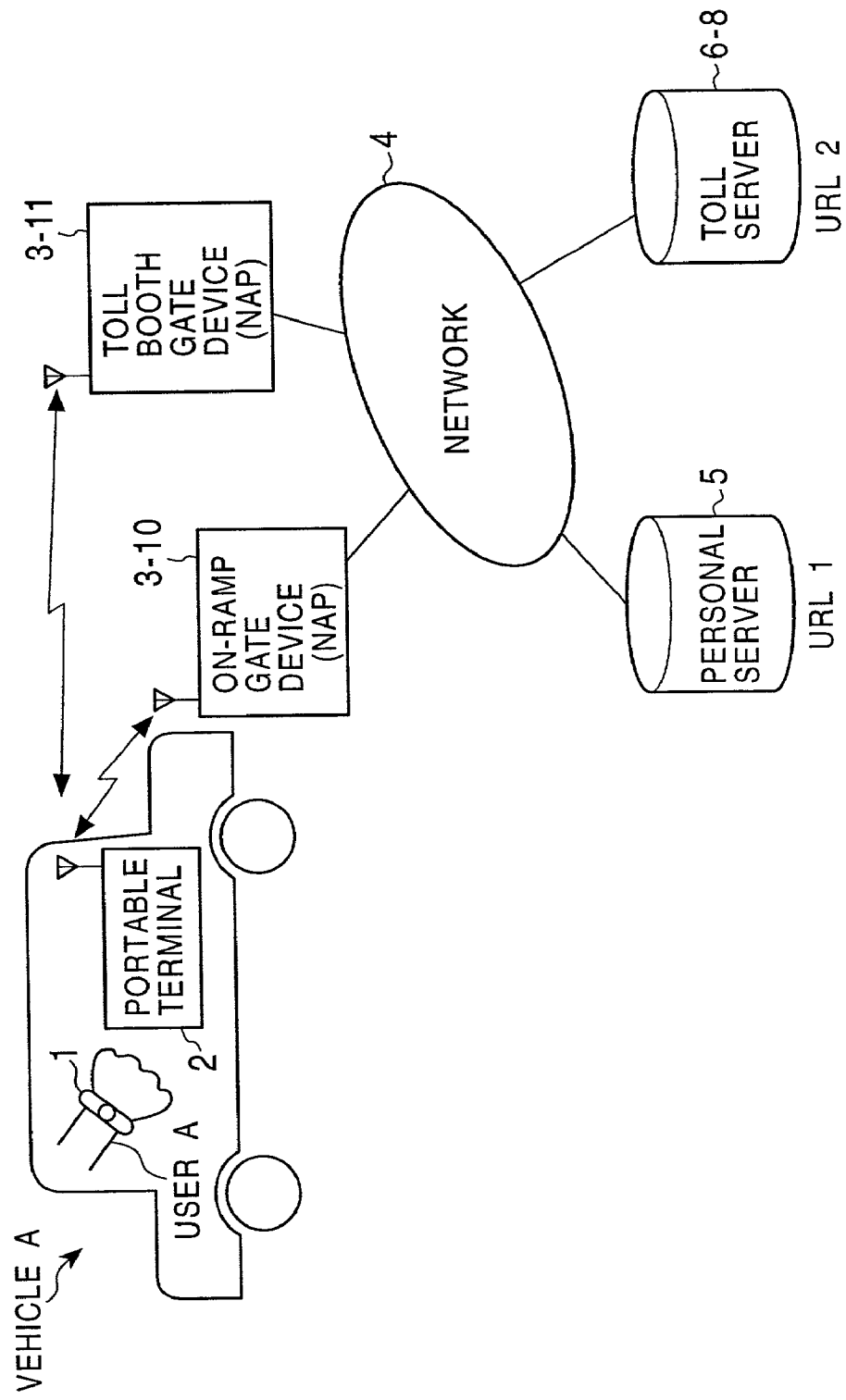
FIG. 33 is a diagram illustrating another embodiment of a service providing system according to the present invention.

FIG. 33 illustrates another embodiment of a service providing system according to the present invention. In general, the service providing system is used for payment processing of tolls on a toll road. The user A has the portable terminal 2 and is riding in a vehicle A.

An on-ramp gate device 3-10 is a device functioning as a network access port as to the portable terminal 2, and is installed at the entrance to a toll road.

A tool booth device 3-11 is a device having functioning as a network access port as to the portable terminal 2, and is installed at the exit of the toll road. The tool booth device 3-11 also has a video camera (not shown) for taking images of the license plate numbers of passing vehicles, and also detecting the license plate numbers from the images obtained thereby.

A toll server 6-8 communicates with the personal server 5, on-ramp gate device 3-10, and tool booth device 3-11, via the network 4, and executes processing functions relating to payment of tolls for the toll road identified by the URL 2. The toll server 6-8 stores the license plate number of a vehicle (vehicle A) along with a predetermined expiration date.

The personal server 5 stores the license plate number of the vehicle of the user A as personal information of the user A.

Figure 34:
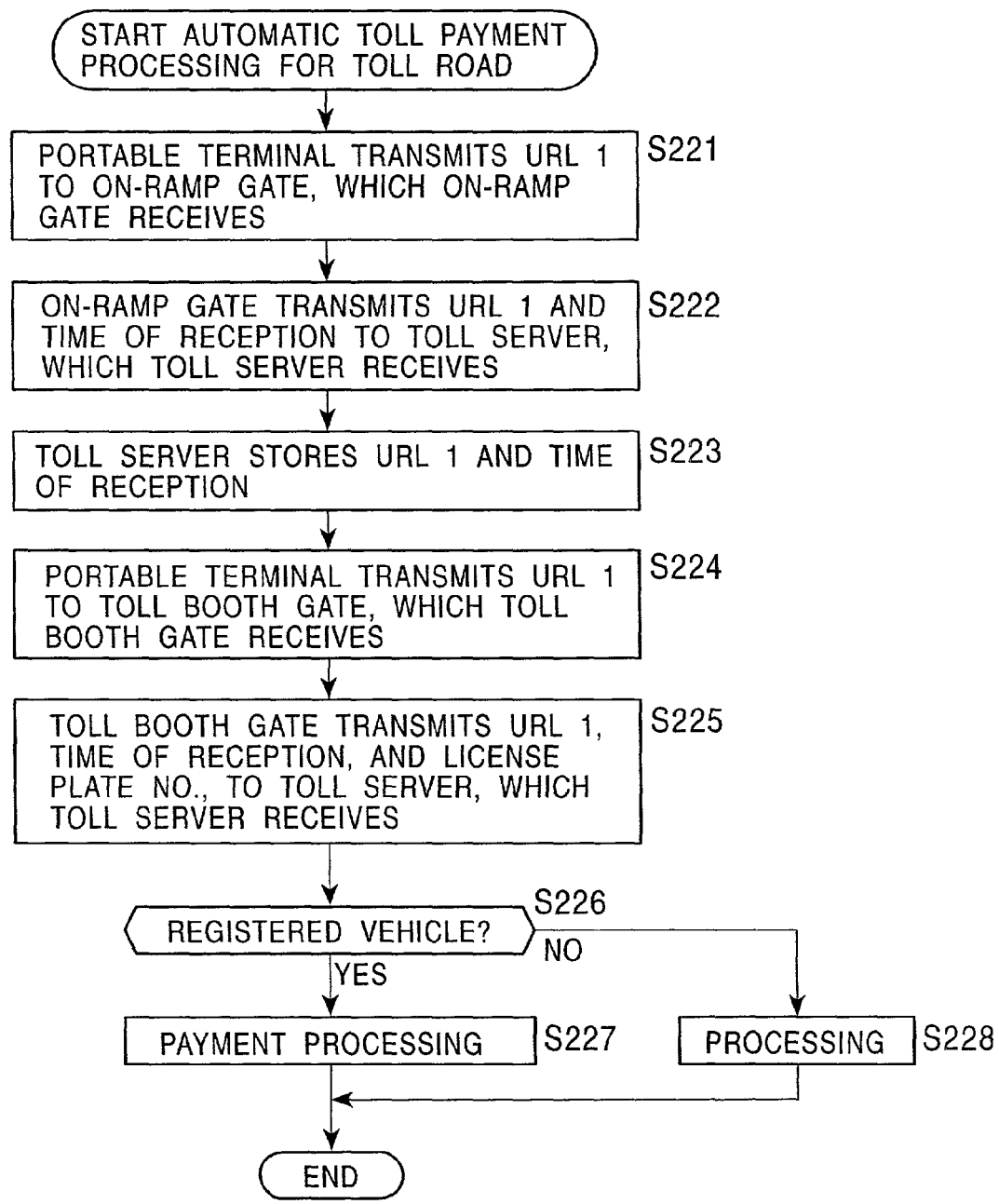
FIG. 34 is a flowchart describing automatic toll payment processing for a toll road.

Next, the procedures for the payment processing will be described with reference to the flowchart shown in FIG. 34.

In step S221, the portable terminal 2 transmits the URL 1 to the on-ramp gate 3-10. The on-ramp gate 3-10 receives this.

Specifically, at the time that the vehicle A (portable terminal 2) draws closer to the on-ramp gate 3-10 to the extent that short-range communication between the portable terminal 2 and the on-ramp gate 3-10 can be made, the user A performs predetermined operations at the input unit 23 of the portable terminal 2. Thus, the portable terminal 2 transmits the above data to the on-ramp gate 3-10.

Next, in step S222, the on-ramp gate 3-10 transmits the URL 1 received in step S221 and the time of reception thereof, to the toll server 6-8. The toll server 6-8 receives these.

In step S223, the toll server 6-8 stores the URL 1 and time of reception, received in step S222.

Next, in step S224, the portable terminal 2 transmits the URL 1 to the toll booth device 3-11. The toll booth device 3-11 receives this.

The vehicle A passes along the toll road and enters the off-ramp where the toll booth device 3-11 is installed, and upon approaching the toll booth device 3-11 (drawing closer to the toll booth device 3-11 to the extent that short-range communication between the portable terminal 2 and the toll booth device 3-11 can be made), the user A performs predetermined operations at the input unit 23 of the portable terminal 2. Thus, the portable terminal 2 transmits the URL 1 to the toll booth device 3-11.

In step S225, the toll booth device 3-11 takes an image of the passing vehicle A, and detects the license plate number from the image data obtained thereby. The toll booth device 3-11 receives the detected license plate number along with the URL 1 and time of reception thereof received in step S224, and transmits these to the toll server 6-8. The toll server 6-8 receives these.

In step S226, the toll server 6-8 judges whether or not the vehicle A can pass through the toll booth device 3-11.

In this embodiment, user verification by verification data is performed with regard to the user A between the personal server 5 and the toll server 6-8 (in step S7 of FIG. 6, for example), and the toll server 6-8 stores information that the user A is a valid user, the expiration date of that information, and the license plate number, in a manner correlated with the URL 1. Thus, the toll server 6-8 compares the license plate number stored corresponding to the URL 1 beforehand with the license plate number received in step S255 and judges whether or not these match, and also judges whether or not the time or reception stored in step S223 is a time within the expiration time stored beforehand corresponding to the URL 1. Accordingly, if the license plate number matches, and judgement is made that the period has not expired, the vehicle A is judged as being able to pass the toll booth device 3-11, so the flow proceeds to step S227, and payment processing is performed.

On the other hand, if judgment is made in step S226 the license plate number is not the same or that the expiration date has expired, the vehicle A is judged as not being able to pass the toll booth device 3-11, so the flow proceeds to step S228, and predetermined warning processing is performed.

Figure 35:
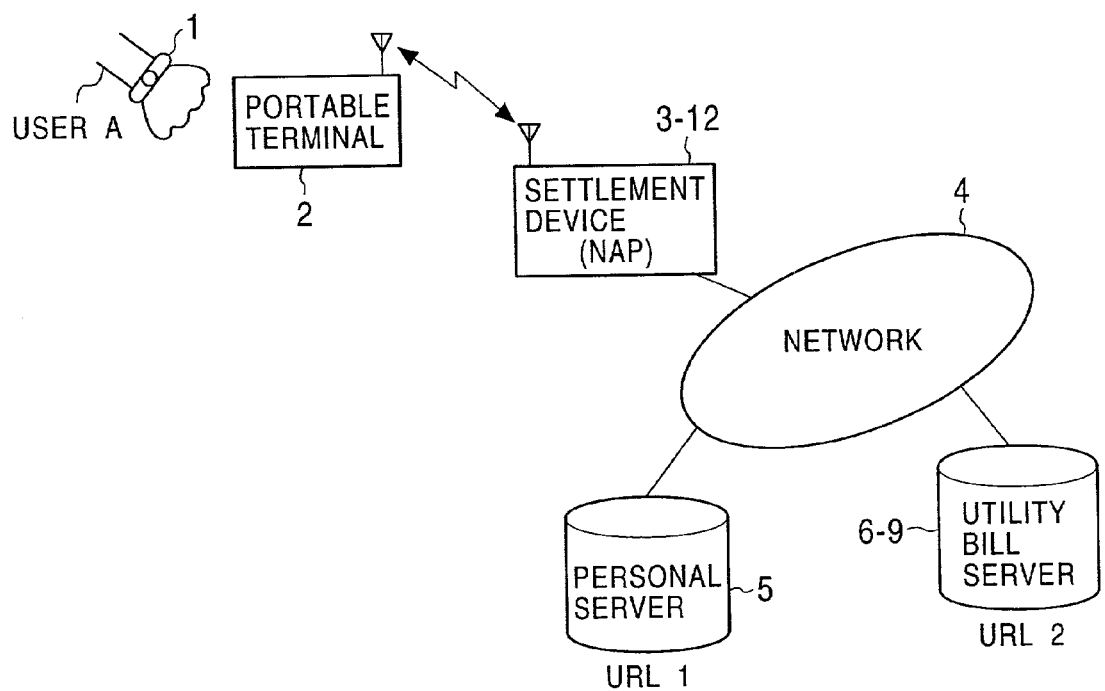
FIG. 35 is a diagram illustrating another embodiment of a service providing system according to the present invention.

FIG. 35 illustrates another embodiment of a service providing system according to the present invention. In general, the service providing system is used for payment processing of utility bills.

A settlement device 3-12 is a terminal operated for making contracts regarding utility bills or settling utility bills, and is installed in convenience stores, for example. The settlement device 3-12 also functions as a network access port as to the portable terminal 2.

A utility bill server 6-9 communicates with the settlement device 3-12 and the personal server 5 via the network 4, and executes processing relating to utility bills identified by the URL 2.

Figure 36:
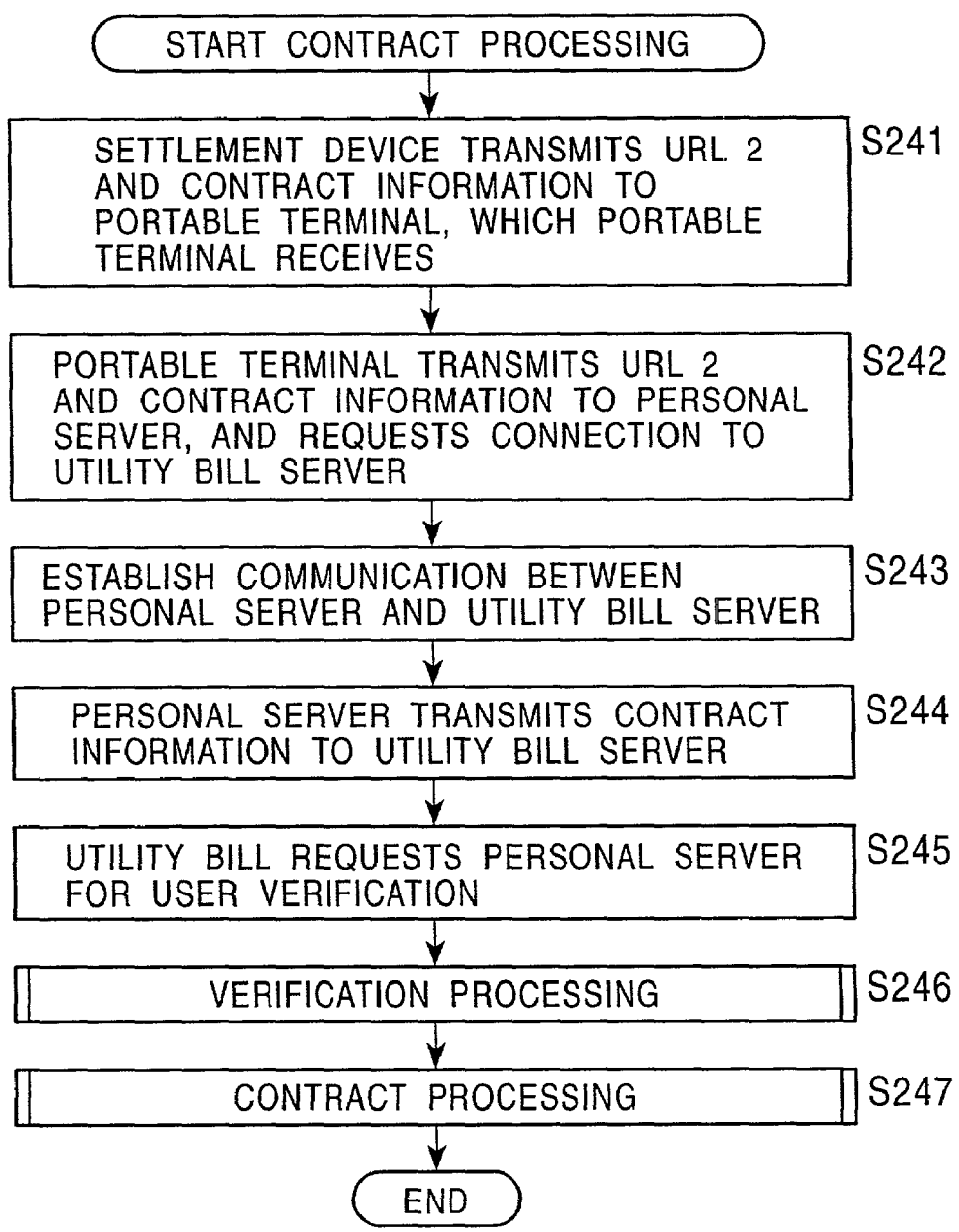
FIG. 36 is a flowchart describing contract processing.

Next, the contract processing procedures for settling utility bills using this system will be described with reference to the flowchart shown in FIG. 36.

In step S241, the settlement device 3-12 transmits the URL 2 and contract information to the portable terminal 2. The portable terminal 2 receives these.

At this time, the user A performs operations at the settlement device 3-12, such as entering contract information like his/her own name, for example. Thus, the settlement device 3-12 transmits the above information to the portable terminal 2.

Next, in step S242, the portable terminal 2 transmits the URL 2 and the contract information received in step S241 to the personal server 5 via the settlement device 3-12 and the network 4, and also requests communication with the utility bill server 6-9.

In step S243, communication between the personal server 5 and the utility bill server 6-9 is established.

Next, in step S244, the personal server 5 transmits the contract information received in step S242 to the utility bill server 6-9. The utility bill server 6-9 receives this.

In step S245, the utility bill server 6-9 requests the personal server 5 for user verification. The personal server 5 recognizes the request.

Next, in step S246, user verification is performed. The processing performed in step S246 is similar to the processing performed in step S7 in FIG. 6, so description thereof will be omitted.

Figure 37:
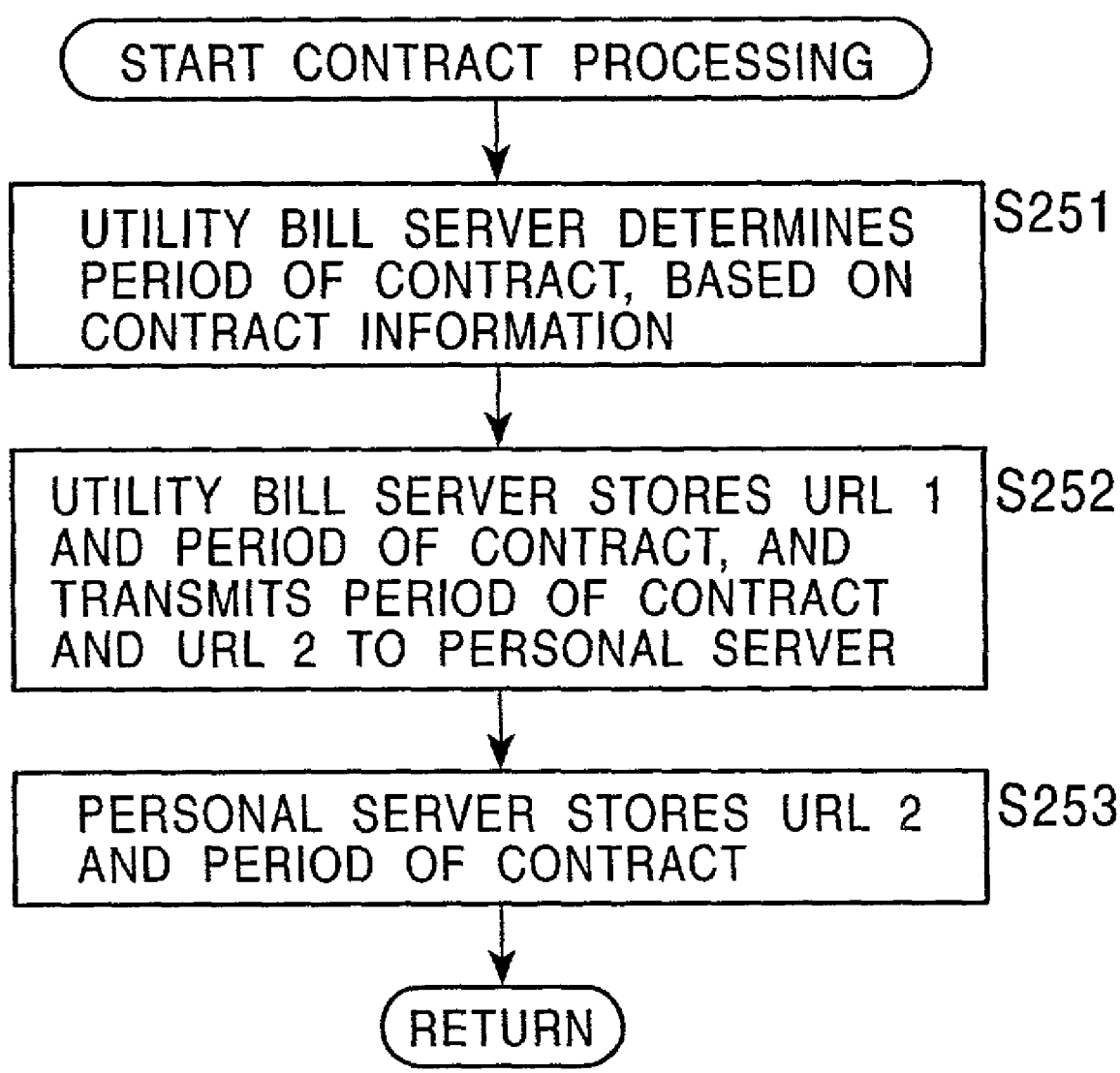
FIG. 37 is another flowchart describing the processing of step S247 in FIG. 36.

Next, in step S247, contract processing is performed. The details of this processing are illustrated in the flowchart shown in FIG. 37.

In step S251, the utility bill server 6-9 determines the period of the contract, based on the control information received in step S244.

In step S252, the utility bill server 6-9 stores the period of the contract determined in step S251 in a manner correlated with the URL 1, and transmits the period of the contract and the URL 2 to the personal server 5. The personal server 5 receives this.

In step S253, the personal server 5 stores the URL 2 and period of the contract received in step S252. Subsequently, the processing ends.

Figure 38:
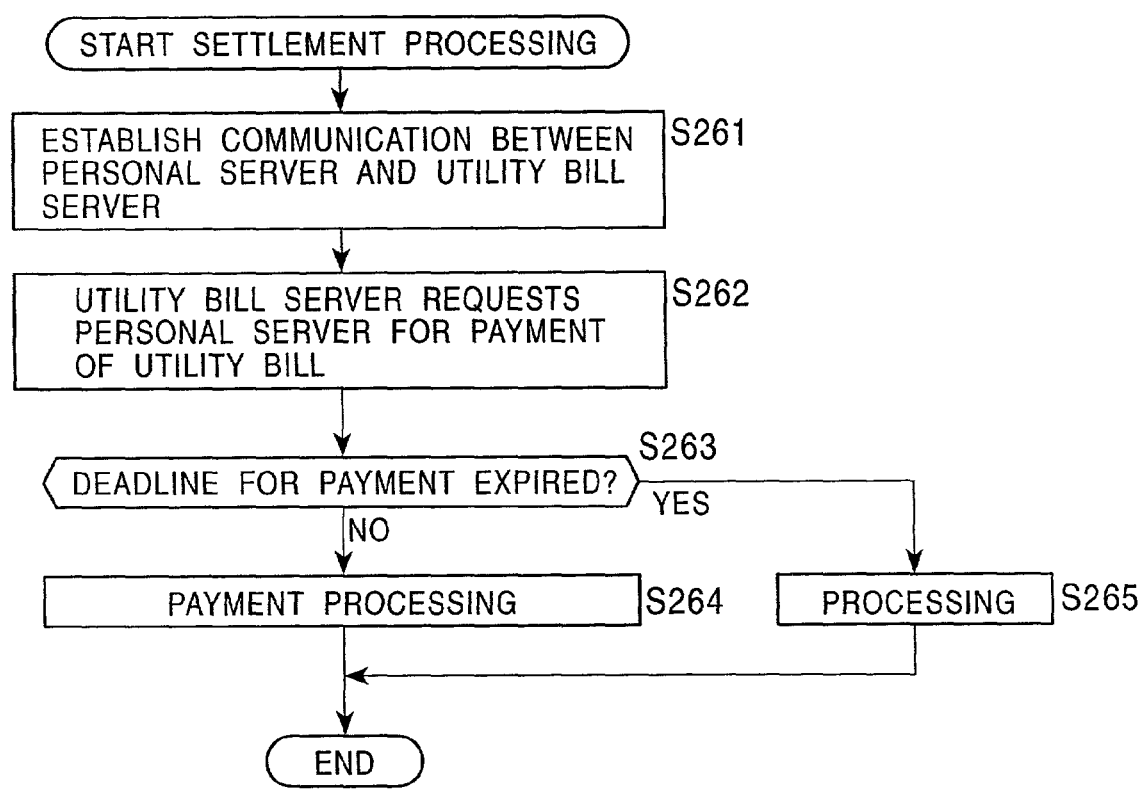
FIG. 38 is a flowchart describing other settlement processing.

Next, settlement processing for utility bills will be described with reference to the flowchart shown in FIG. 38.

In step S261, communication is established between the personal server 5 and the utility bill server 6-9. Specifically, the utility bill server 6-9 requests connection to the personal server 5 at a predetermined timing (e.g., on a certain day every month). The personal server 5 responds thereto.

In step S262, the utility bill server 6-9 requests the personal server 5 for payment of the utility bill.

Next, in step S263, the personal server 5 makes reference to the period of the contract stored, correlated with the URL 2, judges whether or not the period has expired, and if judgment is made that the period has not expired, the flow proceeds to step S264.

In step S264, payment processing is executed. Specifically, the personal server 5 performs transfer processing for the bill to transfer the charges. The personal server 5 transmits the results of the transfer to the utility bill server 6-9. The utility bill server 6-9 records this.

In step S263, if judgment is made that the contact period has expired, the flow proceeds to step S265, and predetermined processing is executed.

Following step S264 or step S265, the utility bill payment processing ends.

Figure 39:
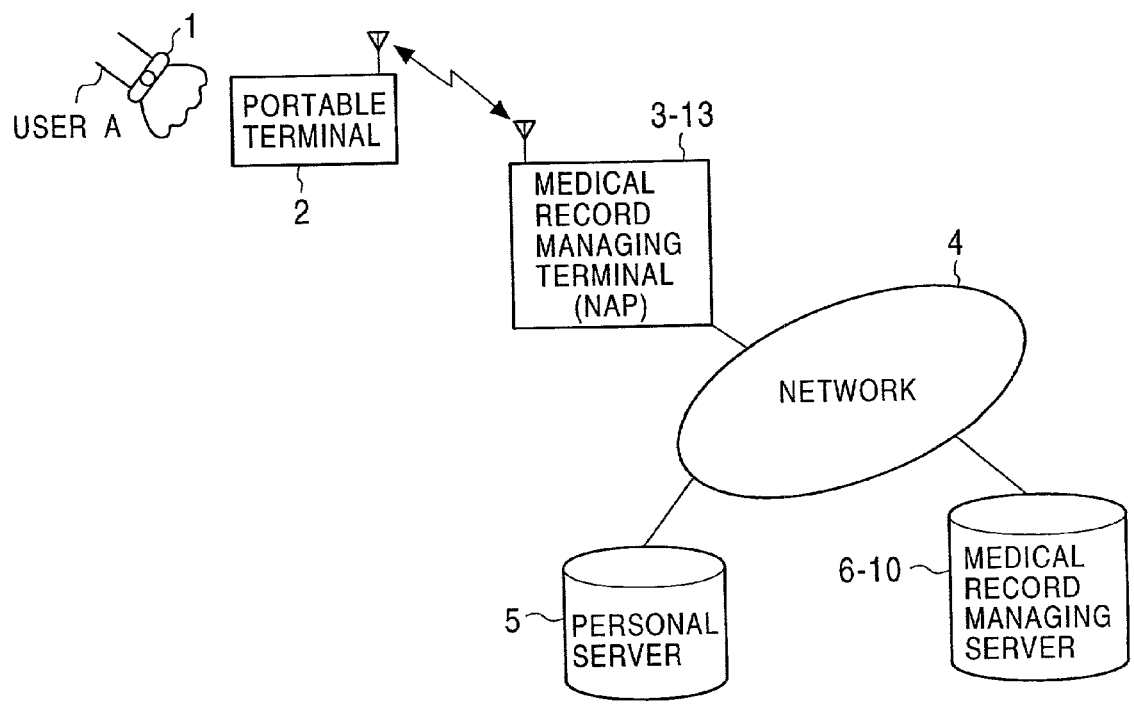
FIG. 39 is a diagram illustrating another embodiment of a service providing system according to the present invention.

FIG. 39 illustrates another embodiment of a service providing system according to the present invention. In general, the service providing system is used for managing medical records in a hospital.

A medical record managing terminal 3-13 is a terminal operated for making reference to medical records, and is installed in a hospital. The medical record managing terminal 3-13 also functions as a network access port as to the portable terminal 2.

A medical record managing server 6-10 communicates with the medical record managing terminal 3-13 and the personal server 5 via the network 4, and executes processing functions for managing medical records identified by the URL 2.

Figure 40:
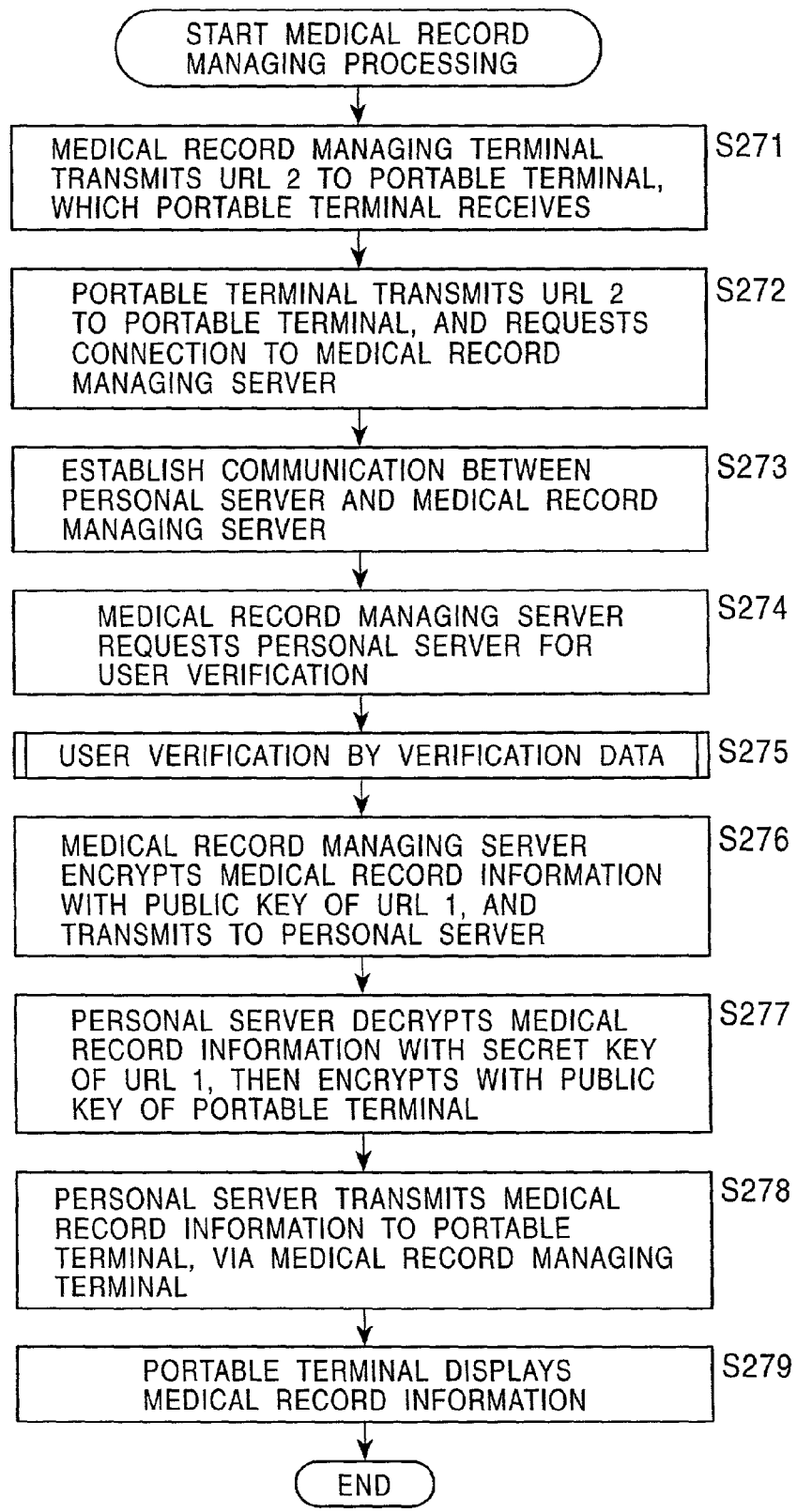
FIG. 40 is a flowchart describing medical record managing processing.

Next, the processing procedures for making reference to medical records information using this system will be described with reference to the flowchart shown in FIG. 40.

In step S271, the medical record managing terminal 3-13 transmits the URL 2 to the portable terminal 2. The portable terminal 2 receives this.

In step S272, the portable terminal 2 transmits the URL 2 received in step S271 to the personal server 5 via the medical record managing terminal 3-13 and network 4, and requests communication with the medical record managing server 6-10.

In step S273, communication is established between the personal server 5 and the medical record managing server 6-10.

Next, in step S274, the medical record managing server 6-10 requests the personal server 5 for user verification. The personal server 5 recognizes the request.

Next, in step S275, user verification is performed. The processing performed in step S275 is similar to the processing performed in step S7 in FIG. 6, so description thereof will be omitted.

Once the user A is verified as being a valid user in step S275, in step S276 the medical record managing server 6-10 encrypts the medical record information of the user A regarding which user verification has been made using a public key of the URL 1, and transmits the information to the personal server 5. The personal server 5 receives this. Note that a public key of the URL 1 is supplied from the personal server 5 to the medical record managing server 6-10 in the processing in step S275.

Next, in step S277, the personal server 5 decrypts the medical record information (encrypted using a public key of the URL 1) received in step S276 with a secret key of the URL 1, and then encrypts the information with a public key of the portable terminal 2.

In step S278, the personal server 5 transmits the medical record information encrypted in step S277 to the portable terminal 2 via the medical record managing terminal 3-13. The portable terminal 2 receives this.

Next, in step S279, the portable terminal 2 decrypts the medical record information (encrypted using a public key of the portable terminal 2) received in step S278 with a secret key of the portable terminal 2, and displays the information on a display unit 24. Thus, the user A can view the contents of his/her medical records.

Subsequently, the processing ends.

Figure 41:
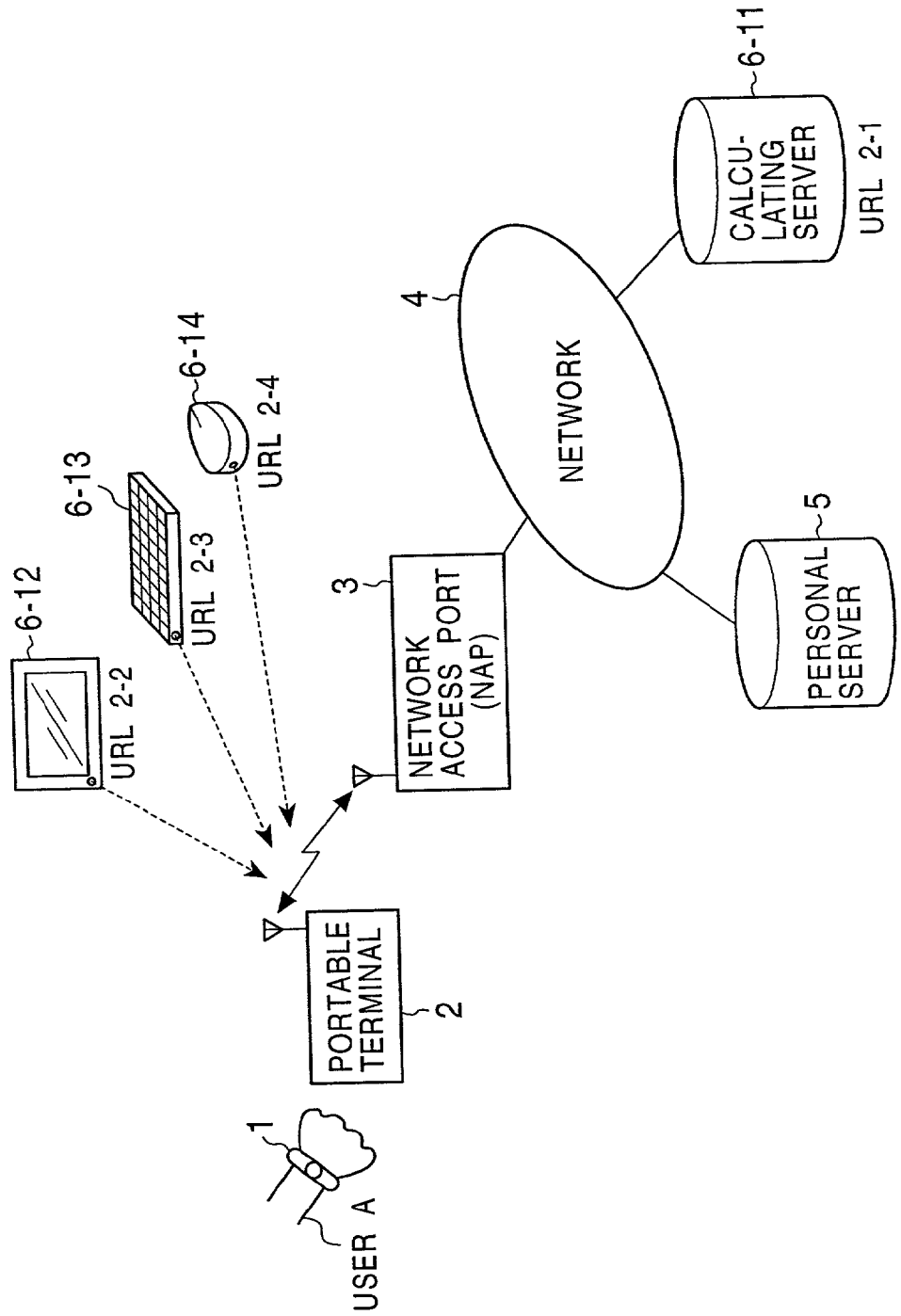
FIG. 41 is a diagram illustrating another embodiment of a service providing system according to the present invention.

FIG. 41 illustrates another embodiment of a service providing system according to the present invention. In general, the personal server 5, a calculating server 6-11, display device 6-12, keyboard 6-13, and mouse 6-14 are each connected via the network access port 3 and network 4, configuring a so-called computer.

The portable terminal 2 performs communication (e.g., infra-red communication or the like) with the display device 6-12, keyboard 6-13, and mouse 6-14, and obtains the respective URLs thereof, namely, the URL 2-2, URL 2-3, and URL 2-4. The portable terminal 2 also transmits, in addition to the obtained URL 2-2, URL 2-3, and URL 2-4, a URL 2-1 managed by the calculating server 6-11 which serves as a CPU of a computer, to the personal server 5, and requests the personal server 5 for controlling the transfer of information based on these URLs. Thus, various types of information are exchanged between the calculating server 6-11, display device 6-12, keyboard 6-13, and mouse 6-14, in accordance with operations made by the user A at the keyboard 6-13 and mouse 6-14. Thus, the user can perform calculation processing and the like just as if he/she were using an actual computer.

If the display device 6-12, keyboard 6-13, and mouse 6-14 are to be used frequently by the user A, the URLs 2 managing these may be stored in the personal server 5 as personal information of the user A, doing away with the need for obtaining these URLs again.

Also, an arrangement may be made wherein the user A can use the system only when situated at the display device 6-12. The portable terminal 2 transfers the URL 1 to the display device 6-12, and the display device 6-12 receives display data and so forth only if there is control from the received URL 1.

Thus, according to an embodiment shown in FIG. 41, even if a user does not have a computer, all that is needed to use the functions of a computer is a display device and an input device.

Preferably, a document creating program executed on the computer has inputted words and phrases regularly stored therein, and has functions, wherein, if part of such a word or phrase is inputted, the entire word or phrase is output. Accordingly, the user does not need to input all the letters in the words and phrases. Thus, document creation is facilitated.

In an embodiment shown in FIG. 41, word and phrase information may be held by the personal server 5, with the portable terminal 2 obtaining and storing this information as necessary. Thus, entire words and phrases can be output without the need for inputting all of the letters in the words and phrases.

Figure 42:
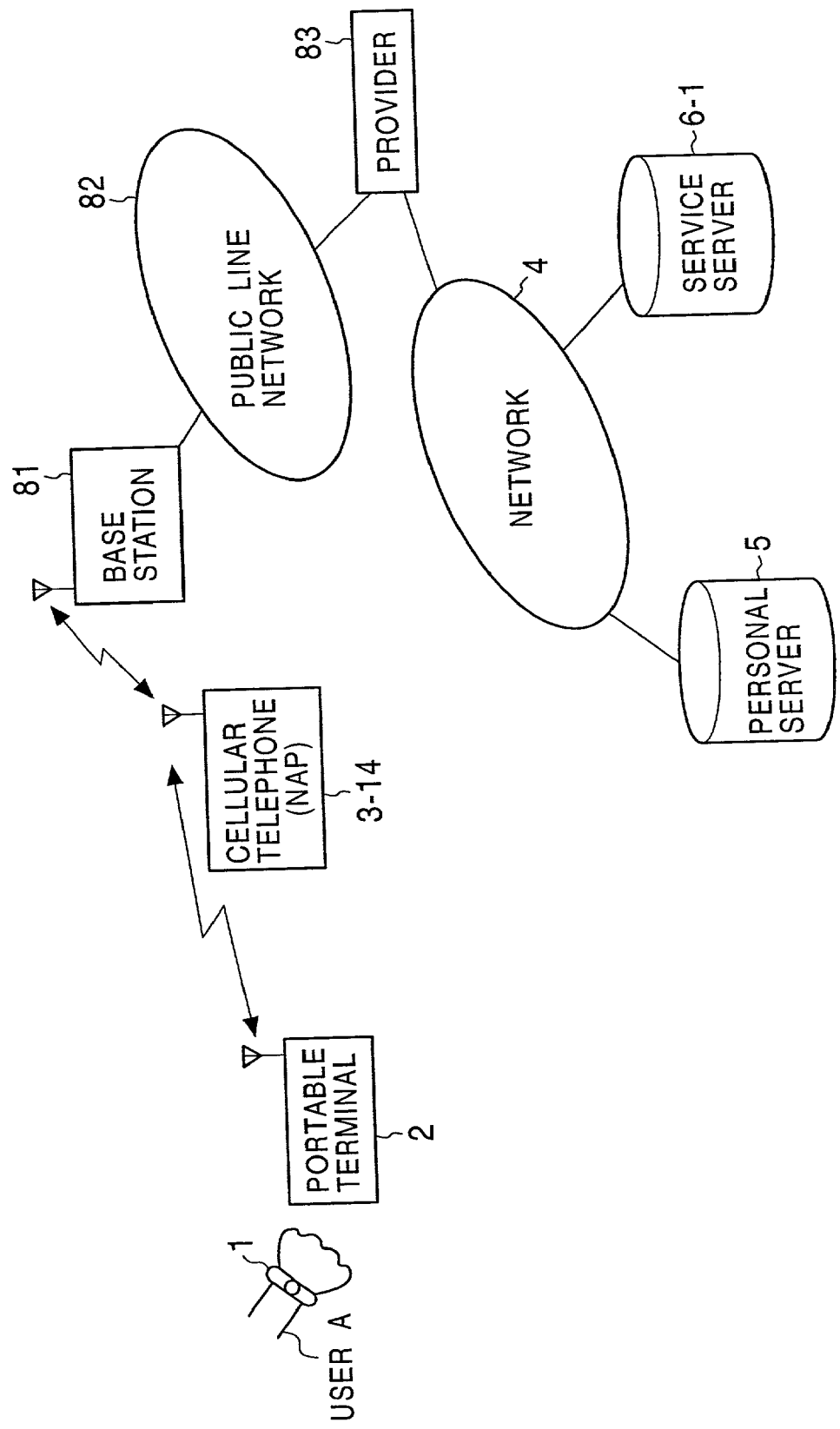
FIG. 42 is a diagram illustrating another embodiment of a service providing system according to the present invention.

The network access port 3 of the portable terminal 2 has been described as being fixed at a certain place, but as shown in FIG. 42, cellular telephones (or PHS (Personal Handiphone Service) devices) 3-14 or the like carried by the user A can be used as network access ports. The communication between a portable terminal 2 and, for example, a personal server 5, is carried out via the cellular telephone 3-14, a base station 81, a public line network 82, a provider 83, and the network 4.

Figure 43:
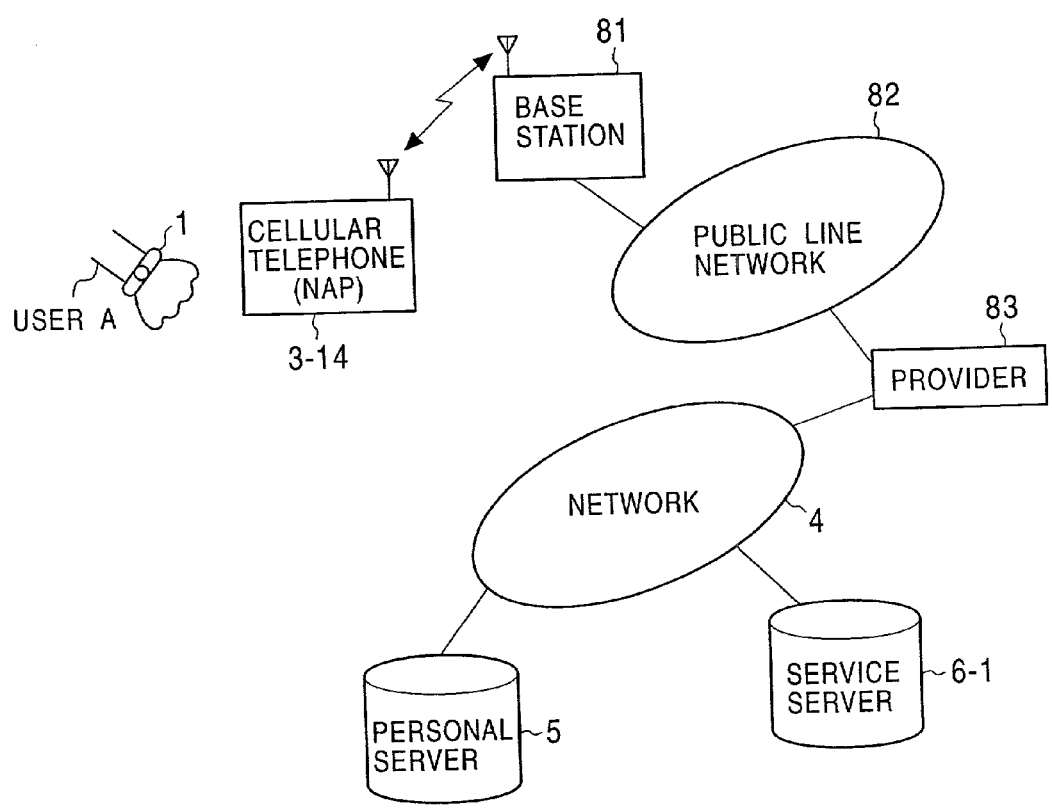
FIG. 43 is a diagram illustrating another embodiment of a service providing system according to the present invention and FIG. 44 is a block diagram illustrating an embodiment of a computer 501.

In an embodiment shown in FIG. 42, the cellular telephone 3-14 is used as a network access port for the portable terminal 2, but can also be used as a portable terminal 2 as shown in FIG. 43. The cellular telephone 3-14 has functions for communicating with the verification data IC chip of the wristwatch 1.

The above-described series of processes can be executed by hardware, or by software as well. When executing the series of processes by software, the program making up the software is installed to a computer where it is executed, thereby functionally realizing the above-described portable terminal 2, personal server 5, service server 6-1, and so forth.

Figure 44:
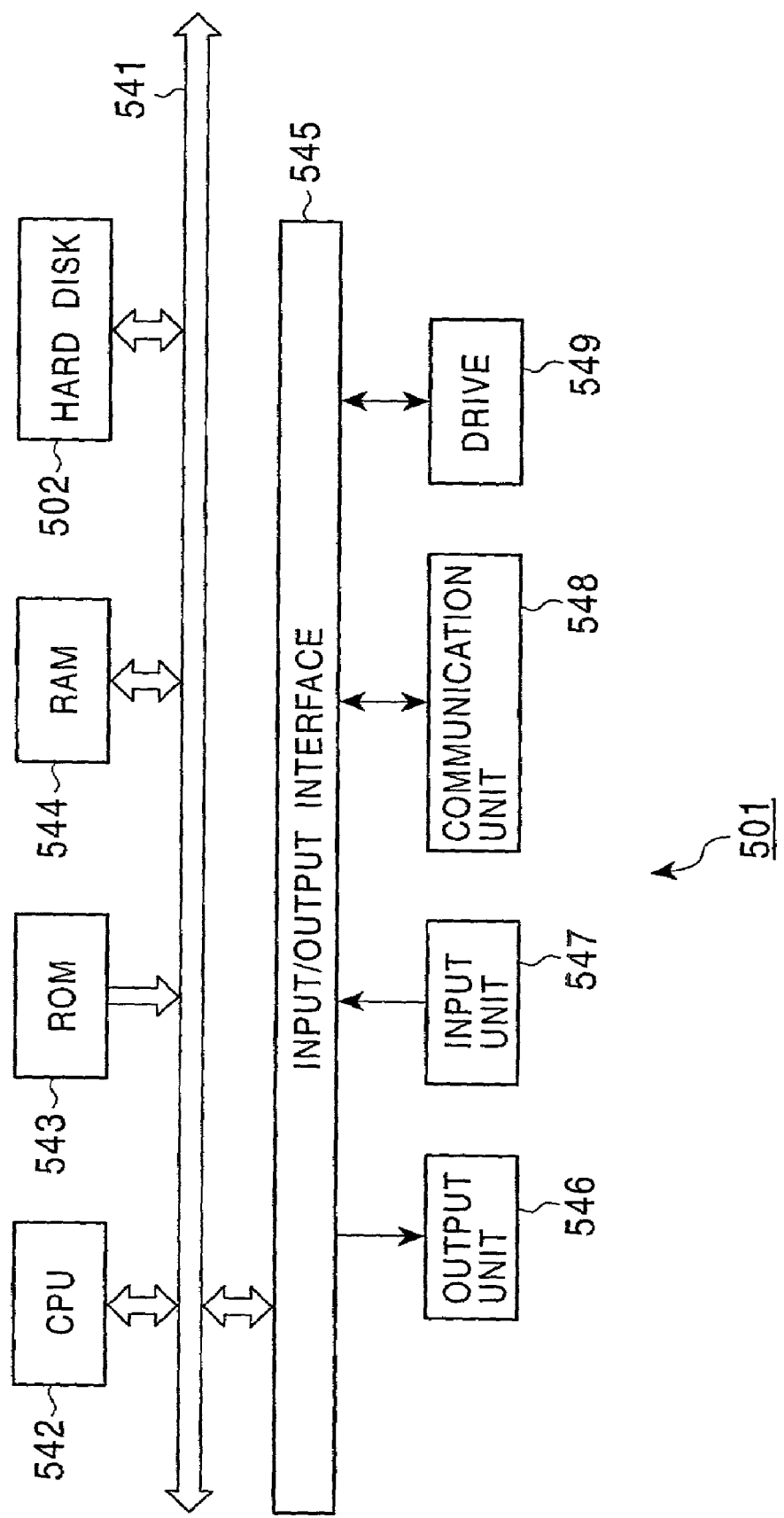

FIG. 44 is a block diagram illustrating an embodiment of a computer 501 functioning as a portable terminal 2 (described above), personal server 5, service server 6-1, or the like. An input/output interface 516 is connected to a CPU 511 via a bus 515, and upon input of commands from a user from an input unit 518 made up of a keyboard, mouse, or the like, via the input/output interface 516, the program stored in a recording medium such as, for example, ROM 512, a hard disk 514, a magnetic disk 531, optical disk 532, magneto-optical disk 533, semiconductor memory 534, or the like mounted on a drive 520, is loaded to the RAM 513 to be executed. Accordingly, the various types of processing described above are executed. Further, the CPU 511 outputs the processing results to a display unit 517 made up of an LCD or the like as necessary, via the input/output interface 516, for example. The program may be stored in the hard disk 514 or ROM 512 beforehand to be provided to the user integrally with the computer 501, may be provided as packaged media such as on magnetic disks 531, optical disks 532, magneto-optical disks 533 semiconductor memory 534, or the like, or may be provided to the hard disk 514 via a communication unit 519 via satellite, via network, or the like.

Note that in the present specification, the steps describing the programs provided in the recording medium may of course be executed in the time sequence following the order in which they are listed, but are not restricted to being executed in this time sequence, and may be executed in parallel or individually.

Also, in the present specification, the term "system" represents all equipment made up of multiple devices.

In an information processing apparatus and method, and recording medium, according to an embodiment of the present invention, first network identifier is stored, second network identifier is obtained, verification data necessary for verifying a user is obtained, and processing identified by the obtained second network identifier is executed by a service server, whereby control information containing the first network identifier and the second network identifier is transmitted to a personal server managing personal information identified by the first network identifier, so that services can be received. Accordingly, even if the information processing device is lost, for example, personal information can be prevented from falling into the hands of a third party.

In a service or providing system according to an embodiment of the present invention, first network identifier is stored by a portable terminal, second network identifier is obtained, verification data necessary for verifying users is obtained and processing identified by the obtained second network identifier is executed by a second server, whereby, in order to be provided with predetermined services, control information containing the first network identifier and the second network identifier is supplied to a first server managing personal information identified by the stored first network identifier, the obtained verification data is supplied to a first server, personal information identified by the first network identifier is managed at the first server, a request for providing services based on control information and personal information is made to the second server for executing processing identified by the second network identifier contained in the supplied control information, the user is verified based on the supplied verification data, based on a request from the second server, the verification results are supplied to the second server, processing identified by the second network identifier is managed at the second server, and at the time that a request is made, user verification is requested to the first server, and if the supplied verification results indicate that the user is a valid user of the first service providing system, processing identified by the second network identifier is executed based on the control information and personal information. Accordingly, even if the information processing device is lost, for example, personal information can be prevented from falling into the hands of a third party.

In a service providing system according to an embodiment of the present invention, first network identifier is stored at a portable terminal, the second network identifier and access information for detecting access patterns is obtained from a service terminal, processing identified by the obtained second network identifier is executed by a second server, whereby, in order to be provided with predetermined services, control information containing the first network identifier, second network identifier, and access information is supplied to the service terminal at the first server managing personal information identified by first network identifier that is stored, the second network identifier is held at the service terminal, the second network identifier and access information is supplied to the portable terminal such that access information is obtained by accessing itself, the supplied control information is supplied to the first server, personal information identified by the first network identifier is managed at the first server, a request is made to the second server for executing processing identified by the second network identifier contained in the supplied control information for being provided with service based on the control information, personal information, and access information, processing identified by the second network identifier is managed at the second server, and processing identified by the second network identifier is executed based on the control information, personal information, and access information, based on the request. Accordingly, even if the information processing device is lost, for example, personal information can be prevented from falling into the hands of a third party.

Although the present invention has been described with reference to specific embodiments, those of skill in the art will recognize that changes may be made thereto without departing from the spirit and scope of the invention as set forth in the hereafter appended claims.

The invention of claimed is:

1. A service providing system, comprising:
    a portable terminal holding a first network identifier;
    a first server for managing personal information of a user identified by said first network identifier; and
    a second server for executing processing identified by a second network identifier;
    wherein said portable terminal, said first server, and said second server are connected via a network;
    said portable terminal comprising:
        first storing means for storing said first network identifier;
        first obtaining means for obtaining said second network identifier;
        second obtaining means for obtaining verification data necessary for verification of said user;
        first supplying means for supplying control information containing said first network identifier and said second network identifier to said first server which manages said personal information identified by said first network identifier stored in said first storing means, so as to be provided with predetermined services, by processing identified by said second network identifier obtained by said first obtaining means being executed by said second server; and
        second supplying means for supplying said verification data obtained by said second obtaining means to said first server;
    said first server comprising:
        first managing means for managing said personal information identified by said first network identifier;
        first requesting means for requesting to be provided with said services based on said control information and said personal information, to said second server for executing processing identified by said second network identifier contained in said control information supplied by said first supplying means of said portable terminal;
        first verification means for making verification of said user based on said verification data supplied by said second supplying means of said portable terminal, based on a request from said second server; and
        third supplying means for supplying verification results from said first verification means to said second server; and
    said second server comprising:
        second managing means for managing processing identified by said second network identifier;
        second request means for requesting said first server for verification of said user in response to a request by said first requesting means of said first server; and
        first executing means for executing processing identified by said second network identifier based on said control information and said personal information when said verification results supplied by third supplying means of said first server indicate that said user is a valid user of said service providing system.

2. A service providing system as claimed in claim 1, wherein at least one of said first network identifier and said second network identifier is a URL.

3. A service providing system as claimed in claim 1, further comprising:
    an access port terminal, connected to said network, that serves as an access port for said portable terminal;
    wherein at least one of said first supplying means and said second supplying means of said portable terminal supply at least one of said control information and said verification data to said access port terminal; and
    wherein said access port terminal further comprises fourth supplying means for supplying at least one of said control information and said verification data supplied from at least one of said first supplying means and said second supplying means of said portable terminal to said first server.

4. A service providing system as claimed in claim 1, wherein said second server further comprises:
   second storing means for adding a predetermined expiration date to said verification results supplied by said third supplying means of said first server, and storing; and
   judging means for judging, based on said expiration date, whether or not said verification results stored in said second storing means are valid, based on a request from said first requesting means of said first server;
   wherein said first executing means of said second server execute processing identified by said second network identifier when judgment is made by said judging means that said verification results are valid.

5. A service providing system as claimed in claim 1, wherein:
   said first managing means of said first server add a predetermined expiration date to said verification results, and manage;
   said first verification means of said first server judge, based on said expiration date, whether or not said verification results are valid, based on requests from said second requesting means of said second server;
   said third supplying means of said first server supply said verification results to said second server;
   said second requesting means of said second server request said user verification to said first server at a predetermined timing; and
   said first executing means of said second server execute processing identified by said second network identifier based on said control information and said personal information when said verification results supplied by said third supplying means of said first server indicate that said verification results are valid.

6. A service providing system as claimed in claim 1, further comprising:
   at least one service processing executing device for executing processing identified by respectively differing sets of said second network identifier,
   wherein said first requesting means of said first server request to said second server and said at least one service processing executing device to be provided with said services based on said control information and said personal information;
   and wherein said at least one service processing executing device comprises second executing means for executing processing respectively identified by said second network identifier.

7. A service providing system as claimed in claim 6, wherein said second executing means of said at least one service processing executing device execute processing as at least one of a monitor, mouse, and keyboard making up a personal computer, and wherein said second server executes processing as a CPU making up a personal computer.

8. A service providing system as claimed in claim 6, wherein said portable terminal further comprises fourth supplying means for supplying said first network identifier to said at least one service processing executing device, and wherein said second executing means of said at least one service processing executing device execute processing identified by said second network identifier when said first network identifier is supplied from said fourth supplying means of said portable terminal.

9. A service providing system as claimed in claim 6, wherein:
   said second server executes document creating processing when said second executing means said at least one service processing executing device execute processing as said keyboard;
   said first managing means of said first server manage said personal information containing character input patterns as to said user on said keyboard;
   said first requesting means of said first server request execution of said document creating processing based on said control information and said character input pattern, to said second server for executing processing identified by said second network identifier contained in said control information supplied by said first supplying means of said portable terminal;
   and said first executing means of said second server execute said document creating processing based on said control information and said character input pattern.

10. A service providing system as claimed in claim 1, wherein predetermined service information is provided to said portable terminal as a result of processing identified by said second network identifier being executed by said first executing means of said second server; and
   wherein said portable terminal further comprises:
      second storing means for temporarily storing said service information; and
      deleting means for monitoring the amount of data of said service information stored in said second storing means, and when said service information equal to or exceeding a predetermined data amount is stored, deleting with priority at least one of said service information not bookmarked and said service information not linked to a bookmarked homepage.

11. A service providing system as claimed in claim 10, wherein said deleting means establish an order of priority for said bookmarks, and deletes said bookmarked service information as necessary, according to said order of priority.

12. A service providing system as claimed in claim 11, further comprising fourth supplying means for supplying said service information to said portable terminal when said service information is said personal information; and
   wherein said first server attaches a tag to said personal information indicating that said personal information cannot be stored in said second storing means of said portable terminal.

13. A service providing system as claimed in claim 1, wherein predetermined service information is provided to said first server as the result of processing identified by said second network identifier being executed by said first executing means of said second server; and
   wherein said first server further comprises:
      second storing means for temporarily storing said service information; and
      deleting means for monitoring the amount of data of said service information stored in said second storing means, and when said service information equal to or exceeding a predetermined data amount is stored, deleting with priority at least one of said service information not bookmarked and said service information not linked to a bookmarked homepage.

14. A service providing system as claimed in claim 13, wherein said deleting means establish an order of priority for said bookmarks, and deletes said bookmarked service information as necessary, according to said order of priority.

15. A service providing system as claimed in claim 1, wherein said first managing means of said first server further manage predetermined information valid for reviewing a homepage which has been previously viewed when processing identified by said second network identifier is processing for Web browsing.

16. A service providing system, comprising:
a portable terminal holding first network identifier;
a first server for managing personal information of a user identified by said first network identifier;
a second server for executing processing identified by second network identifier; and
a first service terminal holding second network identifier;
wherein said portable terminal, said first server, said second server, and said first service terminal are connected via a network;
said portable terminal comprising:
  storing means for storing said first network identifier;
  first obtaining means for obtaining, from said first service terminal, said second network identifier and access information for detecting access patterns;
  second obtaining means for obtaining verification data necessary for verification of said user; and
  first supplying means for supplying control information containing said first network identifier, said second network identifier, and said access information, to said first server which manages said personal information identified by said first network identifier stored in said storing means, so as to be provided with predetermined services, by processing identified by said second network identifier obtained by said first obtaining means being executed by said second server,
said first service terminal comprising:
  first holding means for holding said second network identifier;
  second obtaining means for obtaining said access information from accesses to itself by said first obtaining means of said portable terminal;
  second supplying means for supplying said second network identifier and said access information to said portable terminal, so as to be obtained by said first obtaining means of said portable terminal; and
  third supplying means for supplying said control information supplied by said first supplying means of said portable terminal, to said first server;
said first server comprising:
  first managing means for managing said personal information identified by said first network identifier;
  first requesting means for requesting to be provided with said services based on said control information, said personal information, and said access information, to said second server for executing processing identified by said second network identifier contained in said control information supplied by said second supplying means of said portable terminal; and
  first verification means for making verification of said user based on said verification data obtained by said second obtaining means of said portable terminal, based on a request from said second server; and
said second server comprising:
  second managing means for managing processing identified by said second network identifier; and
  executing means for executing, based on said control information, said personal information, and said access information, processing identified by said second network identifier, based on requests from said first requesting means of said first server.

17. A service providing system as claimed in claim 16, further comprising:
a second service terminal connected to said network; wherein:
said first service terminal is installed at a first location;
said second service terminal is installed at a second location;
said first obtaining means of said portable terminal access said first service terminal, said access information containing the time of access;
said first obtaining means of said portable terminal access said second service terminal, said access information containing the time of access; and
said executing means of said second server calculate the difference between said time contained in said access information obtained by said first obtaining means of said first service terminal and said time contained in said access information obtained by said first obtaining means of said second service terminal, judge whether or not the calculation results indicate time equal to or exceeding a predetermined time, and execute processing identified by said second network identifier when judgement is made that said calculation results indicate time equal to or exceeding a predetermined time.

* * * * *